US009902044B2

(12) United States Patent
Puzemis et al.

(10) Patent No.: US 9,902,044 B2
(45) Date of Patent: Feb. 27, 2018

(54) ABRASIVE ARTICLE AND METHOD OF FORMING

(71) Applicants: Mary J. Puzemis, Waterbury, CT (US); Yinggang Tian, Shrewsbury, MA (US); Paul W. Rehrig, Sterling, MA (US); Arup K. Khaund, Northborough, MA (US); John Pearlman, Berlin, MA (US)

(72) Inventors: Mary J. Puzemis, Waterbury, CT (US); Yinggang Tian, Shrewsbury, MA (US); Paul W. Rehrig, Sterling, MA (US); Arup K. Khaund, Northborough, MA (US); John Pearlman, Berlin, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 0 days.

(21) Appl. No.: 13/930,396

(22) Filed: Jun. 28, 2013

(65) Prior Publication Data

US 2014/0011434 A1     Jan. 9, 2014

Related U.S. Application Data

(60) Provisional application No. 61/666,464, filed on Jun. 29, 2012.

(51) Int. Cl.
| | | |
|---|---|---|
| *B24D 11/00* | (2006.01) | |
| *B28D 5/04* | (2006.01) | |
| *B23D 61/18* | (2006.01) | |
| *B23D 65/00* | (2006.01) | |

(52) U.S. Cl.
CPC ............ *B24D 11/00* (2013.01); *B23D 61/185* (2013.01); *B23D 65/00* (2013.01); *B28D 5/045* (2013.01)

(58) Field of Classification Search
CPC ...... B23D 61/185; B23D 65/00; B24D 11/00; B24D 3/06; B28D 5/045
USPC ............................ 451/533, 537; 51/295, 298
See application file for complete search history.

(56) References Cited

U.S. PATENT DOCUMENTS

| | | | |
|---|---|---|---|
| 2,764,543 | A | 9/1956 | Comstock et al. |
| 2,784,536 | A | 3/1957 | Barron |
| 2,793,478 | A | 5/1957 | Rohowetz |
| 3,150,470 | A | 9/1964 | Barron |

(Continued)

FOREIGN PATENT DOCUMENTS

| | | |
|---|---|---|
| CH | 599837 A5 | 5/1978 |
| CN | 1275940 A | 12/2000 |

(Continued)

OTHER PUBLICATIONS

JP 2007-152485 A Dated Jun. 21, 2007, English Translation.*

(Continued)

*Primary Examiner* — Marc Carlson
(74) *Attorney, Agent, or Firm* — Abel Law Group, LLP; Joseph P. Sullivan

(57) ABSTRACT

An abrasive article includes a substrate comprising an elongated body, a first type of abrasive particle overlying the substrate, a bonding layer overlying the first type of abrasive particle, and a lubricious material overlying or integrated within the bonding layer.

19 Claims, 13 Drawing Sheets

(56) References Cited

U.S. PATENT DOCUMENTS

| | | |
|---|---|---|
| 3,178,273 A | 4/1965 | Libal |
| 3,854,898 A | 12/1974 | Whitney, Jr. et al. |
| 3,884,212 A | 5/1975 | Armstrong et al. |
| 3,894,673 A | 7/1975 | Lowder et al. |
| 3,906,684 A | 9/1975 | Marshall et al. |
| 3,984,214 A | 10/1976 | Pratt et al. |
| 3,997,302 A | 12/1976 | Supkis |
| 3,997,902 A | 12/1976 | Nard |
| 4,015,931 A | 4/1977 | Thakur |
| 4,018,576 A | 4/1977 | Lowder et al. |
| 4,055,700 A | 10/1977 | Ronnquist et al. |
| 4,187,828 A | 2/1980 | Schmid |
| 4,384,564 A | 5/1983 | Smith et al. |
| 4,399,167 A | 8/1983 | Pipkin |
| 4,485,757 A | 12/1984 | Ebner |
| 4,627,950 A | 12/1986 | Matsui et al. |
| 4,643,740 A | 2/1987 | Nicolson |
| 4,646,710 A | 3/1987 | Schmid et al. |
| 4,681,538 A | 7/1987 | DeLuca et al. |
| 4,684,052 A | 8/1987 | McDonald et al. |
| 4,727,852 A | 3/1988 | Schmid et al. |
| 4,776,862 A | 10/1988 | Wiand |
| 4,811,170 A | 3/1989 | Pammer |
| 4,866,888 A | 9/1989 | Murai et al. |
| 4,907,564 A | 3/1990 | Sowa et al. |
| 4,968,326 A | 11/1990 | Wiand |
| 4,974,373 A | 12/1990 | Kawashima et al. |
| 5,062,865 A | 11/1991 | Chen et al. |
| 5,127,197 A | 7/1992 | Brukvoort et al. |
| 5,127,924 A | 7/1992 | Russell |
| 5,213,591 A | 5/1993 | Celikkaya et al. |
| 5,218,949 A | 6/1993 | Tomlinson et al. |
| 5,250,084 A | 10/1993 | Lansell et al. |
| 5,251,802 A | 10/1993 | Bruxvoort et al. |
| 5,318,604 A | 6/1994 | Gorsuch et al. |
| 5,377,568 A | 1/1995 | Hauser |
| 5,377,659 A | 1/1995 | Tank et al. |
| 5,383,443 A | 1/1995 | Buyens |
| 5,438,973 A | 8/1995 | Schmid et al. |
| 5,454,750 A * | 10/1995 | Cosmano ............... B24D 3/34 451/526 |
| 5,492,771 A | 2/1996 | Lowder et al. |
| 5,496,386 A | 3/1996 | Broberg et al. |
| 5,511,718 A | 4/1996 | Lowder et al. |
| 5,544,643 A | 8/1996 | Bauer et al. |
| 5,571,296 A | 11/1996 | Barber, Jr. et al. |
| 5,578,098 A * | 11/1996 | Gagliardi et al. ............... 51/295 |
| 5,595,578 A * | 1/1997 | Stubbs ................... B24D 3/28 51/295 |
| 5,616,065 A | 4/1997 | Egglhuber |
| 5,643,055 A | 7/1997 | Linzell |
| 5,660,320 A | 8/1997 | Hoffmuller et al. |
| 5,681,361 A | 10/1997 | Sanders, Jr. |
| 5,707,509 A | 1/1998 | Hartweg |
| 5,840,089 A * | 11/1998 | Chesley et al. ............... 51/295 |
| 5,846,269 A | 12/1998 | Shiue et al. |
| 5,855,314 A | 1/1999 | Shiue et al. |
| 5,913,305 A | 6/1999 | Hauser |
| 5,924,917 A * | 7/1999 | Benedict et al. ............... 451/526 |
| 5,935,407 A * | 8/1999 | Nenov et al. ............... 205/183 |
| 5,964,210 A | 10/1999 | Hodsden |
| 5,975,988 A * | 11/1999 | Christianson ............... 451/28 |
| 6,056,794 A * | 5/2000 | Stoetzel et al. ............... 51/295 |
| 6,065,462 A | 5/2000 | Hodsden et al. |
| 6,070,570 A | 6/2000 | Ueoka et al. |
| 6,102,024 A * | 8/2000 | Buljan et al. ............... 125/21 |
| 6,194,068 B1 * | 2/2001 | Ohashi et al. ............... 428/379 |
| 6,194,086 B1 | 2/2001 | Nenov et al. |
| 6,228,133 B1 * | 5/2001 | Thurber ................... B24D 3/28 51/295 |
| 6,279,564 B1 | 8/2001 | Hodsden |
| 6,286,498 B1 | 9/2001 | Sung |
| 6,311,684 B1 | 11/2001 | Hodsden et al. |
| 6,319,108 B1 * | 11/2001 | Adefris et al. ............... 451/533 |
| 6,368,198 B1 * | 4/2002 | Sung et al. ............... 451/443 |
| 6,463,921 B2 * | 10/2002 | Shimazaki et al. ............... 125/21 |
| 6,478,831 B2 * | 11/2002 | Tselesin ............... B23D 61/021 51/293 |
| 6,613,113 B2 | 9/2003 | Minick et al. |
| 6,679,243 B2 | 1/2004 | Sung |
| 6,755,720 B1 | 6/2004 | Ishizaki et al. |
| 6,783,442 B2 | 8/2004 | Lukschandel et al. |
| 6,790,126 B2 | 9/2004 | Wood et al. |
| 6,797,023 B2 | 9/2004 | Knapp et al. |
| 6,830,598 B1 | 12/2004 | Sung |
| 6,858,050 B2 | 2/2005 | Palmgren |
| 6,899,920 B2 | 5/2005 | Meyer |
| 6,915,796 B2 | 7/2005 | Sung |
| 6,939,413 B2 | 9/2005 | Crockett |
| 7,089,925 B1 | 8/2006 | Lin et al. |
| 7,124,753 B2 | 10/2006 | Sung |
| 7,134,430 B2 | 11/2006 | Kim et al. |
| 7,261,752 B2 | 8/2007 | Sung |
| 7,306,508 B2 | 12/2007 | Kawasaki et al. |
| 7,435,276 B2 * | 10/2008 | Chen et al. ............... 51/307 |
| 7,556,558 B2 | 7/2009 | Palmgren |
| 7,704,127 B2 | 4/2010 | Taniguchi et al. |
| 7,926,478 B2 * | 4/2011 | Nakai et al. ............... 125/16.02 |
| 8,037,878 B2 | 10/2011 | Kitagawa et al. |
| 8,206,472 B2 * | 6/2012 | Tani et al. ............... 51/293 |
| 8,257,572 B2 | 9/2012 | Castro et al. |
| 8,291,895 B2 | 10/2012 | Sudarshan et al. |
| 8,425,640 B2 | 4/2013 | Liebelt et al. |
| 8,677,986 B2 * | 3/2014 | Kazahaya et al. ............... 125/16.01 |
| 8,707,944 B2 | 4/2014 | Morita et al. |
| 8,720,429 B2 * | 5/2014 | Lange et al. ............... 125/21 |
| 8,802,602 B2 | 8/2014 | Schmitjes et al. |
| 8,820,308 B2 | 9/2014 | Sudarshan et al. |
| 9,067,268 B2 | 6/2015 | Liebelt et al. |
| 9,254,552 B2 | 2/2016 | Tian et al. |
| 9,375,826 B2 | 6/2016 | Tian et al. |
| 2001/0025457 A1 | 10/2001 | Tselesin |
| 2001/0039070 A1 | 11/2001 | Sekine |
| 2002/0010068 A1 | 1/2002 | Komatsu |
| 2002/0077054 A1 | 6/2002 | Sung |
| 2002/0100469 A1 | 8/2002 | Shimazaki et al. |
| 2003/0084894 A1 | 5/2003 | Sung |
| 2003/0121212 A1 | 7/2003 | Minick et al. |
| 2003/0134577 A1 | 7/2003 | Coad |
| 2003/0140914 A1 | 7/2003 | Lukschandel et al. |
| 2004/0107648 A1 * | 6/2004 | Sung ............... 51/295 |
| 2004/0112359 A1 | 6/2004 | Sung |
| 2004/0244789 A1 | 12/2004 | Jentgens |
| 2005/0018642 A1 | 1/2005 | Nakamura |
| 2005/0103320 A1 | 5/2005 | Ebner |
| 2006/0016127 A1 | 1/2006 | Sung |
| 2006/0083688 A1 | 4/2006 | Singaram et al. |
| 2006/0194038 A1 | 8/2006 | You et al. |
| 2006/0258268 A1 | 11/2006 | Miyata et al. |
| 2007/0023027 A1 | 2/2007 | Nakai et al. |
| 2007/0051354 A1 | 3/2007 | Sung |
| 2007/0051355 A1 | 3/2007 | Sung |
| 2007/0151388 A1 | 7/2007 | Yazawa et al. |
| 2007/0151554 A1 | 7/2007 | Song et al. |
| 2007/0261690 A1 | 11/2007 | Jentgens |
| 2007/0283944 A1 | 12/2007 | Hukin |
| 2008/0053000 A1 | 3/2008 | Palmgren et al. |
| 2008/0141593 A1 | 6/2008 | Bhatia |
| 2008/0141994 A1 | 6/2008 | Skovgaard-Soerensen et al. |
| 2008/0148650 A1 | 6/2008 | You |
| 2008/0206576 A1 | 8/2008 | Qian et al. |
| 2008/0212733 A1 | 9/2008 | Pop et al. |
| 2008/0261499 A1 * | 10/2008 | Tani et al. ............... 451/528 |
| 2008/0271783 A1 | 11/2008 | Murakami et al. |
| 2009/0064983 A1 | 3/2009 | Sudarshan et al. |
| 2009/0120422 A1 | 5/2009 | Taniguchi |
| 2009/0202781 A1 | 8/2009 | Hall et al. |
| 2009/0242410 A1 | 10/2009 | Castro et al. |
| 2009/0283089 A1 | 11/2009 | Sung |
| 2010/0197202 A1 | 8/2010 | Branagan et al. |
| 2011/0009039 A1 | 1/2011 | Balagani et al. |
| 2011/0039070 A1 * | 2/2011 | Liebelt et al. ............... 428/143 |
| 2011/0045292 A1 * | 2/2011 | Tian et al. ............... 428/372 |
| 2011/0263187 A1 | 10/2011 | Liu et al. ............... 451/528 |

(56) References Cited

U.S. PATENT DOCUMENTS

| | | | | |
|---|---|---|---|---|
| 2011/0308371 A1* | 12/2011 | Morita et al. | | 83/830 |
| 2012/0037140 A1 | 2/2012 | Campos et al. | | |
| 2012/0055097 A1* | 3/2012 | Tian et al. | | 51/309 |
| 2012/0167482 A1* | 7/2012 | Tian et al. | | 51/309 |
| 2012/0216787 A1* | 8/2012 | Morita | | B23K 35/262 125/21 |
| 2012/0295119 A1* | 11/2012 | David | | 428/447 |
| 2013/0000211 A1 | 1/2013 | Upadhyay et al. | | |
| 2013/0032129 A1* | 2/2013 | Otani et al. | | 125/12 |
| 2013/0061535 A1* | 3/2013 | Tian et al. | | 51/309 |
| 2013/0084786 A1* | 4/2013 | Rehrig et al. | | 451/539 |
| 2013/0092143 A1 | 4/2013 | Sudarshan et al. | | |
| 2013/0205676 A1* | 8/2013 | Tian et al. | | 51/295 |
| 2013/0219801 A1 | 8/2013 | Liebelt et al. | | |
| 2014/0007513 A1* | 1/2014 | Rehrig et al. | | 51/298 |
| 2014/0011434 A1 | 1/2014 | Puzemis et al. | | |
| 2014/0013675 A1* | 1/2014 | Tian et al. | | 51/309 |
| 2014/0017984 A1* | 1/2014 | Rehrig et al. | | 451/529 |
| 2014/0017985 A1* | 1/2014 | Tian et al. | | 451/533 |
| 2014/0150766 A1* | 6/2014 | Che et al. | | 125/16.02 |
| 2014/0311472 A1* | 10/2014 | Tian et al. | | 125/21 |
| 2016/0375514 A1 | 12/2016 | Tian et al. | | |
| 2017/0066069 A1 | 3/2017 | Rehrig et al. | | |

FOREIGN PATENT DOCUMENTS

| | | | |
|---|---|---|---|
| CN | 1456410 A | 11/2003 | |
| CN | 1488480 A | 4/2004 | |
| CN | 1583336 A | 2/2005 | |
| CN | 1721113 A | 1/2006 | |
| CN | 1739927 A | 3/2006 | |
| CN | 101066614 A | 11/2007 | |
| CN | 101132884 A | 2/2008 | |
| CN | 201283606 Y | 8/2009 | |
| CN | 101564828 A | 10/2009 | |
| CN | 101712135 A | 5/2010 | |
| CN | 102896373 A | 1/2013 | |
| DE | 10-2004-043718 A1 | 3/2006 | |
| EP | 0237784 | 6/1991 | |
| EP | 916449 A1 | 5/1999 | |
| EP | 1371438 | 12/2003 | |
| EP | 1475463 | 11/2004 | |
| EP | 1685934 A1 | 8/2006 | |
| EP | 2497602 A1 | 9/2012 | |
| GB | 876605 A | 9/1961 | |
| GB | 962357 A | 7/1964 | |
| GB | 1254365 A | 11/1971 | |
| GB | 1342359 A | 1/1974 | |
| JP | 61-71949 | 4/1986 | |
| JP | 63-102868 | 5/1988 | |
| JP | 30-79264 | 4/1991 | |
| JP | 5016066 A | 1/1993 | |
| JP | H06262533 A | 9/1994 | |
| JP | H07-096454 | 4/1995 | |
| JP | H08-126953 | 5/1996 | |
| JP | H09-150314 | 6/1997 | |
| JP | H09-155631 | 6/1997 | |
| JP | H09-254006 A | 9/1997 | |
| JP | 10-034544 | 2/1998 | |
| JP | H10-118938 | 5/1998 | |
| JP | 10-256581 | 9/1998 | |
| JP | H10-328932 A | 12/1998 | |
| JP | H11-216657 A | 8/1999 | |
| JP | H11-216658 A | 8/1999 | |
| JP | 11-277398 | 10/1999 | |
| JP | 2957571 B1 | 10/1999 | |
| JP | H11-320379 | 11/1999 | |
| JP | H11-347911 | 12/1999 | |
| JP | 2000-052226 | 2/2000 | |
| JP | 2000-071160 | 3/2000 | |
| JP | 2000-071162 | 3/2000 | |
| JP | 2000-094297 | 4/2000 | |
| JP | 2000-158318 | 6/2000 | |
| JP | 2000-158319 | 6/2000 | |
| JP | 2000-218504 | 8/2000 | |
| JP | 2000-246542 | 9/2000 | |
| JP | 2000-246654 A | 9/2000 | |
| JP | 2000-263452 | 9/2000 | |
| JP | 3-104553 B2 | 10/2000 | |
| JP | 2000-271872 | 10/2000 | |
| JP | 2000-288902 | 10/2000 | |
| JP | 2001-054850 | 2/2001 | |
| JP | 2001-105295 | 4/2001 | |
| JP | 2001-113519 A | 4/2001 | |
| JP | 2001-259993 A | 9/2001 | |
| JP | 2001-277092 A | 10/2001 | |
| JP | 2001-287146 A | 10/2001 | |
| JP | 2001-341076 | 12/2001 | |
| JP | 2002172564 A | 6/2002 | |
| JP | 2002-205272 | 7/2002 | |
| JP | 2002-254286 A | 9/2002 | |
| JP | 2002-254327 | 9/2002 | |
| JP | 2002-273663 A | 9/2002 | |
| JP | 2002-326151 A | 11/2002 | |
| JP | 2002-331466 | 11/2002 | |
| JP | 2002326151 A * | 11/2002 | B24B 27/06 |
| JP | 2002331466 A * | 11/2002 | B24D 11/00 |
| JP | 2002-361566 A | 12/2002 | |
| JP | 2003-231063 A | 8/2003 | |
| JP | 2003525130 A | 8/2003 | |
| JP | 2003-275970 A | 9/2003 | |
| JP | 2003291057 A | 10/2003 | |
| JP | 2004-009239 A | 1/2004 | |
| JP | 2004-050318 | 2/2004 | |
| JP | 31-03807 U | 6/2004 | |
| JP | 2004-174680 | 6/2004 | |
| JP | 2004-209573 A | 7/2004 | |
| JP | 2004-216553 A | 8/2004 | |
| JP | 2004-261889 A | 9/2004 | |
| JP | 2004-338023 A | 12/2004 | |
| JP | 2004338023 A * | 12/2004 | B24D 11/00 |
| JP | 2005-007221 A | 1/2005 | |
| JP | 2002036091 A | 2/2005 | |
| JP | 2005-238377 A | 9/2005 | |
| JP | 2006-007387 A | 1/2006 | |
| JP | 37-77285 B2 | 5/2006 | |
| JP | 2006-123024 A | 5/2006 | |
| JP | 2006123055 A | 5/2006 | |
| JP | 2006130636 A | 5/2006 | |
| JP | 2006-150505 A | 6/2006 | |
| JP | 2006-179677 A | 7/2006 | |
| JP | 2006-181701 A | 7/2006 | |
| JP | 2006-231479 A | 9/2006 | |
| JP | 2006-272499 A | 10/2006 | |
| JP | 2007-021677 A | 2/2007 | |
| JP | 2007-044870 A | 2/2007 | |
| JP | 2007-061976 A | 3/2007 | |
| JP | 2007-152485 | 6/2007 | |
| JP | 2007-152486 | 6/2007 | |
| JP | 2007152485 A * | 6/2007 | |
| JP | 2007-196312 A | 8/2007 | |
| JP | 2007-196329 A | 8/2007 | |
| JP | 2007-203393 A | 8/2007 | |
| JP | 2007-203417 A | 8/2007 | |
| JP | 2007-237628 A | 9/2007 | |
| JP | 2007-253268 A | 10/2007 | |
| JP | 2007-268627 A | 10/2007 | |
| JP | 2007-281176 A | 10/2007 | |
| JP | 2007-307261 A | 11/2007 | |
| JP | 2008-068332 A | 3/2008 | |
| JP | 2008-221406 A | 9/2008 | |
| JP | 2009066689 A | 4/2009 | |
| JP | 2009285791 A | 12/2009 | |
| JP | 2010-000583 A | 1/2010 | |
| JP | 2010-000584 A | 1/2010 | |
| JP | 2010131698 A | 6/2010 | |
| JP | 2010-201602 A | 9/2010 | |
| JP | 2010-284754 | 12/2010 | |
| JP | 2011-016208 A | 1/2011 | |
| JP | 2011137213 A | 7/2011 | |
| JP | 2011-161613 | 8/2011 | |
| JP | 2011161613 A * | 8/2011 | |
| JP | WO 2011158834 A1 * | 12/2011 | B23K 35/262 |

(56) References Cited

FOREIGN PATENT DOCUMENTS

| KR | 2000-0033534 A | 6/2000 | |
|---|---|---|---|
| KR | 2001-0055980 A | 7/2001 | |
| KR | 10-2006-0006856 A | 1/2006 | |
| RU | 2078680 C1 | 5/1997 | |
| RU | 83210 | 5/2009 | |
| TW | 442370 B | 6/2001 | |
| TW | I291389 B | 12/2007 | |
| TW | 201111106 A | 4/2011 | |
| WO | 98/05466 | 2/1998 | |
| WO | 9821004 A1 | 5/1998 | |
| WO | 98/35784 A1 | 8/1998 | |
| WO | 99/46077 | 9/1999 | |
| WO | WO 9946077 A2 * | 9/1999 | ............ B23D 61/18 |
| WO | 00/61324 | 10/2000 | |
| WO | 01/04227 A2 | 1/2001 | |
| WO | 01/43918 A2 | 6/2001 | |
| WO | 2004/069479 | 8/2004 | |
| WO | 2005/064677 A1 | 7/2005 | |
| WO | 2006070534 | 7/2006 | |
| WO | 2007/039934 | 4/2007 | |
| WO | 2006/083688 | 8/2007 | |
| WO | 2008/000072 | 1/2008 | |
| WO | 2009/064345 A2 | 5/2009 | |
| WO | 2009-158507 A2 | 12/2009 | |
| WO | 2010071198 | 6/2010 | |
| WO | 2010/125083 | 11/2010 | |
| WO | 2010/125085 A1 | 11/2010 | |
| WO | 2011/020105 A2 | 2/2011 | |
| WO | 2011/020109 A2 | 2/2011 | |
| WO | 2011138192 A2 | 11/2011 | |
| WO | 2012/092614 A2 | 7/2012 | |
| WO | 2013/040423 A2 | 3/2013 | |
| WO | 2013/049204 A2 | 4/2013 | |
| WO | 2013/147892 A1 | 10/2013 | |
| WO | 2014/004982 A1 | 1/2014 | |
| WO | 2014/004991 A1 | 1/2014 | |
| WO | 2014/005009 A1 | 1/2014 | |
| WO | 2014/005015 A1 | 1/2014 | |
| WO | 2014/005028 A1 | 1/2014 | |
| WO | 2014/005037 A1 | 1/2014 | |
| WO | 2014172611 A1 | 10/2014 | |
| WO | 2017004037 A1 | 1/2017 | |

OTHER PUBLICATIONS

Copper and Copper Alloys Jan. 1, 2001 (exerpt)—Davis, ASM International, pp. 127-130.*
International Search Report for PCT/US2011/068240 mailed Aug. 27, 2012.
Handbook of Thermoset Plastics, 2nd edition, p. 28, 1998.
International Search Report for PCT/US2010/045647 mailed Apr. 29, 2011.
U.S. Appl. No. 13/930,577, filed Jun. 28, 2013.
International Search Report for PCT/US2012/055529 mailed Feb. 21, 2013.
International Search Report for PCT/US2012/057334 mailed Mar. 28, 2013.
Higashi, Taisuke et al., Development of Low Melting Temperature Coating Materials for High Performance Diamonds Wire Saw: Effect of an Additive on Mechanical Properties.
Nakamura Choko Co., Ltd., "Company Report", Mar. 31, 2010, 10 pages.
International Search Report for PCT/US2013/048549 mailed Sep. 11, 2013.
International Search Report for PCT/US2013/048565 mailed Aug. 27, 2013.
International Search Report for PCT/US2013/048587 mailed Sep. 17, 2013.
International Search Report for PCT/US2013/048609 mailed Sep. 2, 2013.
International Search Report for PCT/US2013/048511 mailed Aug. 27, 2013.
International Search Report for PCT/US2013/048491 mailed Aug. 26, 2013.
Enomoto, Toshiyuki et al "Development of a Resinoid Diamond Wire Containing Metal Power for Slicing a Slicing Ingot." Annals of the CIRP. 32.1 (1983): 273-276.
Jun Sugawara et al., "Development of fixed abrasive-grain wire saw with less cutting loss" SEI Technical Review No. 58, Jun. 2004, pp. 7-11.
International Search Report for PCT/US2012/031699 mailed Nov. 16, 2012.
Daisuke Ide, "Resin Bond Diamond wire for slicing ceramics", Industrial Diamond Review vol. 2/2007, pp. 32-34.
Y. Chiba et al., "Development of a high-speed manufacturing method for electroplated diamond wire tools", Annals of the CIRP vol. 52/Jan. 2003, pp. 281-284.
Osamu Kamiya et al., "Diamond and metal bonding by active solder for micro-cutting wire", Int. J. of Mdern Physics B, vol. 20, Nos. 25-27 (2006) pp. 3932-3937.
Fujisawa, M. et al. "Precision Sawing with Wire Saw." Annals of the CIRP. 32.1 (1983): 87-90.
Conversion US mesh (tamis)—microns: http://www.granuloshop.com/Conversion.htm (Sep. 2, 2003).
International Search Report for PCT/US2010/045643 mailed Apr. 29, 2011.
Patel, Mitesh M., "Characterizing Fatigue and Fracture Response of Medical Grade Nickel-Titanium Alloys by Rotary Beam Testing," Presented at the ASTM Symposium on Fatigue and Fracture of Medical Metallic Materials and Devices, Dallas, Texas, Nov. 2005, 12 pages.
International Search Report for PCT/US2014/034611 mailed Aug. 28, 2014.
Copper and Copper Alloys Jan. 1, 2001 (exerpt)—Davis, ASM International; pp. 127-130.
International Search Report for International Application No. PCT/JP2010/069294 dated Nov. 22, 2010.
International Search Report and Written Opinion for PCT Application No. PCT/US2016/039810, dated Oct. 11, 2016, 16 pages.

* cited by examiner

Reel to Reel Machine Set Up

ABRASIVE ARTICLE AND METHOD OF FORMING

CROSS-REFERENCE TO RELATED APPLICATION

The present application claims priority from U.S. Provisional Patent Application No. 61/666,464, filed Jun. 29, 2012, entitled "ABRASIVE ARTICLE AND METHOD OF FORMING," naming inventors Mary J. Puzemis, Yinggang Tian, Paul W. Rehrig, Arup K. Khaund and John Pearlman, and said provisional application is incorporated by reference herein in its entirety for all purposes.

BACKGROUND

Field of the Disclosure

The following is directed to methods of forming abrasive articles, and particularly, single-layered abrasive articles.

Description of the Related Art

A variety of abrasive tools have been developed over the past century for various industries for the general function of removing material from a workpiece, including for example, sawing, drilling, polishing, cleaning, carving, and grinding. In particular reference to the electronics industry, abrasive tools suitable for slicing crystal ingots of material to form wafers is particularly pertinent. As the industry continues to mature, ingots have increasingly larger diameters, and it has become acceptable to use loose abrasives and wire saws for such works due to yield, productivity, affected layers, dimensional constraints and other factors.

Generally, wire saws are abrasive tools that include abrasive particles attached to a long length of wire that can be spooled at high speeds to produce a cutting action. While circular saws are limited to a cutting depth of less than the radius of the blade, wire saws can have greater flexibility allowing for cutting of straight or profiled cutting paths.

Various approaches have been taken in conventional fixed abrasive wire saws, such as producing these articles by sliding steel beads over a metal wire or cable, wherein the beads are separated by spacers. These beads may be covered by abrasive particles which are commonly attached by either electroplating or sintering. However, electroplating and sintering operations can be time consuming and thus costly ventures, prohibiting rapid production of the wire saw abrasive tool. Most of these wire saws have been used in applications, where kerf loss is not so dominating as in electronics applications, often to cut stone or marble. Some attempts have been made to attach abrasive particles via chemical bonding processes, such as brazing, but such fabrication methods reduce the tensile strength of the wire saw, and the wire saw becomes susceptible to breaking and premature failure during cutting applications under high tension. Other wire saws may use a resin to bind the abrasives to the wire. Unfortunately, the resin bonded wire saws tend to wear quickly and the abrasives are lost well before the useful life of the particles is realized, especially when cutting through hard materials.

Accordingly, the industry continues to need improved abrasive tools, particularly in the realm of wire sawing.

SUMMARY

According to a first aspect, an abrasive article includes a substrate comprising an elongated body, a first type of abrasive particle overlying the substrate, a bonding layer overlying the first type of abrasive particle, and a lubricious material overlying or integrated within the bonding layer.

In yet another aspect, an abrasive article includes a substrate comprising an elongated body, a tacking layer overlying the substrate comprising tin, a first type of abrasive particle overlying the tacking layer, and a lubricious material overlying the substrate.

For still another aspect, an abrasive article includes a substrate comprising an elongated member, a tacking layer overlying the substrate consisting essentially of tin, a first type of abrasive particle overlying the tacking layer, a bonding layer overlying at least a portion of the first type of the abrasive particle and the tacking layer, and a lubricious material at the bonding layer.

According to another aspect, a method of forming an abrasive article includes providing a substrate having an elongated body, forming a tacking layer overlying a surface of the substrate, the tacking layer comprising tin, providing a first type of abrasive particle on the surface of the tacking layer, providing a bonding layer overlying the first type of abrasive particle and the tacking layer, and providing a lubricious material overlying the substrate.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed to abrasive articles, and particularly abrasive articles suitable for abrading and sawing through workpieces. In particular instances, the abrasive articles herein can form wire saws, which may be used in processing of sensitive, crystalline materials in the electronics industry, optics industry, and other associated industries.

Figure 1:
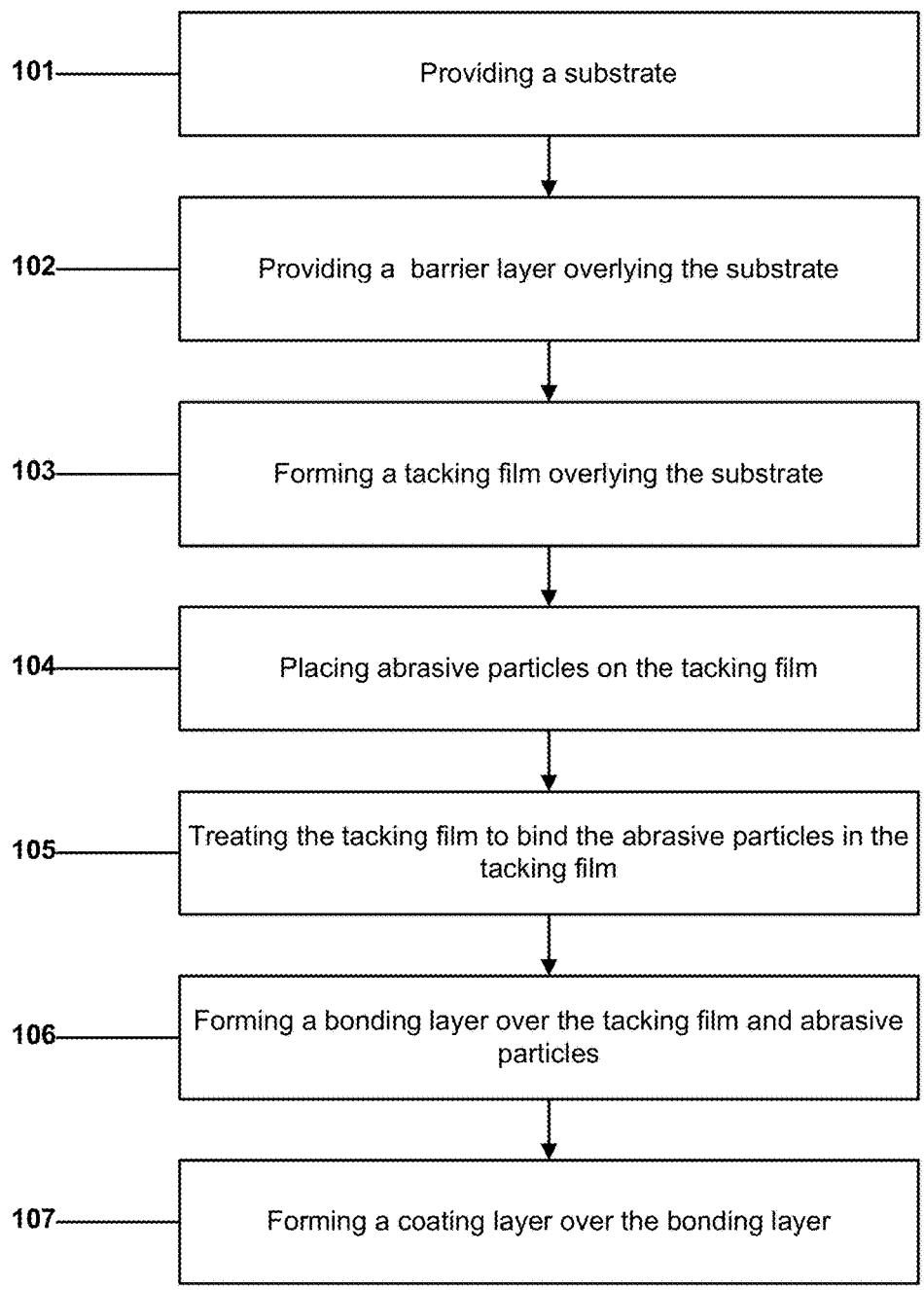
FIG. 1 includes a flow chart providing a process for forming an abrasive article in accordance with an embodiment.

FIG. 1 includes a flow chart providing a process of forming an abrasive article in accordance with an embodiment. The process can be initiated at step 101 by providing a substrate. The substrate can provide a surface for affixing abrasive materials thereto, thus facilitating the abrasive capabilities of the abrasive article.

In accordance with an embodiment, the process of providing a substrate can include a process of providing a substrate having an elongated body. In particular instances, the elongated body can have an aspect ratio of length:width of at least 10:1. In other embodiments, the elongated body can have an aspect ratio of at least about 100:1, such as at least 1000:1, or even at least about 10,000:1. The length of the substrate can be the longest dimension measured along a longitudinal axis of the substrate. The width can be a second longest (or in some cases smallest) dimension of the substrate measured perpendicular to the longitudinal axis.

Furthermore, the substrate can be in the form of elongated body having a length of at least about 50 meters. In fact, other substrates can be longer, having an average length of at least about 100 meters, such as at least about 500 meters, at least about 1,000 meters, or even at least about 10,000 meters.

Furthermore, the substrate can have a width that may not be greater than about 1 cm. In fact, the elongated body can have an average width of not greater than about 0.5 cm, such as not greater than about 1 mm, not greater than about 0.8 mm, or even not greater than about 0.5 mm. Still, the substrate may have an average width of at least about 0.01 mm, such as at least about 0.03 mm. It will be appreciated that the substrate can have an average width within a range between any of the minimum and maximum values noted above.

In certain embodiments, the elongated body can be a wire having a plurality of filaments braided together. That is, the substrate can be formed of many smaller wires wound around each other, braided together, or fixed to another object, such as a central core wire. Certain designs may utilize plano wire as a suitable structure for the substrate. For example, the substrate can be a high strength steel wire having a break strength of at least about 3 GPa. The substrate break strength can be measured by ASTM E-8 for tension testing of metallic materials with capstan grips. The wire may be coated with a layer of a particular material, such as a metal, including for example, brass.

The elongated body can have a certain shape. For example, the elongated body can have a generally cylindrical shape such that it has a circular cross-sectional contour. In using elongated bodies having a circular cross-sectional shape, as viewed in a plane extending transversely to the longitudinal axis of the elongated body.

The elongated body can be made of various materials, including for example, inorganic materials, organic materials (e.g., polymers and naturally occurring organic materials), and a combination thereof. Suitable inorganic materials can include ceramics, glasses, metals, metal alloys, cermets, and a combination thereof. In certain instances, the elongated body can be made of a metal or metal alloy material. For example, the elongated body may be made of a transition metal or transition metal alloy material and may incorporate elements of iron, nickel, cobalt, copper, chromium, molybdenum, vanadium, tantalum, tungsten, and a combination thereof.

Suitable organic materials can include polymers, which can include thermoplastics, thermosets, elastomers, and a combination thereof. Particularly useful polymers can include polyimides, polyamides, resins, polyurethanes, polyesters, and the like. It will further be appreciated that the elongated body can include natural organic materials, for example, rubber.

To facilitate processing and formation of the abrasive article, the substrate may be connected to a spooling mechanism. For example, the wire can be fed between a feed spool and a receiving spool. The translation of the wire between the feed spool and the receiving spool can facilitate processing, such that for example, the wire may be translated through desired forming processes to form the component layers of the finally-formed abrasive article while being translated from the feed spool to the receiving spool.

In further reference to the process of providing a substrate, it will be appreciated that the substrate can be spooled from a feed spool to a receiving spool at a particular rate to facilitate processing. For example, the substrate can be spooled at a rate of not less than about 5 m/min from the feed spool to the receiving spool. In other embodiments, the rate of spooling can be greater, such that it is at least about 8 m/min, at least about 10 m/min, at least about 12 m/min, or even at least about 14 m/min. In particular instances, the spooling rate may be not greater than about 500 m/min, such as not greater than about 200 m/min. The rate of spooling can be within a range between any of the minimum and maximum values noted above. It will be appreciated the spooling rate can represent the rate at which the finally-formed abrasive article can be formed.

After providing a substrate at step 101, the process can continue at an optional step 102 that includes providing a barrier layer overlying the substrate. According to one aspect, the barrier layer can be overlying a peripheral surface of a substrate, such that it may be in direct contact with the peripheral surface of the substrate, and more particularly, can be bonded directly to the peripheral surface of the substrate. In one embodiment, the barrier layer can be bonded to the peripheral surface of the substrate and may define a diffusion bond region between the barrier layer and the substrate, characterized by an interdiffusion of at least one metal element of the substrate and one element of the barrier layer. In one particular embodiment, the barrier layer can be disposed between the substrate and other overlying layers, including for example, a tacking layer, a bonding layer, a coating layer, a layer of a first type of abrasive particles, a layer of a second type of abrasive particles, and a combination thereof.

The process of providing a substrate having a barrier layer can include sourcing such a construction or fabricating such a substrate and barrier layer construction. The barrier layer can be formed through various techniques, including for example, a deposition process. Some suitable deposition processes can include, printing, spraying, dip coating, die coating, plating (e.g., electrolyte or electroless), and a combination thereof. In accordance with an embodiment, the process of forming the barrier layer can include a low temperature process. For example, the process of forming the barrier layer can be conducted at a temperature of not greater than about 400° C., such as not greater than about 375° C., not greater than about 350° C., not greater than about 300° C., or even not greater than about 250° C. Furthermore, after forming the barrier layer it will be appreciated that further processing can be undertaken including for example cleaning, drying, curing, solidifying, heat treating, and a combination thereof. The barrier layer can serve as a barrier to chemical impregnation of the core material by various chemical species (e.g., hydrogen) in subsequent plating processes. Moreover, the barrier layer may facilitate improved mechanical durability.

In one embodiment, the barrier layer can be a single layer of material. The barrier layer can be in the form of a continuous coating, overlying the entire peripheral surface of the substrate. The barrier material can include an inorganic material, such as a metal or metal alloy material. Some suitable materials for use in the barrier layer can include transition metal elements, including but not limited to tin, silver, copper, nickel, titanium, and a combination thereof. In one embodiment, the barrier layer can be a single layer of material consisting essentially of tin. In one particular instance, the barrier layer can contain a continuous layer of tin having a purity of at least 99.99% tin. Notably, the barrier layer can be a substantially pure, non-alloyed material. That is, the barrier layer can be a metal material (e.g., tin) made of a single metal material.

In other embodiments, the barrier layer can be a metal alloy. For example, the barrier layer can include a tin alloy, such as a composition including a combination of tin and another metal, including transition metal species such as copper, silver, and the like. Some suitable tin-based alloys can include tin-based alloys including silver, and particularly Sn96.5/Ag3.5, Sn96/Ag4, and Sn95/Ag5 alloys. Other suitable tin-based alloys can include copper, and particularly including Sn99.3/Cu0.7 and Sn97/Cu3 alloys. Additionally, certain tin-based alloys can include a percentage of copper and silver, including for example, Sn99/Cu0.7/Ag0.3, Sn97/Cu2.75/Ag0.25 and, Sn95.5/Ag4/Cu0.5 alloys.

In another aspect, the barrier layer can be formed from a plurality of discrete layers, including for example, at least two discrete layers. For example, the barrier layer can include an inner layer and an outer layer overlying the inner layer. According to an embodiment, the inner layer and outer layer can be directly contacting each other, such that the outer layer is directly overlying the inner layer and joined at an interface. Accordingly, the inner layer and outer layer can be joined at an interface extending along the length of the substrate.

In one embodiment, the inner layer can include any of the characteristics of the barrier layer described above. For example, the inner layer can include a continuous layer of material including tin, and more particularly, may consist essentially of tin. Moreover, the inner layer and outer layer can be formed of different materials relative to each other. That is, for example, at least one element present within one of the layers can be absent within the other layer. In one particular embodiment, the outer layer can include an element that is not present within the inner layer.

The outer layer can include any of the characteristics of the barrier layer described above. For example, the outer layer can be formed such that it includes an inorganic material, such as a metal or a metal alloy. More particularly, the outer layer can include a transition metal element. For example, in one certain embodiment, the outer layer can include nickel. In another embodiment, the outer layer can be formed such that it consists essentially of nickel.

In certain instances, the outer layer can be formed in the same manner as the inner layer, such as a deposition process. However, it is not necessary that the outer layer be formed in the same manner as the inner layer. In accordance with an embodiment, the outer layer can be formed through a deposition process including plating, spraying, printing, dipping, die coating, deposition, and a combination thereof. In certain instances, the outer layer of the barrier layer can be formed at relatively low temperatures, such as temperatures not greater than about 400° C., not greater than about 375° C., not greater than about 350° C., not greater than about 300° C., or even not greater than 250° C. According to one particular process, the outer layer can be formed though a non-plating process, such as die coating. Moreover, the processes used to form the outer layer may include other methods including for example heating, curing, drying, and a combination thereof. It will be appreciated that formation of the outer layer in such a manner may facilitate limiting the impregnation of unwanted species within the core and/or inner layer.

In accordance with an embodiment, the inner layer of the barrier layer can be formed to have a particular average thickness suitable for acting as a chemical barrier layer. For example, the barrier layer can have an average thickness of at least about 0.05 microns, such as least about 0.1 microns, at least about 0.2 microns, at least about 0.3 micron, or even at least about 0.5 microns. Still, the average thickness of the inner layer may be not greater than about 8 microns, such as not greater than about 7 microns, not greater than about 6 microns, not greater than about 5 microns, or even not greater than about 4 microns. It will be appreciated that the inner layer can have an average thickness within a range between any of the minimum and maximum thicknesses noted above.

The outer layer of the barrier layer can be formed to have a particular thickness. For example, in one embodiment the average thickness of the outer layer can be at least about 0.05 microns, such as least about 0.1 microns, at least about 0.2 microns, at least about 0.3 micron, or even at least about 0.5 microns. Still, in certain embodiments, the outer layer can have an average thickness that is not greater than about 12 microns, not greater than about 10 microns, not greater than about 8 microns, not greater than about 7 microns, not greater than about 6 microns, not greater than about 5 microns, not greater than about 4 microns, or even not greater than about 3 microns. It will be appreciated that the outer layer of the barrier layer can have an average thickness within a range between any of the minimum and maximum thicknesses noted above.

Notably, in at least one embodiment, the inner layer can be formed to have a different average thickness than the average thickness of the outer layer. Such a design may facilitate improved impregnation resistance to certain chemical species while also providing suitable bonding structure for further processing. For example, in other embodiments the inner layer can be formed to have an average thickness that is greater than the average thickness of the outer layer. However, in alternative embodiments, the inner layer may be formed to have an average thickness so that it is less than the average thickness of the outer layer.

According to one particular embodiment, the barrier layer can have a thickness ratio [$t_i:t_o$] between an average thickness of the inner layer ($t_i$) and an average thickness of the outer layer ($t_o$) that can be within a range between about 3:1 and about 1:3. In other embodiments, the thickness ratio can be within a range between about 2.5:1 and about 1:2.5, such as within a range between about 2:1 and about 1:2, within a range between about 1.8:1 and about 1:1.8, within a range between about 1.5:1 and about 1:1.5, or even within a range between about 1.3:1 and about 1:1.3.

Notably, the barrier layer (including at least the inner layer and outer layer) can be formed to have an average thickness that is not greater than about 10 microns. In other embodiments, the average thickness of the barrier layer may be less, such as not greater than about 9 microns, not greater than about 8 microns, not greater than about 7 microns, not greater than about 6 microns, not greater than about 5 microns, or even not greater than about 3 microns. Still, the average thickness of the barrier layer can be at least about 0.05 microns, such as least about 0.1 microns, at least about 0.2 microns, at least about 0.3 micron, or even at least about 0.5 microns. It will be appreciated that the barrier layer can have an average thickness within a range between any of the minimum and maximum thicknesses noted above.

Furthermore, the abrasive articles herein can form a substrate having a certain resistance to fatigue. For example, the substrates can have an average fatigue life of at least 300,000 cycles as measured through a Rotary Beam Fatigue Test or a Hunter Fatigue Test. The test can be a MPIF Std. 56. The rotary beam fatigue test measures the number of cycles up to wire break at designated stress (e.g. 700 MPa), i.e. constant stress or the stress under which the wire was not ruptured in a cyclic fatigue test with a number of repeating cycles of up to $10^6$ (e.g. stress represents fatigue strength). In other embodiments, the substrate may demonstrate a higher fatigue life, such as least about 400,000 cycles, at least about 450,000 cycles, at least about 500,000 cycles, or even at least about 540,000 cycles. Still, the substrate may have a fatigue life that is not greater than about 2,000,000 cycles.

After optionally providing a barrier layer at step 102, the process can continue at step 103, which includes forming a tacking layer overlying a surface of the substrate. The process of forming a tacking layer can include a deposition process, including for example, spraying, printing, dipping, die coating, plating, and a combination thereof. The tacking layer can be bonded directly to the external surface of the substrate. In fact, the tacking layer can be formed such that it overlies a majority of the external surface of the substrate, and more particularly, can overlie essentially the entire external surface of the substrate.

The tacking layer may be formed such that it is bonded to the substrate in a manner that it defines a bonding region. The bonding region can be defined by an interdiffusion of elements between the tacking layer and the substrate. It will be appreciated that formation of the bonding region may not necessarily be formed at the moment when the tacking layer is deposited on the surface of the substrate. For example, the formation of a bonding region between the tacking layer and the substrate may be formed at a later time during processing, such as during a heat treatment process to facilitate bonding between the substrate and other component layers formed on the substrate.

Alternatively, the tacking layer may be formed such that it directly contacts at least a portion of the barrier layer, such as the exterior peripheral surface of the barrier layer. In a particular embodiment, the tacking layer can be bonded directly to the barrier layer, and more particularly, bonded directly to an outer layer of the barrier layer. As noted above, the tacking layer may be formed such that it is bonded to the barrier layer in a manner that it defines a bonding region. The bonding region can be defined by an interdiffusion of elements between the tacking layer and the barrier layer. It will be appreciated that formation of the bonding region may not necessarily be formed at the moment when the tacking layer is deposited on the surface of the barrier layer. For example, the formation of a bonding region between the tacking layer and the barrier may be formed at a later time during processing, such as during a heat treatment process to facilitate bonding between the substrate and other component layers formed on the substrate.

Yet in another embodiment, it will be appreciated that the tacking layer can be made of material suitable for use as a tacking layer and a barrier layer. For example, the tacking layer can have the same materials and construction of the barrier layer, facilitating improved mechanical properties of the substrate and may include a material of a tacking layer in any of the embodiments herein suitable for tacking and binding of abrasive particles for further processing. The barrier layer can be a discontinuous layer having coated regions and gaps in the barrier layer. The tacking layer can overlie the coated regions and the gaps in the barrier layer where the underlying substrate may be exposed.

In one particular embodiment, the tacking layer can be disposed between the substrate and other overlying layers, including for example, a bonding layer, a coating layer, a layer of a first type of abrasive particles, a layer of a second type of abrasive particles, and a combination thereof. Moreover, it will be appreciated that the tacking layer can be disposed between the barrier layer and other overlying layers, including for example, a bonding layer, a coating layer, a layer of a first type of abrasive particles, a layer of a second type of abrasive particles, and a combination thereof.

In accordance with an embodiment, the tacking layer can be formed from a metal, metal alloy, metal matrix composite, and a combination thereof. In one particular embodiment, the tacking layer can be formed of a material including a transition metal element. For example, the tacking layer can be a metal alloy including a transition metal element. Some suitable transition metal elements can include, lead, silver, copper, zinc, indium, tin, titanium, molybdenum, chromium, iron, manganese, cobalt, niobium, tantalum, tungsten, palladium, platinum, gold, ruthenium, and a combination thereof. According to one particular embodiment, the tacking layer can be made of a metal alloy including tin and lead. In particular, such metal alloys of tin and lead may contain a majority content of tin as compared to lead, including but not limited to, a tin/lead composition of at least about 60/40.

In another embodiment, the tacking layer can be made of a material having a majority content of tin. In fact, in certain abrasive articles, the tacking layer may consist essentially of tin. The tin, alone or in the solder, can have a purity of at least about 99%, such as at least about 99.1%, at least about 99.2%, at least about 99.3%, at least about 99.4%, at least about 99.5%, at least about 99.6%, at least about 99.7%, at least about 99.8%, or even at least about 99.9%. In another aspect, the tin can have a purity of at least about 99.99%.

According to at least one embodiment, the tacking layer may be formed via a plating process. The plating process may be an electrolyte plating process or an electroless plating process. In one particular instance, the tacking layer can be formed by traversing the substrate through a certain plating material, which can include a bath that can produce a tacking layer comprising a matte tin layer. The matte tin layer can be a plated layer having particular features. For example, the matte tin layer can have an organic content of not greater than about 0.5 wt % for a total weight of the plated material (i.e., the tacking layer). Organic content can include compositions include carbon, nitrogen, sulfur, and a combination thereof. In certain other instances, the content of organic material in the matte tin layer can be not greater than about 0.3 wt %, such as not greater than about 0.1 wt %, not greater than about 0.08 wt %, or even not greater than about 0.05 wt % for the total weight of the tacking layer. According to one embodiment, the matte tin layer can be essentially free of organic brighteners and organic grain refiners. Moreover, the matte tin layer may have a purity of at least about 99.9%.

The matte tin layer may be made from a particular plating material having certain features. For example, the plating material can have an organic content of not greater than about 0.5 wt % for a total weight of the plated material in the bath. Organic content can include compositions include carbon, nitrogen, sulfur, and a combination thereof. In certain other instances, the content of organic material in the plated material can be not greater than about 0.3 wt %, such as not greater than about 0.1 wt %, not greater than about 0.08 wt %, or even not greater than about 0.05 wt % for the total weight of the plating material. According to one embodiment, the plating material can be essentially free of organic brighteners and organic grain refiners. Moreover, the plating material may have a purity of at least about 99.9%.

Moreover, the matte tin layer may have a particular average grain size of tin material. For example, the matte tin layer can have an average grain size of at least about 0.1 microns, such as at least about 0.2 microns, at least about 0.5 microns, or even at least about 1 micron. Still, in one non-limiting embodiment, the matte tin layer can have an average grain size of tin of not greater than about 50 microns, such as not greater than about 25 microns, not greater than about 15 microns, or even not greater than about 10 microns. It will be appreciated that the average grain size of the grains of the matte tin layer can be within a range between any of the above minimum and maximum values.

In accordance with an embodiment, the tacking layer can be a solder material. It will be appreciated that a solder material may include a material having a particular melting point, such as not greater than about 450° C. Solder materials are distinct from braze materials, which generally have significantly higher melting points than solder materials, such as greater than 450° C., and more typically, greater than 500° C. Furthermore, brazing materials may have different compositions. In accordance with an embodiment, the tacking layer of the embodiments herein may be formed of a material having a melting point of not greater than about 400° C., such as not greater than about 375° C., not greater than about 350° C., not greater than about 300° C., or even not greater than about 250° C. Still, the tacking layer may have a melting point of at least about 100° C., such as at least about 125° C., at least about 150° C., or even at least about 175° C. It will be appreciated that the tacking layer can have a melting point within a range between any of the minimum and maximum temperatures noted above.

According to one embodiment, the tacking layer can include a same material as the barrier layer, such that the compositions of the barrier layer and the tacking layer share at least one element in common. In yet an alternative embodiment, the barrier layer and the tacking layer can be entirely different materials.

According to at least one embodiment, the formation of the tacking layer can include formation of additional layers overlying the tacking layer. For example, in one embodiment, the formation of the tacking layer includes formation of an additional layer overlying the tacking layer to facilitate further processing. The additional layer can be overlying the substrate, and more particularly, in direct contact with at least a portion of the tacking layer.

The additional layer can include a flux material, which facilitates melting of the material of the tacking layer and further facilitates attachment of abrasive particles on the tacking layer. The flux material can be in the form of a generally uniform layer overlying the tacking layer, and more particularly, in direct contact with the tacking layer. The additional layer in the form of a flux material can comprise a majority content of flux material. In certain instances, essentially all of the additional layer can consist of the flux material.

The flux material can be in the form of a liquid or paste. According to one embodiment, the flux material can be applied to the tacking layer using a deposition process such as spraying, dipping, painting, printing, brushing, and a combination thereof. For at least one exemplary embodiment, the flux material can include a material such as a chloride, an acid, a surfactant, a solvent, water and a combination thereof. In one particular embodiment, the flux can include hydrochloride, zinc chloride, and a combination thereof.

After forming the tacking layer at step 103, the process can continue at step 104 by placing abrasive particles on the tacking layer. Reference herein to abrasive particles is reference to any one of the multiple types of abrasive particle described herein, including for example a first type of abrasive particle or a second type of abrasive particle. The types of abrasive particles are described in more detail herein. In some instances, depending upon the nature of the process, the abrasive particles can be in direct contact with the tacking layer. More particularly, the abrasive particles can be in direct contact with an additional layer, such as a layer comprising a flux material, overlying the tacking layer. In fact, the additional layer of material comprising the flux material can have a natural viscosity and adhesive characteristic that facilitates holding the abrasive particles in place during processing, until further processes are conducted to permanently bond the abrasive particles in place relative to the tacking layer.

Suitable methods of providing the abrasive particles on the tacking layer, and more particularly, on the additional layer comprising the flux material, can include various deposition methods, including but not limited to, spraying, gravity coating, dipping, die coating, dip coating, electrostatic coating, plating, and a combination thereof. Particularly useful methods of applying the abrasive particles can include a spraying process, conducted to apply a substantially uniform coating of abrasive particles onto the additional layer comprising the flux material.

In an alternative embodiment, the process of providing the abrasive particles can include the formation of a mixture comprising the additional material, which may include a flux material and the abrasive particles. In one particular process according to an embodiment herein, the process of providing the abrasive particles can include dip coating the abrasive particles on the tacking film. Dip coating can include translating the abrasive article through a mixture or slurry comprising at least the flux material and the abrasive particles. As such, the abrasive particles can be applied to the tacking layer and the additional layer comprising the flux material can be formed simultaneously.

According to one particular embodiment, the process of applying the additional coating, which may optionally include simultaneous application of the abrasive particles, depending upon the components of the mixture, can include a die coating process. In certain instances, the abrasive article can be translated through a mixture comprising the additional material (and optionally the abrasive particles) and translated through a mechanism (e.g., a die opening having controlled dimensions) to control the thickness of the additional layer.

According to an embodiment, particular aspects of the slurry and the dip coating process may be controlled to facilitate the formation of a suitable abrasive article. For example, in one embodiment the slurry can be a Newtonian fluid having a viscosity of at least 0.1 mPa s and no more than 1 Pa s at a temperature of 25° C. and a shear rate of 1 l/s. The slurry can also be a non-Newtonian fluid having a viscosity of at least 1 mPa s and no more than 100 Pa s, or even not greater than about 10 Pa s, at the shear rate of 10 l/s as measured at a temperature of 25° C. Viscosity can be measured using a TA Instruments AR-G2 rotational rheometer using a setup of 25 mm parallel plates, a gap of approximately 2 mm, shear rates of 0.1 to 10 l/s at a temperature of 25° C.

The process of providing the abrasive particles may also include controlling the abrasive particle concentration (e.g., the first abrasive particle concentration, the second abrasive particle concentration, or a combination of first and second abrasive concentrations). Controlling the abrasive particle concentration can include at least one of controlling an amount of abrasive particles delivered to the tacking layer, a ratio of the amount of abrasive particles relative to an amount of the tacking layer, a ratio of the amount of abrasive particles relative to an amount of an additional layer comprising the flux material, a ratio of the amount of abrasive particles relative to the viscosity of the slurry, a position of the abrasive particles on the tacking layer, a position of the first type of abrasive particle on the tacking layer relative to a location of a second type of abrasive particle, a force of delivering the abrasive particles, and a combination thereof. In particular instances, controlling the abrasive particle concentration can include measuring the abrasive particle concentration during forming. Various methods of measuring can be used including mechanical, optical, and a combination thereof. Additionally, in certain embodiments, the process of controlling the abrasive particle concentration can include measuring the distribution of the abrasive particles on the substrate during forming the abrasive article and adjusting the amount of the abrasive particles deposited on the tacking layer based on a measured value. In an exemplary embodiment, the process of adjusting the amount of abrasive particles deposited on the substrate can include changing a deposition parameter based on the measured value, including for example, in the context of providing the abrasive particles via a spraying process, adjusting the process parameters of the spray nozzle (e.g., force of material being ejected, weight ratio of abrasive particles to other components, etc.). Some suitable examples of deposition parameters can include weight ratio of abrasive particles to carrier material (e.g., flux), delivery force used to apply abrasive particles, temperature, content of organics in carrier material or on substrate, atmospheric conditions of forming environment, and the like.

For at least one embodiment, the process of depositing the abrasive particles onto the tacking layer can include deposition, which more particularly can include spraying the abrasive particles onto the tacking layer. In certain processes, spraying can include using more than one nozzle. In more particular designs, more than one nozzle for delivery of the abrasive particles can be used, wherein the nozzles are arranged around the substrate in axis-symmetrical pattern.

Alternatively, the process of depositing the abrasive particles on the tacking layer can include translating the abrasive article having the tacking layer through a bed of abrasive particles. In certain instances, the bed can be a fluidized bed of abrasive particles.

Reference herein to abrasive particles can include reference to multiple types of abrasive particles, including for example, a first type of abrasive particle and a second type of abrasive particle different than the first type. According to at least one embodiment, the first type of abrasive particle can be different than the second type of abrasive particle based on at least one particle characteristic of the group consisting of hardness, friability, toughness, particle shape, crystalline structure, average particle size, composition, particle coating, grit size distribution, and a combination thereof.

The first type of abrasive particle can include a material such as an oxide, a carbide, a nitride, a boride, an oxynitride, an oxyboride, diamond, and a combination thereof. In certain embodiments, the first type of abrasive particle can incorporate a superabrasive material. For example, one suitable superabrasive material includes diamond. In particular instances, the first type of abrasive particle can consist essentially of diamond.

Moreover, the second type of abrasive particle can include a material such as an oxide, a carbide, a nitride, a boride, an oxynitride, an oxyboride, diamond, and a combination thereof. In certain embodiments, the second type of abrasive particle can incorporate a superabrasive material. For example, one suitable superabrasive material includes diamond. In particular instances, the second type of abrasive particle can consist essentially of diamond.

In one embodiment, the first type of abrasive particle can include a material having a Vickers hardness of at least about 10 GPa. In other instances, the first type of abrasive particle can have a Vickers hardness of at least about 25 GPa, such as at least about 30 GPa, at least about 40 GPa, at least about 50 GPa, or even at least about 75 GPa. Still, in at least one non-limiting embodiment, the first type of abrasive particle can have a Vickers hardness that is not greater than about 200 GPa, such as not greater than about 150 GPa, or even not greater than about 100 GPa. It will be appreciated that the first type of abrasive particle can have a Vickers hardness within a range between any of the minimum and maximum values noted above.

The second type of abrasive particle can include a material having a Vickers hardness of at least about 10 GPa. In other instances, the second type of abrasive particle can have a Vickers hardness of at least about 25 GPa, such as at least about 30 GPa, at least about 40 GPa, at least about 50 GPa, or even at least about 75 GPa. Still, in at least one non-limiting embodiment, the second type of abrasive particle can have a Vickers hardness that is not greater than about 200 GPa, such as not greater than about 150 GPa, or even not greater than about 100 GPa. It will be appreciated that the second type of abrasive particle can have a Vickers hardness within a range between any of the minimum and maximum values noted above.

In certain instances, the first type of abrasive particle can have a first average hardness (H1) and the second type of abrasive particle can have a second average hardness (H2) that is different than the first average hardness. In some examples, the first average hardness can be greater than the second average hardness. In still other instances, the first average hardness can be less than the second average hardness. According to yet another embodiment, the first average hardness can be substantially the same as the second average hardness.

For at least one aspect, the first average hardness can be at least about 5% different than the second average hardness based on the absolute value of the equation $((H1-H2)/H1) \times 100\%$. In one embodiment, the first average hardness is at least about 10% different, at least about 20% different, at least about 30% different, at least about 40% different, at least about 50% different, at least about 60% different, at least about 70% different, at least about 80% different, or even at least about 90% different than the second average hardness. Yet, in another non-limiting embodiment, the first average hardness may be not greater than about 99% different, such as not greater than about 90% different, not greater than about 80% different, not greater than about 70% different, not greater than about 60% different, not greater than about 50% different, not greater than about 40% different, not greater than about 30% different, not greater than about 20% different, not greater than about 10% different than the second average hardness. It will be appreciated that the difference between the first average hardness and the second average hardness can be within a range between any of the above minimum and maximum percentages.

In at least one embodiment, the first type of abrasive particle can have a first average particle size (P1) different than a second average particle size (P2) of the second type of abrasive particle. In some instances, the first average particle size can be greater than the second average particle size. In still other embodiment, the first average particle size can be less than the second average particle size. According to yet another embodiment, the first average particle size can be substantially the same as the second average particle size.

For a particular embodiment, the first type of abrasive particle can have a first average particle size (P1) and the second type of abrasive particle can have a second average particle size (P2), wherein the first average particle size is at least about 5% different than the second average particle size based on the absolute values of the equation $((P1-P2)/P1) \times 100\%$. In one embodiment, the first average particle size is at least about 10% different, such as at least about 20% different, at least about 30% different, at least about 40% different, at least about 50% different, at least about 60% different, at least about 70% different, at least about 80% different, or even at least about 90% different than the second average particle size. Yet, in another non-limiting embodiment, the first average particle size may be not greater than about 99% different, such as not greater than about 90% different, not greater than about 80% different, not greater than about 70% different, not greater than about 60% different, not greater than about 50% different, not greater than about 40% different, not greater than about 30% different, not greater than about 20% different, not greater than about 10% different than the second average particle size. It will be appreciated that the difference between the first average particle size and the second average particle size can be within a range between any of the above minimum and maximum percentages.

According to at least one embodiment, the first type of abrasive particle can have a first average particle size of not greater than about 500 microns, such as not greater than about 300 microns, not greater than about 200 microns, not greater than about 150 microns, or even not greater than about 100 microns. Yet, in a non-limiting embodiment, the first type of abrasive particle may have a first average particle size of at least about 0.1 microns, such as at least about 0.5 microns, at least about 1 micron, at least about 2 microns, at least about 5 microns, or even at least about 8 microns. It will be appreciated that the first average particle size can be within a range between any of the above minimum and maximum percentages.

For certain embodiments, the second type of abrasive particle can have a second average particle size of not greater than about 500 microns, such as not greater than about 300 microns, not greater than about 200 microns, not greater than about 150 microns, or even not greater than about 100 microns. Yet, in a non-limiting embodiment, the second type of abrasive particle may have a second average particle size of at least about 0.1 microns, such as at least about 0.5 microns, at least about 1 micron, at least about 2 microns, at least about 5 microns, or even at least about 8 microns. It will be appreciated that the second average particle size can be within a range between any of the above minimum and maximum percentages.

For a particular embodiment, the first type of abrasive particle can have a first average friability (F1) and the second type of abrasive particle can have a second average friability (F2). Moreover, the first average friability can be different than the second average friability, including greater than or less than the second average friability. Still, in another embodiment, the first average friability can be substantially the same as the second average friability.

According to one embodiment, the first average friability can be at least about 5% different than the second average friability based on the absolute values of the equation $((F1-F2)/F1) \times 100\%$. In one embodiment, the first average friability is at least about 10% different, such as at least about 20% different, at least about 30% different, at least about 40% different, at least about 50% different, at least about 60% different, at least about 70% different, at least about 80% different, or even at least about 90% different than the second average friability. Yet, in another non-limiting embodiment, the first average friability may be not greater than about 99% different, such as not greater than about 90% different, not greater than about 80% different, not greater than about 70% different, not greater than about 60% different, not greater than about 50% different, not greater than about 40% different, not greater than about 30% different, not greater than about 20% different, not greater than about 10% different than the second average friability.

It will be appreciated that the difference between the first average friability and the second average friability can be within a range between any of the above minimum and maximum percentages.

For a particular embodiment, the first type of abrasive particle can have a first average toughness (T1) and the second type of abrasive particle can have a second average toughness (T2). Moreover, the first average toughness can be different than the second average toughness, including greater than or less than the second average toughness. Still, in another embodiment, the first average toughness can be substantially the same as the second average toughness.

According to one embodiment, the first average toughness can be at least about 5% different than the second average toughness based on the absolute values of the equation $((T1-T2)/T1) \times 100\%$. In one embodiment, the first average toughness is at least about 10% different, such as at least about 20% different, at least about 30% different, at least about 40% different, at least about 50% different, at least about 60% different, at least about 70% different, at least about 80% different, or even at least about 90% different than the second average toughness. Yet, in another non-limiting embodiment, the first average toughness may be not greater than about 99% different, such as not greater than about 90% different, not greater than about 80% different, not greater than about 70% different, not greater than about 60% different, not greater than about 50% different, not greater than about 40% different, not greater than about 30% different, not greater than about 20% different, not greater than about 10% different than the second average toughness. It will be appreciated that the difference between the first average toughness and the second average toughness can be within a range between any of the above minimum and maximum percentages.

Particular abrasive articles of the embodiments herein may utilize particular contents of the first type of abrasive particle and the second type of abrasive particle relative to each other, which may facilitate improved performance. For example, the first type of abrasive particle can be present in a first content and the second type of abrasive particle may be present in a second content. According to one embodiment, the first content can be greater than the second content. Yet, in other instances, the second content can be greater than the first content. For still another embodiment, the first content can be substantially the same as the second content.

In at least one embodiment, the first type of abrasive particle can be present in a first content and the second type of abrasive particle can be present in a second content, and the relative amount of the first content to the second content based upon a numerical particle count can define a particle count ratio (FC:SC), wherein FC represents the first particle count content and SC represents the second particle count content. According to one embodiment, the particle count ratio (FC:SC) can be not greater than about 100:1, such as not greater than about 50:1, not greater than about 20:1, not greater than about 10:1, not greater than about 5:1, or even not greater than about 2:1. In one particular instance, the particle count ratio (FC:SC) can be approximately 1:1, such that the first content and second content (based on particle count) are substantially the same or essentially the same. Still, in another non-limiting embodiment, the particle count ratio (FC:SC) can be at least about 2:1, such as at least about 5:1, at least about 10:1, at least about 20:1, at least about 50:1, at least about 100:1. It will be appreciated that the particle count ratio can be defined by a range between any two ratios noted above.

According to another embodiment, the particle count ratio (FC:SC) can be not greater than about 1:100, such as not greater than about 1:50, not greater than about 1:20, not greater than about 1:10, not greater than about 1:5, not greater than about 1:2. Still, in another non-limiting embodiment, the particle count ratio (FC:SC) can be at least about 1:2, such as at least about 1:5, at least about 1:10, at least about 1:20, at least about 1:50, at least about 1:100. It will be appreciated that the particle count ratio can be defined by a range between any two ratios noted above. For example, the particle count ratio can be between 1:1 and 1:100, such as between about 1:2 and 1:100. In other instances, the particle count ratio may between 100:1 and 1:1, or even between about 100:1 and 2:1. Still, in a non-limiting embodiment, the particle count ratio may be between about 100:1 and 1:100, such as between about 50:1 and 1:50, such as between about 20:1 and 1:20, between about 10:1 and 1:10, between about 5:1 and 1:5, or even between about 2:1 and 1:2.

The content of the first type of abrasive particle and the second type of abrasive particle may be measured in another manner besides the particle count. For example, the first type of abrasive particle can be measured by a weight percent of the first type of abrasive particle for the total content of abrasive particles (P1 wt %) and the second type of abrasive particle can be measured by the weight percent of the second type of abrasive particle for the total content of abrasive particles (P2 wt %). According to one embodiment, the abrasive article can have a particle weight ratio (P1 wt %:P2 wt %), as defined by the relative weight percent of the first type of abrasive particle to the weight percent of the second type of abrasive particle. In one particular embodiment, the particle weight ratio can be not greater than about 100:1, such as not greater than about 50:1, not greater than about 20:1, not greater than about 10:1, not greater than about 5:1, not greater than about 2:1. Still, in one instance, the particle weight ratio (P1 wt %:P2 wt %) can be approximately 1:1, such that the first content and second content (based on weight percent) are substantially the same or essentially the same. Still, in another non-limiting embodiment, the particle weight ratio (P1 wt %:P2 wt %) can be at least about 2:1, such as at least about 5:1, at least about 10:1, at least about 20:1, at least about 50:1, at least about 100:1. It will be appreciated that the particle weight ratio (P1 wt %:P2 wt %) can be defined by a range between any two ratios noted above.

According to another embodiment, the particle weight ratio (P1 wt %:P2 wt %) can be not greater than about 1:100, such as not greater than about 1:50, not greater than about 1:20, not greater than about 1:10, not greater than about 1:5, not greater than about 1:2. Still, in another non-limiting embodiment, the particle weight ratio (P1 wt %:P2 wt %) can be at least about 1:2, such as at least about 1:5, at least about 1:10, at least about 1:20, at least about 1:50, at least about 1:100. It will be appreciated that the particle weight ratio (P1 wt %:P2 wt %) can be defined by a range between any two ratios noted above. For example, the particle weight ratio (P1 wt %:P2 wt %) can be between 1:1 and 1:100, such as between about 1:2 and 1:100. In other instances, the particle weight ratio (P1 wt %:P2 wt %) may between 100:1 and 1:1, or even between about 100:1 and 2:1. Still, in a non-limiting embodiment, the particle weight ratio (P1 wt %:P2 wt %) may be between about 100:1 and 1:100, such as between about 50:1 and 1:50, such as between about 20:1 and 1:20, between about 10:1 and 1:10, between about 5:1 and 1:5, or even between about 2:1 and 1:2.

The first type of abrasive particle can have a particular shape, such as a shape from the group including elongated, equiaxed, ellipsoidal, boxy, rectangular, triangular, irregular, and the like. The second type of abrasive particle may also have a particular shape, including for example, elongated, equiaxed, ellipsoidal, boxy, rectangular, triangular, and the like. It will be appreciated that the shape of the first type of abrasive particle can be different than the shape of the second type of abrasive particle. Alternatively, the first type of abrasive particle can have a shape that is substantially the same as the second type of abrasive particle.

Moreover, in certain instances, the first type of abrasive particle can have a first type of crystalline structure. Some exemplary crystalline structures can include multicrystalline, monocrystalline, polygonal, cubic, hexagonal, tetrahedral, octagonal, complex carbon structure (e.g., Bucky-ball), and a combination thereof. Additionally, the second type of abrasive particle can have a particular crystalline structure, such as multicrystalline, monocrystalline, cubic, hexagonal, tetrahedral, octagonal, a complex carbon structure (e.g., Bucky-ball), and a combination thereof. It will be appreciated that the crystalline structure of the first type of abrasive particle can be different than the crystalline structure of the second type of abrasive particle. Alternatively, the first type of abrasive particle can have a crystalline structure that is substantially the same as the second type of abrasive particle.

For a particular embodiment, the first type of abrasive particle can be defined by a wide grit size distribution, wherein at least 80% of the first type of abrasive particle has an average particle size contained within a range of at least about 30 microns over a range of average particle sizes between about 1 micron to about 100 microns. Additionally, the second type of abrasive particle may also be defined by a wide grit size distribution wherein at least 80% of the second type of abrasive particle has an average particle size contained within a range of at least about 30 microns over a range of average particle sizes between about 1 micron to about 100 microns.

In one embodiment, the wide grit size distribution can be a bimodal particle size distribution, wherein the bimodal particle size distribution comprises a first mode defining a first median particle size (M1) and a second mode defining a second median particle size (M2) that is different than the first median particle size. According to a particular embodiment, the first median particle size and second median particle size are at least 5% different based on the equation ((M1−M2)/M1)×100%. In still other embodiments, the first median particle size and the second median particle size can be at least about 10% different, such as at least about 20% different, at least about 30% different, at least about 40% different, at least about 50% different, at least about 60% different, at least about 70% different, at least about 80% different, or even at least about 90% different. Yet, in another non-limiting embodiment, the first median particle size may be not greater than about 99% different, such as not greater than about 90% different, not greater than about 80% different, not greater than about 70% different, not greater than about 60% different, not greater than about 50% different, not greater than about 40% different, not greater than about 30% different, not greater than about 20% different, or even not greater than about 10% different than the second median particle size. It will be appreciated that the difference between the first median particle size and the second median particle size can be within a range between any of the above minimum and maximum percentages.

For a particular embodiment, the first type of abrasive particle can include an agglomerated particle. More particularly, the first type of abrasive particle can consist essentially of an agglomerated particle. Moreover, the second type of abrasive particle may include an unagglomerated particle, and more particularly, may consist essentially of an unagglomerated particle. Still, it will be appreciated that the first and second type of abrasive particles may include an agglomerated particle or an unagglomerated particle. The first type of abrasive particle can be an agglomerated particle having a first average particle size and the second type of abrasive particle including an unagglomerated particle having a second average particle size different than the first average particle size. Notably, for one embodiment, the second average particle size can be substantially the same as the first average particle size.

According to an embodiment, an agglomerated particle can include abrasive particles bonded to each other by a binder material. Some suitable examples of a binder material can include an inorganic material, an organic material, and a combination thereof. More particularly, the binder material may be a ceramic, a metal, a glass, a polymer, a resin, and a combination thereof. In at least one embodiment, the binder material can be a metal or metal alloy, which may include one or more transition metal elements. According to an embodiment, the binder material can include at least one metal element from a component layer of the abrasive article, including for example, the barrier layer, the tacking layer, the bonding layer, the coating layer, and a combination thereof. For at least one abrasive article herein, at least a portion of the binder material can be the same material as used in the tacking layer, and more particularly, essentially all of the binder material can be the same material of the tacking layer. In yet another aspect, at least a portion of the binder material can be the same material as a bonding layer overlying the abrasive particles, and more particularly, essentially all of the binder material can be the same as the bonding layer.

In a more particular embodiment, the binder can be a metal material that includes at least one active binding agent. The active binding agent may be an element or composition including a nitride, a carbide, and combination thereof. One particular exemplary active binding agent can include a titanium-containing composition, a chromium-containing composition, a nickel-containing composition, a copper-containing composition and a combination thereof.

In another embodiment, the binder material can include a chemical agent configured to chemically react with a workpiece in contact with the abrasive article to facilitate a chemical removal process on the surface of the workpiece while the abrasive article is also conducting a mechanical removal process. Some suitable chemical agents can include oxides, carbides, nitrides, an oxidizer, pH modifier, surfactant, and a combination thereof.

The agglomerated particle of embodiments herein can include a particular content of abrasive particles, a particular content of binder material, and a particular content of porosity. For example, the agglomerated particle can include a greater content of abrasive particle than a content of binder material. Alternatively, the agglomerated particle can include a greater content of binder material than a content of abrasive particle. For example, in one embodiment, the agglomerated particle can include at least about 5 vol % abrasive particle for the total volume of the agglomerated particle. In other instances, the content of abrasive particles for the total volume of the agglomerated particle can be greater, such as at least about 10 vol %, such as at least about 20 vol %, at least about 30 vol %, at least about 40 vol %, at least about 50 vol %, at least about 60 vol %, at least about 70 vol %, at least about 80 vol %, or even at least about 90 vol %. Yet, in another non-limiting embodiment, the content of abrasive particles in an agglomerated particle for the total volume of the agglomerated particle can be not greater than about 95 vol %, such as not greater than about 90 vol %, not greater than about 80 vol %, not greater than about 70 vol %, not greater than about 60 vol %, not greater than about 50 vol %, not greater than about 40 vol %, not greater than about 30 vol %, not greater than about 20 vol %, or even not greater than about 10 vol %. It will be appreciated that the content of the abrasive particles in the agglomerated particle can be within a range between any of the above minimum and maximum percentages.

According to another aspect, the agglomerated particle can include at least about 5 vol % binder material for the total volume of the agglomerated particle. In other instances, the content of binder material for the total volume of the agglomerated particle can be greater, such as at least about 10 vol %, such as at least about 20 vol %, at least about 30 vol %, at least about 40 vol %, at least about 50 vol %, at least about 60 vol %, at least about 70 vol %, at least about 80 vol %, or even at least about 90 vol %. Yet, in another non-limiting embodiment, the content of binder material in an agglomerated particle for the total volume of the agglomerated particle can be not greater than about 95 vol %, such as not greater than about 90 vol %, not greater than about 80 vol %, not greater than about 70 vol %, not greater than about 60 vol %, not greater than about 50 vol %, not greater than about 40 vol %, not greater than about 30 vol %, not greater than about 20 vol %, or even not greater than about 10 vol %. It will be appreciated that the content of the binder material in the agglomerated particle can be within a range between any of the above minimum and maximum percentages.

In yet another aspect, the agglomerated particle can include a particular content of porosity. For example, the agglomerated particle can include at least about 1 vol % porosity for the total volume of the agglomerated particle. In other instances, the content of porosity for the total volume of the agglomerated particle can be greater, such as at least about 5 vol %, at least about 10 vol %, at least about 20 vol %, at least about 30 vol %, at least about 40 vol %, at least about 50 vol %, at least about 60 vol %, at least about 70 vol %, or even at least about 80 vol %. Yet, in another non-limiting embodiment, the content of porosity in an agglomerated particle for the total volume of the agglomerated particle can be not greater than about 90 vol %, not greater than about 80 vol %, not greater than about 70 vol %, not greater than about 60 vol %, not greater than about 50 vol %, not greater than about 40 vol %, not greater than about 30 vol %, not greater than about 20 vol %, or even not greater than about 10 vol %. It will be appreciated that the content of the porosity in the agglomerated particle can be within a range between any of the above minimum and maximum percentages.

The porosity within the agglomerated particle can be of various types. For example, the porosity can be closed porosity, generally defined by discrete pores that are spaced apart from each other within the volume of the agglomerated particle. In at least one embodiment, a majority of the porosity within the agglomerated particle can be closed porosity. Alternatively, the porosity can be open porosity, defining a network of interconnected channels extending through the volume of the agglomerated particle. In certain instances, a majority of the porosity can be open porosity.

The agglomerated particle can be sourced from a supplier. Alternatively, the agglomerated particle may be formed prior to the formation of the abrasive article. Suitable processes for forming the agglomerated particle can include screening, mixing, drying, solidifying, electroless plating, electrolyte plating, sintering, brazing, spraying, printing, and a combination thereof.

According to one particular embodiment, the agglomerated particle can be formed in-situ with the formation of the abrasive article. For example, the agglomerated particle may be formed while forming the tacking layer or while forming a bonding layer over the tacking layer. Suitable processes for forming the agglomerated particle in-situ with the abrasive article can include a deposition process. Particular deposition processes can include, but are not limited to, plating, electroplating, dipping, spraying, printing, coating, gravity coating, and a combination thereof. In at least one particular embodiment, the process of forming the agglomerated particle comprises simultaneously forming a bonding layer and the agglomerated particle via a plating process.

Still, according to another embodiment, any of the abrasive particles, including the first type or second type can be placed on the abrasive article during the formation of the bonding layer. The abrasive particles may be deposited on the tacking layer with the bonding layer via a deposition process. Some suitable exemplary deposition processes can include spraying, gravity coating, electroless plating, electrolyte plating, dipping, die coating, electrostatic coating, and a combination thereof, According to at least one embodiment, the first type of abrasive particle can have a first particle coating. Notably, the first particle coating layer can overlie the exterior surface of the first type of abrasive particle, and more particularly, may be in direct contact with the exterior surface of the first type of abrasive particle. Suitable materials for use as the first particle coating layer can include a metal or metal alloy. In accordance with one particular embodiment, the first particle coating layer can include a transition metal element, such as titanium, vanadium, chromium, molybdenum, iron, cobalt, nickel, copper, silver, zinc, manganese, tantalum, tungsten, and a combination thereof. One certain first particle coating layer can include nickel, such as a nickel alloy, and even alloys having a majority content of nickel, as measured in weight percent as compared to other species present within the first particle coating layer. In more particular instances, the first particle coating layer can include a single metal species. For example, the first particle coating layer can consist essentially of nickel. The first particle film layer can be a plated layer, such that it may be an electrolyte plated layer and an electroless plated layer.

The first particle coating layer can be formed to overlie at least a portion of the exterior surface of the first type of abrasive particle. For example, the first particle coating layer may overly at least about 50% of the exterior surface area of the abrasive particle. In other embodiments, the coverage of the first particle coating layer can be greater, such as at least about 75%, at least about 80%, at least about 90%, at least about 95%, or essentially the entire exterior surface of the first type of abrasive particle.

The first particle coating layer may be formed to have a particular content relative to the amount of the first type of abrasive particle to facilitate processing. For example, the first particle coating layer can be at least about 5% of the total weight of each of the first type of abrasive particle. In other instances, the relative content of the first particle coating layer to the total weight of each of the first type of abrasive particle can be greater, such as at least about 10%, at least about 20%, at least about 30%, at least about 40%, at least about 50%, at least about 60%, at least about 70%, or even at least about 80%. Yet, in another non-limiting embodiment, the relative content of the first particle coating layer to the total weight of each of the first type of abrasive particle may be not greater than about 100%, such as not greater than about 90%, not greater than about 80%, not greater than about 70%, not greater than about 60%, not greater than about 50%, not greater than about 40%, not greater than about 30%, not greater than about 20%, or even not greater than about 10%. It will be appreciated that the relative content of the first particle coating layer to the total weight of each of the first type of abrasive particle can be within a range between any of the minimum and maximum percentages noted above.

According to one embodiment, the first particle coating layer can be formed to have a particular thickness suitable to facilitate processing. For example, the first particle coating layer can have an average thickness of not greater than about 5 microns, such as not greater than about 4 microns, not greater than about 3 microns, or even not greater than about 2 microns. Still, according to one non-limiting embodiment, the first particle coating layer can have an average thickness of at least about 0.01 microns, 0.05 microns, at least about 0.1 microns, or even at least about 0.2 microns. It will be appreciated that the average thickness of the first particle coating layer can be within a range between any of the minimum and maximum values noted above.

According to certain aspects herein, the first particle coating layer can be formed of a plurality of discrete film layers. For example, the first particle coating layer can include a first particle film layer overlying the first type of abrasive particle, and a second particle film layer different than the first particle film layer overlying the first particle film layer. The first particle film layer may be in direct contact with an exterior surface of the first type of abrasive particle and the second particle film layer may be in direct contact with the first particle film layer.

In at least one aspect, the second particle film layer overlies at least about 50% of an exterior surface area of the first particle film layer on the first type of abrasive particle. In other instances, the second particle film overlies a greater surface area, such as at least about 75%, at least about 90%, or even essentially the entire exterior surface area of the first particle film layer of the first type of abrasive particle.

The first particle film layer can include any of the materials noted herein for the first particle coating layer, including for example, a metal, a metal alloy, and a combination thereof. In some instances, the first particle film layer may include a transition metal element, and more particularly, a metal such as titanium, vanadium, chromium, molybdenum, iron, cobalt, nickel, copper, silver, zinc, manganese, tantalum, tungsten, and a combination thereof. The first particle film layer may include a majority content of nickel, such that in some instances, the first particle film layer consists essentially of nickel. In yet another embodiment, the first particle film layer may consist essentially of copper.

The second particle film layer can include any of the materials noted herein for the first particle coating layer, including for example, a metal, a metal alloy, metal matrix composites, and a combination thereof. The second particle film layer may include the same material as the first particle film layer. However, in at least one embodiment, the second particle film layer includes a different material, and notably, may be completely distinct in composition from the first particle film layer. In some instances, the second particle film layer may include a transition metal element, and more particularly, a metal such as lead, silver, copper, zinc, tin, titanium, molybdenum, chromium, iron, manganese, cobalt, niobium, tantalum, tungsten, palladium, platinum, gold, ruthenium, and a combination thereof. The second particle film layer may include a majority content of tin, such that in some instances, the second particle film layer consists essentially of tin. In yet another embodiment, the second particle film layer may include a metal alloy of tin.

The second particle film layer may include a low temperature metal alloy (LTMA) material. The LTMA material can have a melting point of not greater than about 450° C., such as not greater than about 400° C., not greater than about 375° C., not greater than about 350° C., not greater than about 300° C., or even not greater than about 250° C. Still, according to at least one non-limiting embodiment, the LTMA material can have a melting point of at least about 100° C., such as at least about 125° C., or even at least about 150° C. It will be appreciated that the melting point of the LTMA material can be within a range between any of the minimum and maximum values noted above.

The first particle film layer can have an average thickness that is different than the average thickness of the second particle film layer. For example, in some instances, the first particle film layer can have an average thickness that is greater than the average thickness of the second particle film layer. In yet another embodiment, the first particle film layer can have an average thickness less than an average thickness of the second particle film layer. Still, in at least one non-limiting embodiment, the first particle film layer can have an average thickness substantially equal to the average thickness of the second particle film layer.

The first particle film layer may be present in a particular relative amount compared to the total weight of each of the first type of abrasive particle. For example, the relative content of the first particle film layer to the total weight of each of the first type of abrasive particle can be at least about 5%, such as at least about 10%, at least about 20%, at least about 30%, at least about 40%, at least about 50%, at least about 60%, at least about 70%, or even at least about 80%. Yet, in another non-limiting embodiment, the relative content of the first particle film layer to the total weight of each of the first type of abrasive particle may be not greater than about 100%, such as not greater than about 90%, not greater than about 80%, not greater than about 70%, not greater than about 60%, not greater than about 50%, not greater than about 40%, not greater than about 30%, not greater than about 20%, or even not greater than about 10%. It will be appreciated that the relative content of the first particle film layer to the total weight of each of the first type of abrasive particle can be within a range between any of the minimum and maximum percentages noted above.

The second particle film layer may be present in a particular relative amount compared to the total weight of each of the first type of abrasive particle and the first particle film layer. For example, the relative content of the second particle film layer to the total weight of each of the first type of abrasive particle and the first particle film layer can be at least about 5%, such as at least about 10%, at least about 20%, at least about 30%, at least about 40%, at least about 50%, at least about 60%, at least about 70%, or even at least about 80%. Yet, in another non-limiting embodiment, the relative content of the second particle film layer to the total weight of each of the first type of abrasive particle and the first particle film layer may be not greater than about 200%, such as not greater than about 150%, not greater than about 120%, not greater than about 100%, not greater than about 80%, not greater than about 60%, not greater than about 50%, not greater than about 40%, not greater than about 30%, or even not greater than about 20%. It will be appreciated that the relative content of the second particle film layer to the total weight of each of the first type of abrasive particle and the first particle film layer can be within a range between any of the minimum and maximum percentages noted above.

According to one embodiment, the first particle film layer can be formed to have a particular thickness suitable to facilitate processing. For example, the first particle film layer can have an average thickness of not greater than about 5 microns, such as not greater than about 4 microns, not greater than about 3 microns, or even not greater than about 2 microns. Still, according to one non-limiting embodiment, the first particle film layer can have an average thickness of at least about 0.01 microns, 0.05 microns, at least about 0.1 microns, or even at least about 0.2 microns. It will be appreciated that the average thickness of the first particle film layer can be within a range between any of the minimum and maximum values noted above.

According to one embodiment, the second particle film layer can be formed to have a particular thickness suitable to facilitate processing. For example, the second particle film layer can have an average thickness of not greater than about 5 microns, such as not greater than about 4 microns, not greater than about 3 microns, or even not greater than about 2 microns. Still, according to one non-limiting embodiment, the second particle film layer can have an average thickness of at least about 0.05 microns, 0.1 microns, at least about 0.3 microns, or even at least about 0.5 microns. It will be appreciated that the average thickness of the second particle film layer can be within a range between any of the minimum and maximum values noted above.

In yet another aspect, the first particle film layer can be formed to have a particular thickness relative to the first average particle size of the first type of abrasive particle, suitable to facilitate processing. For example, the first particle film layer can have an average thickness of not greater than about 50% of the first average particle size. In other embodiments, the average thickness of the first particle film layer relative to the first average particle size can be less, such as not greater than about 45%, not greater than about 40%, not greater than about 35%, not greater than about 30%, not greater than about 25%, not greater than about 20%, not greater than about 15%, not greater than about 10%, or even not greater than about 5%. Still, in at least one non-limiting embodiment, the average thickness of the first particle film layer relative to the first average particle size can be at least about 1%, at least about 5%, at least about 10%, at least about 15%, at least about 20%, at least about 25%, at least about 30%, at least about 40%, or even at least about 45%. It will be appreciated that the average thickness of the first particle film layer relative to the first average particle size can be within a range between any of the minimum and maximum percentages noted above.

According to another embodiment, the second particle film layer can be formed to have a particular thickness relative to the first average particle size of the first type of abrasive particle, suitable to facilitate processing. For example, the second particle film layer can have an average thickness of not greater than about 50% of the first average particle size. In other embodiments, the average thickness of the second particle film layer relative to the first average particle size can be less, such as not greater than about 45%, not greater than about 40%, not greater than about 35%, not greater than about 30%, not greater than about 25%, not greater than about 20%, not greater than about 15%, not greater than about 10%, or even not greater than about 5%. Still, in at least one non-limiting embodiment, the average thickness of the second particle film layer relative to the first average particle size can be at least about 1%, at least about 5%, at least about 10%, at least about 15%, at least about 20%, at least about 25%, at least about 30%, at least about 40%, or even at least about 45%. It will be appreciated that the average thickness of the second particle film layer relative to the first average particle size can be within a range between any of the minimum and maximum percentages noted above.

It will further be appreciated that the second type of abrasive particle can include a second particle coating layer. The second particle coating layer can include any of the features of the first particle coating layer, including properties, features, and characteristics relative to the second type of abrasive particle.

After placing the abrasive particles (e.g., the first type of abrasive particles, the second type of abrasive particles, and any other types) on the tacking layer at step 104, the process can continue at step 105 by treating the tacking layer to bind the abrasive particles in the tacking layer. Treating may include processes such as heating, curing, drying, melting, sintering, solidification and a combination thereof. In one particular embodiment, treating includes a thermal process, such as heating the tacking layer to a temperature sufficient to induce melting of the tacking layer, while avoiding excessive temperatures to limit damage to the abrasive particles and substrate. For example, treating can include heating the substrate, tacking layer, and abrasive particles to a temperature of not greater than about 450° C. Notably, the process of treating can be conducted at a treating temperature that is less, such as not greater than about 375° C., not greater than about 350° C., not greater than about 300° C., or even not greater than about 250° C. In other embodiments, the process of treating can include heating the tacking layer to a melting point of at least about 100° C., at least about 150° C., or even at least about 175° C.

It will be appreciated that the heating process can facilitate melting of materials within the tacking layer and additional layers comprising the flux material to bond the abrasive particles to the tacking layer and the substrate. The heating process can facilitate the formation of a particular bond between the abrasive particle and the tacking layer. Notably, in the context of coated abrasive particles, a metallic bonding region can be formed between the particle coating material (e.g., the first particle coating layer and second particle coating layer) of the abrasive particles and the tacking layer material. The metallic bonding region can be characterized by diffusion bond region having an inter-diffusion between at least one chemical species of the tacking layer and at least one species of the particle coating layer overlying the abrasive particles, such that the metallic bonding region comprises a mixture of chemical species from the two component layers.

After forming the tacking layer and applying the additional layers for facilitate binding of the abrasive particles, the excess material of the additional layers can be removed. For example, according to an embodiment, a cleaning process may be utilized to remove the excess additional layers, such as residual flux material. According to one embodiment, the cleaning process may utilize one or a combination of water, acids, bases, surfactants, catalysts, solvents, and a combination thereof. In one particular embodiment, the cleaning process can be a staged process, starting with a rinse of the abrasive article using a generally neutral material, such as water or deionized water. The water may be room temperature or hot, having a temperature of at least about 40° C. After the rinsing operation the cleaning process may include an alkaline treatment, wherein the abrasive article is traversed through a bath having a particular alkalinity, which may include an alkaline material. The alkaline treatment may be conducted at room temperature, or alternatively, at elevated temperatures. For example, the bath of the alkaline treatment may have a temperature of at least about 40° C., such at least about 50° C., or even at least about 70° C., and not greater than about 200° C. The abrasive article may be rinsed after the alkaline treatment.

After the alkaline treatment, the abrasive article may undergo an activation treatment. The activation treatment may include traversing the abrasive article through a bath having a particular element or compound, including an acid, a catalyst, a solvent, a surfactant, and a combination thereof. In one particular embodiment, the activation treatment can include an acid, such as a strong acid, and more particularly hydrochloric acid, sulfuric acid, and a combination thereof. In some instances, the activation treatment can include a catalyst that may include a halide or halide-containing material. Some suitable examples of catalysts can include potassium hydrogen fluoride, ammonium bifluoride, sodium bifluoride, and the like.

The activation treatment may be conducted at room temperature, or alternatively, at elevated temperatures. For example, the bath of the activation treatment may have a temperature of at least about 40° C., but not greater than about 200° C. The abrasive article may be rinsed after the activation treatment.

According to one embodiment, after suitably cleaning the abrasive article, an optional process may be utilized to facilitate the formation of abrasive particles having exposed surfaces after complete formation of the abrasive article. For example, in one embodiment, an optional process of selectively removing at least a portion of the particle coating layer on the abrasive particles may be utilized. The selective removal process may be conducted such that the material of the particle coating layer is removed while other materials of the abrasive article, including for example, the tacking layer are less affected, or even essentially unaffected. According to a particular embodiment, the process of selectively removing comprises etching. Some suitable etching processes can include wet etching, dry etching, and a combination thereof. In certain instances, a particular etchant may be used that is configured to selectively remove the material of the particle coating layer of the abrasive particles and leaving the tacking layer intact. Some suitable etchants can include nitric acid, sulfuric acid, hydrochloride acid, organic acid, nitric salt, sulfuric salt, chloride salt, alkaline cyanide based solutions, and a combination thereof.

As described herein, the abrasive article can include a first type of abrasive particle and a second type of abrasive particle different than the first type of abrasive particle. In certain instances, the selective removal process can be conducted on only the first type of abrasive particle, only the second type of abrasive particle, or both the first type of abrasive particle and the second type of abrasive particle. Selective removal of the particle coating layer of either the first type or second type may be facilitated by the use of a first type of abrasive particle having a first particle coating layer different than the second particle coating layer of the second type of abrasive particle.

In yet another embodiment, the formation of abrasive particles having exposed surfaces (See, for example, FIGS. 12A and 12B) can be facilitated by the use of abrasive particles having a particle coating layer that is discontinuous. That is, the particle coating layer can overlie a fraction of the total exterior surface area, such that the particle coating layer has gaps or openings in the coating layer. Such particles may also facilitate the formation of abrasive particles having exposed surfaces without the necessarily utilizing a selective removal process.

After treating the tacking layer at step 105, the process can continue at step 106, by forming a bonding layer over the tacking layer and abrasive particles. Formation of the bonding layer can facilitate formation of an abrasive article having improved performance, including but not limited to, wear resistance and particle retention. Furthermore, the bonding layer can enhance abrasive particle retention for the abrasive article. In accordance with an embodiment, the process of forming the bonding layer can include deposition of the bonding layer on the external surface of the article defined by the abrasive particles and the tacking layer. In fact, the bonding layer can be bonded directly to the abrasive particles and the tacking layer.

Forming the bonding layer can include a deposition process. Some suitable deposition processes can include plating (electrolyte or electroless), spraying, dipping, printing, coating, and a combination thereof. In accordance with one particular embodiment, the bonding layer can be formed by a plating process. For at least one particular embodiment, the plating process can be an electrolyte plating process. In another embodiment, the plating process can include an electroless plating process.

The bonding layer can be formed such that it can directly contact at least a portion of the tacking layer, a portion of the first type of abrasive particle, a portion of the second type of abrasive particle, the particle coating layer on the first type of abrasive particle, the particle coating layer on the second type of abrasive particle, and a combination thereof.

The bonding layer can overlie a majority of an external surface of the substrate and an external surface of the first type of abrasive particle. Moreover, in certain instances, the bonding layer can overlie a majority of an external surface of the substrate and an external surface of the second type of abrasive particle. In certain embodiments, the bonding layer can be formed such that it overlies at least 90% of the exposed surfaces of the abrasive particles and tacking layer. In other embodiments, the coverage of the bonding layer can be greater, such that it overlies at least about 92%, at least about 95%, or even at least about 97% of the exposed surfaces of the abrasive particles and tacking layer. In one particular embodiment, the bonding layer can be formed such that it can overlie essentially all of the external surfaces of the first type of abrasive particle, the second type of abrasive particle, and the substrate, thus defining the exterior surface of the abrasive article.

Still, in an alternative embodiment, the bonding layer can be selectively placed, such that exposed regions can be formed on the abrasive article. Further description of a selectively formed bonding layer with exposed surfaces of diamond are provided herein.

The bonding layer can be made of a particular material, such as an organic material, inorganic material, and a combination thereof. Some suitable organic materials can include polymers such as a UV curable polymer, thermosets, thermoplastics, and a combination thereof. Some other suitable polymer materials can include urethanes, epoxies, polyimides, polyamides, acrylates, polyvinyls, and a combination thereof.

Suitable inorganic materials for use in the bonding layer can include metals, metal alloys, cermets, ceramics, composites, and a combination thereof. In one particular instance, the bonding layer can be formed of a material having at least one transition metal element, and more particularly a metal alloy containing a transition metal element. Some suitable transition metal elements for use in the bonding layer can include lead, silver, copper, zinc, tin, titanium, molybdenum, chromium, iron, manganese, cobalt, niobium, tantalum, tungsten, palladium, platinum, gold, ruthenium, and a combination thereof. In certain instances, the bonding layer can include nickel, and may be a metal alloy comprising nickel, or even a nickel-based alloy. In still other embodiments, the bonding layer can consist essentially of nickel.

In accordance with one embodiment, the bonding layer can be made of a material, including for example, composite materials, having a hardness that is greater than a hardness of the tacking layer. For example, the bonding layer can have a Vickers hardness that is at least about 5% harder than a Vickers hardness of the tacking layer based on the absolute values of the equation $((Hb-Ht)/Hb) \times 100\%$, wherein Hb represents the hardness of the bonding layer and Ht represents the hardness of the tacking layer. In one embodiment, the bonding layer can be at least about 10% harder, such as at least about 20% harder, at least about 30% harder, at least about 40% harder, at least about 50% harder, at least about 75% harder, at least about 90% harder, or even at least about 99% harder than the hardness of the tacking layer. Yet, in another non-limiting embodiment, the bonding layer may be not greater than about 99% harder, such as not greater than about 90% harder, not greater than about 80% harder, not greater than about 70% harder, not greater than about 60% harder, not greater than about 50% harder, not greater than about 40% harder, not greater than about 30% harder, not greater than about 20% harder, not greater than about 10% harder than the hardness of the tacking layer. It will be appreciated that the difference between the hardness of the bonding layer and the tacking layer can be within a range between any of the above minimum and maximum percentages.

Additionally, the bonding layer can have a fracture toughness (K1c) as measured by indentation method, that is at least about 5% greater than an average fracture toughness of the tacking layer based on the absolute values of the equation $((Tb-Tt)/Tb) \times 100\%$, wherein Tb represents the fracture toughness of the bonding layer and Tt represents the fracture toughness of the tacking layer. In one embodiment, the bonding layer can have a fracture toughness of at least about 8% greater, such as at least about 10% greater, at least about 15% greater, at least about 20% greater, at least about 25% greater, at least about 30% greater, or even at least about 40% greater than the fracture toughness of the tacking layer. Yet, in another non-limiting embodiment, the fracture toughness of the bonding layer may be not greater than about 90% greater, such as not greater than about 80% greater, not greater than about 70% greater, not greater than about 60% greater, not greater than about 50% greater, not greater than about 40% greater, not greater than about 30% greater, not greater than about 20% greater, or even not greater than about 10% greater than the fracture toughness of the tacking layer. It will be appreciated that the difference between the fracture toughness of the bonding layer and the fracture toughness of the tacking layer can be within a range between any of the above minimum and maximum percentages.

Optionally, the bonding layer can include a filler material. The filler can be various materials suitable for enhancing performance properties of the finally-formed abrasive article. Some suitable filler materials can include abrasive particles, pore-formers such as hollow sphere, glass spheres, bubble alumina, natural materials such as shells and/or fibers, metal particles, and a combination thereof.

In one particular embodiment, the bonding layer can include a filler in the form of abrasive particles that may represent a third type of abrasive particle, which can be the same as or different from the first type of abrasive particle and the second type of abrasive particle. The abrasive particle filler can be significantly different than the first type and second type of abrasive particles, particularly with regard to size, such that in certain instances the abrasive particle filler can have an average particle size that is substantially less than the average particle size of the first type and second type of abrasive particles bonded to the tacking layer. For example, the abrasive particle filler can have an average grain size that is at least about 2 times less than the average particle size of the abrasive particles. In fact, the abrasive filler may have an average particle size that is even smaller, such as on the order of at least 3 times less, such as at least about 5 times less, at least about 10 times less, and particularly within a range between about 2 times and about 10 times less than the average particle size of the first type of abrasive particle, second type of abrasive particle, or both.

The abrasive grain filler within the bonding layer can be made from a material such as carbides, carbon-based materials (e.g. fullerenes), diamond, borides, nitrides, oxides, oxynitrides, oxyborides, and a combination thereof. In particular instances, the abrasive grain filler can be a superabrasive material such as diamond, cubic boron nitride, or a combination thereof.

After forming the bonding layer at step 106, the process may optionally continue at step 107, with forming a coating layer overlying the bonding layer. In particular, the coating layer may be overlying the substrate, overlying the optional barrier layer, overlying the tacking film, overlying at least a portion of the abrasive particles (e.g., first type and/or second type of abrasive particles), and overlying at least a portion of the bonding layer, and a combination thereof. In at least one instance, the coating layer can be formed such that it is in direct contact with at least a portion of the bonding layer, at least a portion of the abrasive particles (e.g., first type and/or second type of abrasive particles), and a combination thereof.

Forming of the coating layer can include a deposition process. Some suitable deposition processes can include plating (electrolyte or electroless), spraying, dipping, printing, coating, and a combination thereof. In accordance with one particular embodiment, the coating layer can be formed by a plating process, and more particularly, can be electroplated directly to an external surface of the first type of abrasive particle and the second type of abrasive particle. In another embodiment, the coating layer can be formed via a dip coating process. According to yet another embodiment, the coating layer can be formed via spraying process.

The coating layer can overlie a portion of an exterior surface area of the bonding layer, abrasive particles, and a combination thereof. For example, the coating layer can overlie at least about 25% of an exterior surface area of the abrasive particle and the bonding layer. In still another design herein, the bonding layer can overlie a majority of an external surface of the bonding layer. Moreover, in certain instances, the coating layer can overlie a majority of an external surface of the bonding layer and abrasive particles. In certain embodiments, the coating layer can be formed such that it overlies at least 90% of the exposed surfaces of the abrasive particles and bonding layer. In other embodiments, the coverage of the coating layer can be greater, such that it overlies at least about 92%, at least about 95%, or even at least about 97% of the exposed surfaces of the abrasive particles and bonding layer. In one particular embodiment, the coating layer can be formed such that it can overlie essentially all of the external surfaces of the first type of abrasive particle, the second type of abrasive particle, and the bonding layer, thus defining the exterior surface of the abrasive article.

The coating layer can include an organic material, an inorganic material, and a combination thereof. According to one aspect, the coating layer can include a material such as a metal, metal alloy, cermet, ceramic, organic, glass, and a combination thereof. More particularly, the coating layer can include a transition metal element, including for example, a metal from the group of titanium, vanadium, chromium, molybdenum, iron, cobalt, nickel, copper, silver, zinc, manganese, tantalum, tungsten, and a combination thereof. For certain embodiments, the coating layer can include a majority content of nickel, and in fact, may consist essentially of nickel. Alternatively, the coating layer can include a thermoset, a thermoplastic, and a combination thereof. In one instance, the coating layer includes a resin material and may be essentially free of a solvent.

In one particular embodiment, the coating layer can include a filler material, which may be a particulate material. For certain embodiments, the coating layer filler material can be in the form of abrasive particles, which may represent a third type of abrasive particle that can be the same as or different from the first type of abrasive particle and the second type of abrasive particle. Certain suitable types of abrasive particles for use as the coating layer filler material can include carbides, carbon-based materials (e.g., diamond), borides, nitrides, oxides, and a combination thereof. Some alternative filler materials can include pore-formers such as hollow sphere, glass spheres, bubble alumina, natural materials such as shells and/or fibers, metal particles, and a combination thereof.

The coating filler material be significantly different than the first type and second type of abrasive particles, particularly with regard to size, such that in certain instances the abrasive particle filler material can have an average particle size that is substantially less than the average particle size of the first type and second type of abrasive particles bonded to the tacking layer. For example, the coating layer filler material can have an average particle size that is at least about 2 times less than the average particle size of the abrasive particles. In fact, the coating layer filler material may have an average particle size that is even smaller, such as on the order of at least 3 times less, such as at least about 5 times less, at least about 10 times less, and particularly within a range between about 2 times and about 10 times less than the average particle size of the first type of abrasive particle, second type of abrasive particle, or both.

Figure 2A:
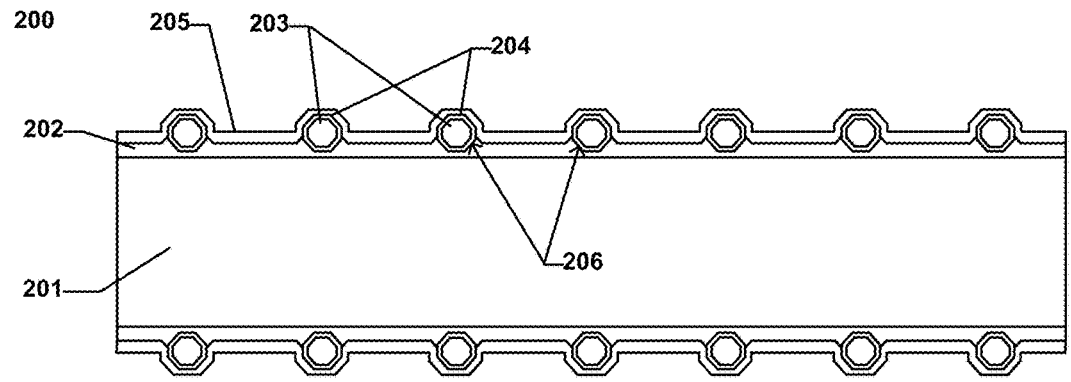
FIG. 2A includes a cross-sectional illustration of a portion of an abrasive article in accordance with an embodiment.
Figure 2B:
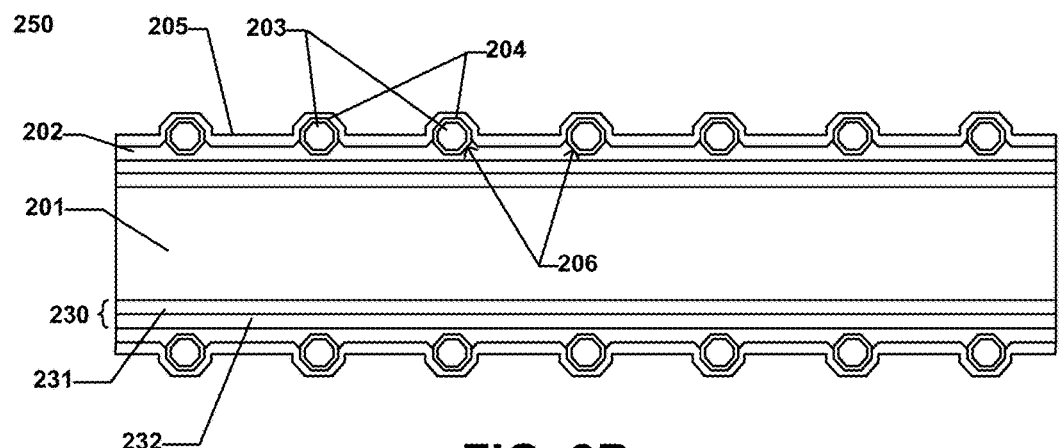
FIG. 2B includes a cross-sectional illustration of a portion of an abrasive article including a barrier layer in accordance with an embodiment.

FIG. 2A includes a cross-sectional illustration of a portion of an abrasive article in accordance with an embodiment. FIG. 2B includes a cross-sectional illustration of a portion of an abrasive article including an optional barrier layer in accordance with an embodiment. As illustrated, the abrasive article 200 can include a substrate 201, which is in the form of an elongated body, such as a wire. As further illustrated, the abrasive article can include a tacking layer 202 disposed over the entire external surface of the substrate 201. Furthermore, the abrasive article 200 can include abrasive particles 203 including a coating layer 204 overlying the abrasive particles 203. The abrasive particles 203 can be bonded to the tacking layer 202. In particular, the abrasive particles 203 can be bonded to the tacking layer 202 at the interface 206, wherein a metallic bonding region can be formed as described herein.

The abrasive article 200 can include a particle coating layer 204 overlying the external surfaces of the abrasive particles 203. Notably, the coating layer 204 can be in direct contact with the tacking layer 202. As described herein, the abrasive particles 203, and more particularly, the particle coating layer 204 of the abrasive particles 203, can form a metallic bonding region at the interface between the coating layer 204 and the tacking layer 202.

According to one embodiment, the tacking layer 202 can have a particular average thickness as compared to the average particle size of the abrasive particles 203. It will be appreciated that reference herein to an average particle size can include reference to the first average particle size of the first type of abrasive particle, the second average particle size of the second type of abrasive particle, or a total average particle size, which is an average of the first average particle size and the second average particle size. Furthermore, to the extent that the abrasive article includes a third type of abrasive particle, the foregoing also applies.

The tacking layer 202 can have an average thickness that is not greater than about 80% of the average particle size of the abrasive particles 203 (i.e., the first average particle size of the first type of abrasive particles, the second average particle size of the second type of abrasive particles, or the total average particle size). The relative average thickness of the tacking layer to the average particle size can be calculated by the absolute value of the equation (Tt/Tp)×100%, wherein Tp represents the average particle size and Tt represents the average thickness of the tacking layer. In other abrasive articles, the tacking layer 202 can have an average thickness of not greater than about 70%, such as not greater than about 60%, not greater than about 50%, not greater than about 40%, not greater than about 30%, not greater than about 25%, or even not greater than about 20% of the average particle size of the abrasive particles 203. Still, in certain instances the average thickness of the tacking layer 202 can be at least about 2%, such as at least about 3%, such as at least about 5%, at least about 8%, at least about 10%, at least about 11%, at least about 12%, or even at least about 13% of the average particle size of the abrasive particles 203. It will be appreciated that the tacking layer 202 can have an average thickness within a range between any of the minimum and maximum percentages noted above.

In alternative terms, according to certain abrasive articles, the tacking layer 202 can have an average thickness that is not greater than about 25 microns. In still other embodiments, the tacking layer 202 can have an average thickness that is not greater than about 20 microns, such as not greater than about 10 microns, not greater than about 8 microns, or even not greater than about 5 microns. In accordance with an embodiment, the tacking layer 202 can have an average thickness that is at least about 0.1 microns, such as at least about 0.2 microns, at least about 0.5 micron, or even at least about 1 micron. It will be appreciated that the tacking layer 202 can have an average thickness within a range between any of the minimum and maximum values noted above.

In particular instances, for nickel coated abrasive particles having an average particle size of less than about 20 microns, the average thickness of the tacking layer can be at least about 0.5 micron. Further, the average thickness can be at least about 1.0 microns, or even at least about 1.5 microns. The average thickness can be limited, however, such as not greater than about 5.0 microns, not greater than about 4.5 microns, not greater than about 4.0 microns, not greater than about 3.5 microns, or even not greater than 3.0 microns. For abrasive particles having an average particle size within a range of 10 and 20 microns, the tacking layer 202 can have an average thickness within a range between and including any of the minimum and maximum thickness values noted above.

Alternatively, for nickel coated abrasive particles having an average particle size of at least about 20 microns, and more particularly within a range of about 40-60 microns, the average thickness of the tacking layer can be at least about 1 micron. Further, the average thickness can be at least about 1.25 microns, at least about 1.5 microns, at least about 1.75 microns, at least about 2.0 microns, at least about 2.25 microns, at least about 2.5 microns, or even at least about 3.0 microns. The average thickness can be limited, however, such as not greater than about 8.0 microns, not greater than about 7.5 microns, not greater than 7.0 microns, not greater than 6.5 microns, not greater than 6.0 microns, not greater than 5.5 microns, not greater than 5.0 microns, not greater than 4.5 microns, or even not greater than 4.0 microns. For abrasive particles having an average particle size within a range of 40 and 60 microns, the tacking layer 202 can have an average thickness within a range between and including any of the minimum and maximum values noted above.

In another aspect, the abrasive article can be formed to have a ratio (C/ttl). In the ratio (C/ttl), C represents the concentration of abrasive particles in particles per mm of substrate and ttl represents the tacking layer thickness in percent of the average abrasive particle size. Control of the ratio (C/ttl) can facilitate suitable formation of abrasive articles according to the embodiments and may further facilitate improved performance of the abrasive articles of the embodiments herein. In certain embodiments, the ratio C/ttl may be at least about 2, such as, at least about 3, at least about 4, at least about 5, at least about 6, at least about 7, at least about 8, at least about 9, at least about 10, at least about 15 or even at least about 20. In still other embodiments, the ratio C/ttl may be not greater than about 25, such as, not greater than about 20, not greater than about 15, not greater than about 10, not greater than about 9, not greater than about 8, not greater than about 7, not greater than about 6, not greater than about 5, not greater than about 4, not greater than about 3 or even not greater than about 2. It will be appreciated that the ratio C/ttl may be any value within a range between any of the minimum and maximum values noted above.

In certain embodiments, the ratio C/ttl may be at least about 2 for a particle concentration of at least about 10 particles per mm of substrate. In other embodiments, the ratio C/ttl may be at least about 2 for a particle concentration of at least about 11 particles per mm of substrate, at least about 12 particles per mm substrate, or even at least about 13 particles per mm of substrate. In one non-limiting embodiment, the ratio may be at least about 2 for a particle concentration of not greater than about 150 particles per mm of substrate, such as not greater than about 140 particles per mm of substrate, not greater than about 130 particles per mm of substrate, not greater than about 120 particles per mm of substrate. It will be appreciated that the ratio C/ttl may have a value of about 2 for a concentration of particles within a range between any of the minimum and maximum values noted above.

For yet another embodiment, the ratio C/ttl may be at least about 5 for a particle concentration of at least about 10 particles per mm of substrate. In other embodiments, the ratio C/ttl may be at least about 5 for a particle concentration of at least about 11 particles per mm of substrate, at least about 12 particles per mm substrate, or even at least about 13 particles per mm of substrate. In one non-limiting embodiment, the ratio may be at least about 5 for a particle concentration of not greater than about 150 particles per mm of substrate, such as not greater than about 140 particles per mm of substrate, not greater than about 130 particles per mm of substrate, not greater than about 120 particles per mm of substrate. It will be appreciated that the ratio C/ttl may have a value of about 5 for a concentration of particles within a range between any of the minimum and maximum values noted above.

For yet another embodiment, the ratio C/ttl may be at least about 8 for a particle concentration of at least about 10 particles per mm of substrate. In other embodiments, the ratio C/ttl may be at least about 8 for a particle concentration of at least about 11 particles per mm of substrate, at least about 12 particles per mm substrate, or even at least about 13 particles per mm of substrate. In one non-limiting embodiment, the ratio may be at least about 8 for a particle concentration of not greater than about 150 particles per mm of substrate, such as not greater than about 140 particles per mm of substrate, not greater than about 130 particles per mm of substrate, not greater than about 120 particles per mm of substrate. It will be appreciated that the ratio C/ttl may have a value of about 8 for a concentration of particles within a range between any of the minimum and maximum values noted above.

For yet another embodiment, the ratio C/ttl may be at least about 10 for a particle concentration of at least about 10 particles per mm of substrate. In other embodiments, the ratio C/ttl may be at least about 10 for a particle concentration of at least about 11 particles per mm of substrate, at least about 12 particles per mm substrate, or even at least about 13 particles per mm of substrate. In one non-limiting embodiment, the ratio may be at least about 10 for a particle concentration of not greater than about 150 particles per mm of substrate, such as not greater than about 140 particles per mm of substrate, not greater than about 130 particles per mm of substrate, not greater than about 120 particles per mm of substrate. It will be appreciated that the ratio C/ttl may have a value of at least about 10 for a concentration of particles within a range between any of the minimum and maximum values noted above.

For yet another embodiment, the ratio C/ttl may be at least about 15 for a particle concentration of at least about 10 particles per mm of substrate. In other embodiments, the ratio C/ttl may be at least about 15 for a particle concentration of at least about 11 particles per mm of substrate, at least about 12 particles per mm substrate, or even at least about 13 particles per mm of substrate. In one non-limiting embodiment, the ratio may be at least about 15 for a particle concentration of not greater than about 150 particles per mm of substrate, such as not greater than about 140 particles per mm of substrate, not greater than about 130 particles per mm of substrate, not greater than about 120 particles per mm of substrate. It will be appreciated that the ratio C/ttl may have a value of about 15 for a concentration of particles within a range between any of the minimum and maximum values noted above.

For yet another embodiment, the ratio C/ttl may be at least about 20 for a particle concentration of at least about 10 particles per mm of substrate. In other embodiments, the ratio C/ttl may be at least about 20 for a particle concentration of at least about 11 particles per mm of substrate, at least about 12 particles per mm substrate, or even at least about 13 particles per mm of substrate. In one non-limiting embodiment, the ratio may be at least about 20 for a particle concentration of not greater than about 150 particles per mm of substrate, such as not greater than about 140 particles per mm of substrate, not greater than about 130 particles per mm of substrate, not greater than about 120 particles per mm of substrate. It will be appreciated that the ratio C/ttl may have a value of about 20 for a concentration of particles within a range between any of the minimum and maximum values noted above.

As further illustrated, the bonding layer 205 can be directly overlying and directly bonded to the abrasive particles 203 and the tacking layer 202. According to an embodiment, the bonding layer 205 can be formed to have a particular thickness. For example, the bonding layer 205 can have an average thickness of at least about 5% of the average particle size of the abrasive particles 203 (i.e., the first average particle size of the first type of abrasive particles, the second average particle size of the second type of abrasive particles, or the total average particle size). The relative average thickness of the bonding layer to the average particle size can be calculated by the absolute value of the equation (Tb/Tp)×100%, wherein Tp represents the average particle size and Tb represents the average thickness of the bonding layer. In other embodiments, the average thickness of the bonding layer 205 can be greater, such as at least about 10%, at least about 15%, at least about 20%, at least about 30%, or even at least about 40%. Still, the average thickness of the bonding layer 205 can be limited, such that it is not greater than about 100%, not greater than about 90%, not greater than about 85%, or even not greater than about 80% of the average particle size of the abrasive particles 203. It will be appreciated that the bonding layer 205 can have an average thickness within a range between any of the minimum and maximum percentages noted above.

In more particular instances, the bonding layer 205 can be formed to have an average thickness that is at least 1 micron. For other abrasive articles, the bonding layer 205 can have a greater average thickness, such as at least about 2 microns, at least about 3 microns, at least about 4 microns, at least about 5 microns, at least about 7 microns, or even at least about 10 microns. Particular abrasive articles can have a bonding layer 205 having an average thickness that is not greater than about 60 microns, such as not greater than about 50 microns, such as not greater than about 40 microns, not greater than about 30 microns, or even not greater than about 20 microns. It will be appreciated that the bonding layer 205 can have an average thickness within a range between any of the minimum and maximum values noted above.

The abrasive particles 203 can be positioned in a particular manner relative to other component layers of the abrasive article. For example, in at least one embodiment, a majority of the first type of abrasive particle can be spaced apart from the substrate. Moreover, in certain instances, a majority of the first type of abrasive particle can be spaced apart from a barrier layer 230 of the substrate 201 (See, FIG. 2B which includes an alternative illustration of a portion of an abrasive article according to an embodiment including a barrier layer). More particularly, the abrasive article may be formed such that essentially all of the first type of abrasive particle is spaced apart from the barrier layer. Additionally, it will be appreciated that a majority of the second type of abrasive particle can be spaced apart from the substrate 201 and the barrier layer 203. In fact, in certain instances essentially all of the second type of abrasive particle is spaced apart from the barrier layer 203.

The abrasive article 250 illustrated in FIG. 2B includes an optional barrier layer, in accordance with an embodiment. As illustrated, the barrier layer 230 can include an inner layer 231 in direct contact with the substrate 201 and an outer layer 232 overlying the inner layer 231, and in particular, in direct contact with the inner layer 231.

Figure 2C:
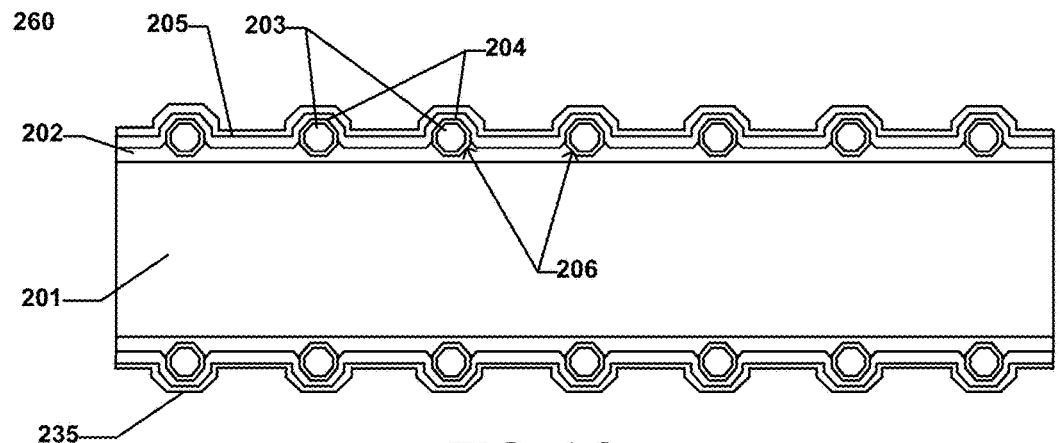
FIG. 2C includes a cross-sectional illustration of a portion of an abrasive article including an optional coating layer in accordance with an embodiment.

FIG. 2C includes a cross-sectional illustration of a portion of an abrasive article including an optional coating layer in accordance with an embodiment. As illustrated, the abrasive article 260 can include a coating layer 235 overlying the bonding layer 205. According to a particular embodiment, the coating layer 235 can have an average thickness of at least about 5% of an average particle size of the abrasive particles 203 (i.e., the first average particle size of the first type of abrasive particles, the second average particle size of the second type of abrasive particles, or the total average particle size). The relative average thickness of the coating layer to the average particle size can be calculated by the absolute value of the equation (Tc/Tp)×100%, wherein Tp represents the average particle size and Tc represents the average thickness of the coating layer. In other embodiments, the average thickness of the coating layer 235 can be greater, such as at least about 8%, at least about 10%, at least about 15%, or even at least about 20%. Still, in another non-limiting embodiment, the average thickness of the coating layer 235 can be limited, such that it is not greater than about 50%, not greater than about 40%, not greater than about 30%, or even not greater than about 20% of the average particle size of the abrasive particles 203. It will be appreciated that the coating layer 235 can have an average thickness within a range between any of the minimum and maximum percentages noted above.

The coating layer 235 can have a particular average thickness relative to the average thickness of the bonding layer 205. For example, the average thickness of the coating layer 235 can be less than an average thickness of the bonding layer 205. In one particular embodiment, the average thickness of the coating layer 235 and the average thickness of the bonding layer can define a ratio (Tc:Tb) of at least about 1:2, at least about 1:3, or even at least about 1:4. Still, in at least one embodiment, the ratio can be not greater than about 1:20, such as not greater than about 1:15, or even not greater than about 1:10. It will be appreciated that the ratio can be within a range between any of the upper and lower limits noted above.

According to a particular aspect, the coating layer 235 may be formed to have an average thickness of not greater than about 15 microns, such as not greater than about 10 microns, not greater than about 8 microns, or even not greater than about 5 microns. Still, the average thickness of the coating layer 235 may be at least about 0.1 microns, such as at least about 0.2 microns, or even at least about 0.5 microns. The coating layer may have an average thickness within a range between any of the minimum and maximum values noted above.

Figure 2D:
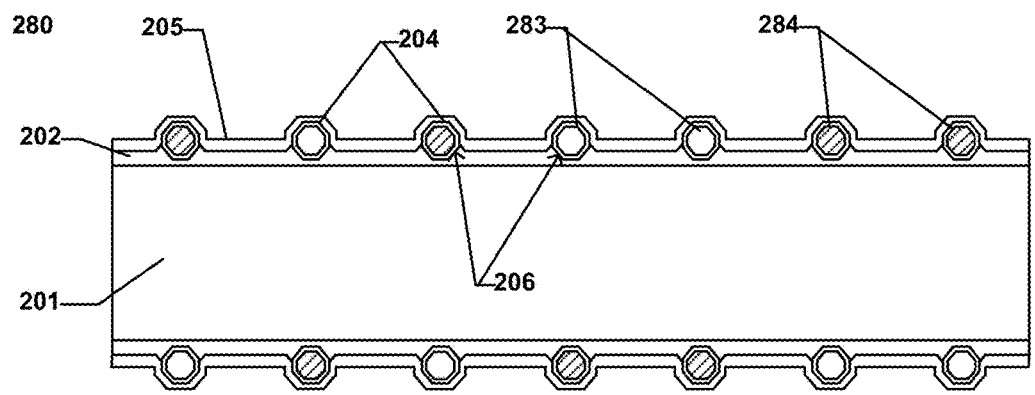
FIG. 2D includes a cross-sectional illustration of a portion of an abrasive article including a first type of abrasive particle and a second type of abrasive particle in accordance with an embodiment.

FIG. 2D includes a cross-sectional illustration of a portion of an abrasive article including a first type of abrasive particle and a second type of abrasive particle in accordance with an embodiment. As illustrated, the abrasive article 280 can include a first type of abrasive particle 283 coupled to the substrate 201 and a second type of abrasive particle 284 different than the first type of abrasive particle 283 coupled to the substrate 201. The first type of abrasive particle 283 can include any features described in embodiments herein, notably including an agglomerated particle. The second type of abrasive particle 284 can include any features described in embodiments herein, including for example, an unagglomerated particle. According to at least one embodiment, the first type of abrasive particle 283 can be different from the second type of abrasive particle 284 based on at least one particle characteristic of the group consisting of hardness, friability, toughness, particle shape, crystalline structure, average particle size, composition, particle coating, grit size distribution, and a combination thereof.

Figure 9:
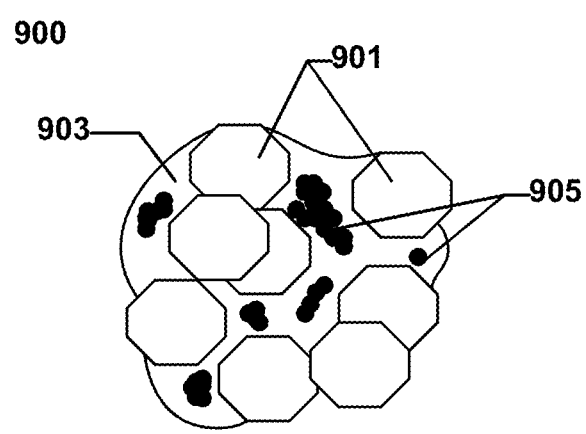
FIG. 9 includes an illustration of an exemplary agglomerated particle according to an embodiment.

Notably, the first type of abrasive particle 283 can be an agglomerated particle. FIG. 9 includes an illustration of an exemplary agglomerated particle according to an embodiment. The agglomerated particle 900 can include abrasive particles 901 contained within a binder material 903. Furthermore, as illustrated, the agglomerated particle can include a content of porosity defined by pores 905. The pores may be present within the binder material 903 between the abrasive particles 901, and in particular instances, essentially all of the porosity of the agglomerated particles can be present within the binder material 903.

According to one particular aspect, the abrasive article can be formed to have a particular abrasive particle concentration. For example, in one embodiment, the average particle size (i.e., the first average particle size or the second average particle size or the total average particle size) can be less than about 20 microns, and the abrasive article can have an abrasive particle concentration of at least about 10 particles per mm of substrate. It will be appreciated that reference to the particles per length is reference to the first type of abrasive particle, the second type of abrasive particle, or the total content of all types of abrasive particles of the article. In yet another embodiment, the abrasive particle concentration can be at least about 20 particles per mm of substrate, at least about 30 particles per mm of substrate, at least about 60 particles per mm of substrate, at least about 100 particles per mm of substrate, at least about 200 particles per mm of substrate, at least about 250 particles per mm of substrate, or even at least about 300 particles per mm of substrate. In another aspect, the abrasive particle concentration may be no greater than about 800 particles per mm of substrate, such as no greater than about 700 particles per mm of substrate, no greater than about 650 particles per mm of substrate, or no greater than about 600 particles per mm of substrate. It will be appreciated that the abrasive particle concentration can be within a range between any of these above minimum and maximum values.

According to one particular aspect, the abrasive article can be formed to have a particular abrasive particle concentration. For example, in one embodiment, the average particle size (i.e., the first average particle size or the second average particle size or the total average particle size) can be at least about 20 microns, and the abrasive article can have an abrasive particle concentration of at least about 10 particles per mm of substrate. It will be appreciated that reference to the particles per length is reference to the first type of abrasive particle, the second type of abrasive particle, or the total content of all types of abrasive particles of the article. In yet another embodiment, the abrasive particle concentration can be at least about 20 particles per mm of substrate, at least about 30 particles per mm of substrate, at least about 60 particles per mm of substrate, at least about 80 particles per mm of substrate, or even at least about 100 particles per mm of substrate. In another aspect, the abrasive particle concentration may be no greater than about 200 particles per mm of substrate, such as no greater than about 175 particles per mm of substrate, no greater than about 150 particles per mm of substrate, or no greater than about 100 particles per mm of substrate. It will be appreciated that the abrasive particle concentration can be within a range between any of these above minimum and maximum values.

In another aspect, the abrasive article can be formed to have a particular abrasive particle concentration, measured as carats per kilometer length of the substrate. For example, in one embodiment, the average particle size (i.e., the first average particle size or the second average particle size or the total average particle size) can be less than about 20 microns, and the abrasive article can have an abrasive particle concentration of at least about 0.5 carats per kilometer of the substrate. It will be appreciated that reference to the particles per length is reference to the first type of abrasive particle, the second type of abrasive particle, or the total content of all types of abrasive particles of the article. In another embodiment, the abrasive particle concentration can be at least about 1.0 carats per kilometer of substrate, such as at least about 1.5 carats per kilometer of substrate, at least about 2.0 carats per kilometer of substrate, at least about 3.0 carats per kilometer of substrate, at least about 4.0 carats per kilometer of substrate, or even at least about 5.0 carats per kilometer of substrate. Still, in one non-limiting embodiment, the abrasive particle concentration may be not be greater than 15.0 carats per kilometer of substrate, not greater than 14.0 carats per kilometer of substrate, not greater than 13.0 carats per kilometer of substrate, not greater than 12.0 carats per kilometer of substrate, not greater than 11.0 carats per kilometer of substrate, or even not greater than 10.0 carats per kilometer of substrate. The abrasive particle concentration can be within a range between any of the above minimum and maximum values.

For yet another aspect, the abrasive article can be formed to have a particular abrasive particle concentration, wherein the average particle size (i.e., the first average particle size or the second average particle size or the total average particle size) can be at least about 20 microns. In such instances, the abrasive article can have an abrasive particle concentration of at least about 0.5 carats per kilometer of the substrate. It will be appreciated that reference to the particles per length is reference to the first type of abrasive particle, the second type of abrasive particle, or the total content of all types of abrasive particles of the article. In another embodiment, the abrasive particle concentration can be at least about 3 carats per kilometer of substrate, such as at least about 5 carats per kilometer of substrate, at least about 10 carats per kilometer of substrate, at least about 15 carats per kilometer of substrate, at least about 20 carats per kilometer of substrate, or even at least about 50 carats per kilometer of substrate. Still, in one non-limiting embodiment, the abrasive particle concentration may be not be greater than 200 carats per kilometer of substrate, not greater than 150 carats per kilometer of substrate, not greater than 125 carats per kilometer of substrate, or even not greater than 100 carats per kilometer of substrate. The abrasive particle concentration can be within a range between any of the above minimum and maximum values.

For yet another aspect, the abrasive article can be formed to have a particular tacking layer thickness, wherein the average abrasive particle concentration can be at least about 10 particles per mm of substrate. For example, the tacking layer thickness may be at least about 1 microns, such as, at least about 1.5 microns, at least about 2 microns, at least about 3 microns or even at least about 24 microns, wherein the average abrasive particle concentration can be at least about 10 particles per mm of substrate. In still other embodiments, the tacking layer thickness may be not greater than about 15 microns, not greater than about 12 microns, not greater than about 10 microns, not greater than about 9 microns or even not greater than about 8 microns, wherein the average abrasive particle concentration can be at least about 10 particles per mm of substrate. It will be appreciated that the tacking layer thickness of an abrasive article wherein the average abrasive particle concentration can be at least about 10 particles per mm of substrate, may be any value within a range between any of the minimum and maximum values noted above.

For yet another aspect, the abrasive article can be formed to have a particular tacking layer thickness, wherein the average abrasive particle concentration can be at least about 100 particles per mm of substrate. For example, the tacking layer thickness may be at least about 1 microns, such as, at least about 1.5 microns, at least about 2 microns, at least about 3 microns or even at least about 4 microns, wherein the average abrasive particle concentration can be at least about 100 particles per mm of substrate. In still other embodiments, the tacking layer thickness may be not greater than about 15 microns, not greater than about 12 microns, not greater than about 10 microns, not greater than about 9 microns or even not greater than about 8 microns, wherein the average abrasive particle concentration can be at least about 100 particles per mm of substrate. It will be appreciated that the tacking layer thickness of an abrasive article wherein the average abrasive particle concentration can be at least about 100 particles per mm of substrate, may be any value within a range between any of the minimum and maximum values noted above.

For yet another aspect, the abrasive article can be formed to have a particular tacking layer thickness, wherein the average abrasive particle concentration can be at least about 150 particles per mm of substrate. For example, the tacking layer thickness may be at least about 1 microns, such as, at least about 1.5 microns, at least about 2 microns, at least about 3 microns or even at least about 4 microns, wherein the average abrasive particle concentration can be at least about 150 particles per mm of substrate. In still other embodiments, the tacking layer thickness may be not greater than about 15 microns, not greater than about 12 microns, not greater than about 10 microns, not greater than about 9 microns or even not greater than about 8 microns, wherein the average abrasive particle concentration can be at least about 150 particles per mm of substrate. It will be appreciated that the tacking layer thickness of an abrasive article wherein the average abrasive particle concentration can be at least about 150 particles per mm of substrate may be any value within a range between any of the minimum and maximum values noted above.

For yet another aspect, the abrasive article can be formed to have a particular tacking layer thickness, wherein the average abrasive particle concentration can be at least about 200 particles per mm of substrate. For example, the tacking layer thickness may be at least about 1 microns, such as, at least about 1.5 microns, at least about 2 microns, at least about 3 microns or even at least about 4 microns, wherein the average abrasive particle concentration can be at least about 200 particles per mm of substrate. In still other embodiments, the tacking layer thickness may be not greater than about 15 microns, not greater than about 12 microns, not greater than about 10 microns, not greater than about 9 microns or even not greater than about 8 microns, wherein the average abrasive particle concentration can be at least about 200 particles per mm of substrate. It will be appreciated that the tacking layer thickness of an abrasive article wherein the average abrasive particle concentration can be at least about 200 particles per mm of substrate, may be any value within a range between any of the minimum and maximum values noted above.

Figure 10A:
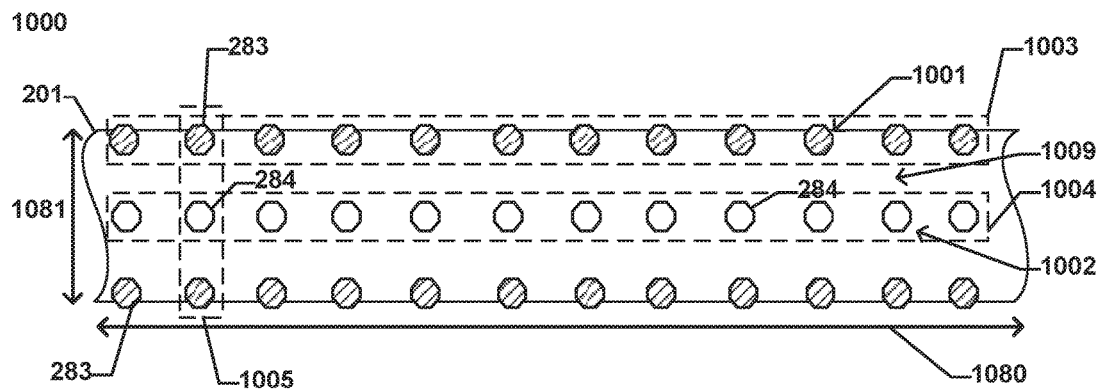
FIG. 10A includes an illustration of a portion of an abrasive article according to an embodiment.
Figure 10B:
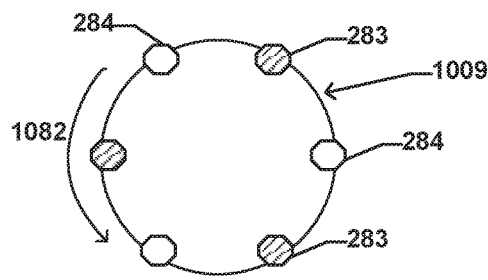
FIG. 10B includes a cross-sectional illustration of a portion of the abrasive article of FIG. 10A according to an embodiment.

FIG. 10A includes a longitudinal side illustration of a portion of an abrasive article according to an embodiment. FIG. 10B includes a cross-sectional illustration of a portion of the abrasive article of FIG. 10A according to an embodiment. In particular, the abrasive article 1000 can include a first type of abrasive particle 283 that can define a first layer of abrasive particles 1001. As illustrated, and according to an embodiment, the first layer of abrasive particles 1001 can define a first pattern 1003 on the surface of the article 1000. The first pattern 1003 can be defined by a relative arrangement of at least a portion (e.g., a group) of the first type of abrasive particle 283 relative to each other. The arrangement or ordered array of the group of first type of abrasive particles may be described relative to at least one dimensional component of the substrate 201. Dimensional components can include a radial component, wherein a group of the first type of abrasive particle 283 can be arranged in an ordered array relative to a radial dimension 1081 that can define a radius or diameter (or thickness if not circular) of the substrate 201. Another dimensional component can include an axial component, wherein a group of the first type of abrasive particle 283 can be arranged in an ordered array relative to a longitudinal dimension 1080 that can define a length (or thickness if not circular) of the substrate 201. Yet another dimensional component can include a circumferential component, wherein a group of the first type of abrasive particle 283 can be arranged in an ordered array relative to a circumferential dimension 1082 that can define a circumference (or periphery if not circular) of the substrate 201.

According to at least one embodiment, the first pattern 1003 can be defined by a repeating axial component. As illustrated in FIG. 10A, the first pattern 1003 includes an ordered array of a group of the first type of abrasive particle 283 overlying the surface of the substrate 201 that defines a repeating axial component, wherein each of the first type of abrasive particle 283 within the group can have an ordered and predetermined axial position relative to each other. Stated alternatively, each of the first type of abrasive particle within the group defining the first pattern 1003 are longitudinally spaced apart from each other in an ordered manner thus defining a repeating axial component of the first pattern 1003. While the foregoing has described the first pattern 1003 as defined by a group of the first type of abrasive particle, it will be appreciated that a pattern can be defined by a combination of different types of abrasive particles, such as an ordered array of the first and second types of abrasive particles.

As further illustrated in FIG. 10A, the abrasive article 1000 can include a second type of abrasive particle 284 that can define a second layer of abrasive particles 1002. The second layer of abrasive particles 1002 can be different than the first layer of abrasive particles 1001. In particular designs, the first layer of abrasive particles 1001 can define a first radial position on the substrate 201 and the second layer of abrasive particles 1002 can define a second radial position on the substrate 201 that is different than the first radial position of the first layer of abrasive particles 1001. Moreover, according to one embodiment, the first radial position of the first layer of abrasive particles 1001 and the second radial position defined by the second layer of abrasive particles 1002 can be radially spaced apart from each other relative to the radial dimension 1081.

In yet another embodiment, the first layer of abrasive particles 1001 can define a first axial position and the second layer of abrasive particles 1002 can define a second axial position spaced apart from the first axial position relative to the longitudinal dimension 1080. According to another embodiment, the first layer of abrasive particles 1001 can define a first circumferential position and the second layer of abrasive particles 1002 can define a second circumferential position spaced apart from the first circumferential position relative to the circumferential dimension 1082.

In at least one embodiment, the abrasive article 1000 can include a first type of abrasive particle 283 that can define a first layer of abrasive particles 1001, wherein each of the first type of abrasive particle 283 are substantially uniformly dispersed relative to each other on the surface of the abrasive article. Furthermore, as illustrated, the abrasive article 1000 can include a second type of abrasive particle 284 that can define a second layer of abrasive particles 100, wherein each abrasive particle of the second type of abrasive particle 284 is substantially uniformly dispersed relative to the other abrasive particles on the surface of the abrasive article.

As illustrated, and according to an embodiment, the first layer of abrasive particles 1001 can be associated with a first pattern 1003 on the surface of the article 1000 and the second layer of abrasive particles 1002 can be associated with a second pattern 1004 on the surface of the article 1000. Notably, in at least one embodiment, the first pattern 1002 and the second pattern 1004 are different relative to each other. According to one embodiment, the first pattern 1002 and second pattern 1004 can be separated from each other by a channel 1009. Moreover, depending upon the method of forming, the first pattern 1002 may be associated with a first pattern of a tacking layer material relative to the surface of the substrate 201 (not shown) or a first pattern of the bonding layer material relative to the surface of the substrate 201 (not shown). Additionally or alternatively, the second pattern 1004 can be associated with a second pattern of a tacking layer material relative to the surface of the substrate 201 (not shown). The second pattern of the tacking layer may be different than the first pattern of the tacking layer. Still, in certain instances, the second pattern of the tacking layer can be the same as the first pattern of the tacking layer. According to one embodiment, the second pattern 1004 can be associated with a second pattern of the bonding layer relative to the surface of the substrate 201 (not shown), which may be different than the first pattern of the bonding layer. Still, in at least one embodiment, the second pattern of the bonding layer may be the same as the first pattern of the bonding layer. The first pattern of the tacking layer can be different than the second pattern of the tacking layer by at least a radial component, an axial component, a circumferential component, and a combination thereof. Moreover, the first pattern of the bonding layer can be different than the second pattern of the bonding layer by at least a radial component, an axial component, a circumferential component, and a combination thereof.

As illustrated in FIG. 10A, the first pattern 1003 can be defined by a two-dimensional shape, such as a polygonal two-dimensional shape, such as a rectangle. Likewise, the second pattern 1004 can be defined by a two-dimensional shape, such as a polygonal two-dimensional shape, such as a rectangle. It will be appreciated that other two-dimensional shapes may be employed.

According to one particular embodiment, the second pattern 1004 can include an ordered array of a group of the second type of abrasive particle 284 overlying the surface of the substrate 201 that defines a repeating axial component, wherein each of the second type of abrasive particle 284 within the group can have an ordered and predetermined axial position relative to each other. For example, each of the second type of abrasive particle 284 within the group defining the second pattern 1004 can be longitudinally spaced apart from each other in an ordered manner thus defining a repeating axial component of the second pattern 1004. While the foregoing has described the second pattern 1004 as defined by a group of the second type of abrasive particle, it will be appreciated that any pattern herein can be defined by a combination of different types of abrasive particles, such as an ordered array of the first and second types of abrasive particles.

As further illustrated in FIG. 10A, the abrasive article 1000 can have a third pattern 1005 that can include an ordered array of a group of the first type of abrasive particle 283 and the second type of abrasive particle 284 overlying the surface of the substrate 201 that defines a repeating radial component. Each of the first type of abrasive particle 283 and second type of abrasive particle 284 within the group can have an ordered and predetermined radial position relative to each other. That is, for example, each of the first type of abrasive particle 283 and second type of abrasive particle 284 within the group defining the third pattern 1005 are radially spaced apart from each other in an ordered manner thus defining a repeating radial component of the third pattern 1005.

In addition to the repeating radial component, the third pattern 1005 can include an ordered array of a group of the first type of abrasive particle 283 and the second type of abrasive particle 284 overlying the surface of the substrate 201 that defines a repeating circumferential component. As illustrated in FIGS. 10A and 10B, the third pattern 1005 can be defined by each of the first type of abrasive particle 283 and second type of abrasive particle 284 within the group having an ordered and predetermined circumferential position relative to each other. That is, for example, each of the first type of abrasive particle 283 and second type of abrasive particle 284 within the group defining the third pattern 1005 are circumferentially spaced apart from each other in an ordered manner thus defining a repeating circumferential component of the third pattern 1005.

Figure 10C:
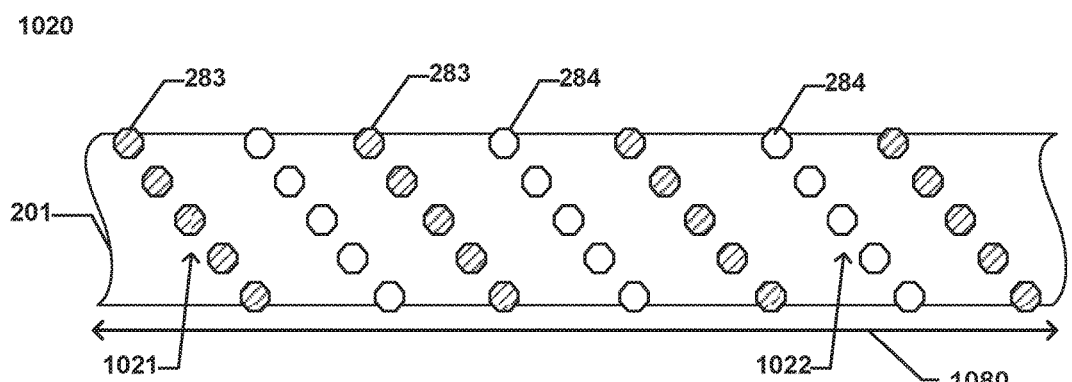
FIG. 10C includes an illustration of a portion of an abrasive article according to an embodiment.

FIG. 10C includes a longitudinal side illustration of a portion of an abrasive article according to an embodiment. In particular, the abrasive article 1020 can include a first type of abrasive particle 283 that can define a first layer of abrasive particles 1021. Notably, the first layer of abrasive particles 1021 can be arranged relative to each other to have a repeating axial component, repeating radial component, and repeating circumferential component. In accordance with one particular embodiment, the first layer of abrasive particles 1021 can define a first helical path extending around the substrate 201 and defined by a plurality of turns that can be axially spaced apart from each other. According to one embodiment, a single turn includes an extension of the first layer of abrasive particles 1021 around the circumference of the article for 360 degrees. The first helical path may be continuous, or alternatively, may be defined by an axial gap, a radial gap, a circumferential gap, and a combination thereof.

Moreover, the abrasive article 1020 can include a second type of abrasive particle 284 that can define a second layer of abrasive particles 1022. Notably, the second layer of abrasive particles 1022 can be arranged relative to each other to have a repeating axial component, repeating radial component, and repeating circumferential component. In accordance with one particular embodiment, the second layer of abrasive particles 1022 can define a second helical path extending around the substrate 201. The second helical path can be defined by a plurality of turns, wherein the turns can be axially spaced apart from each other, and wherein a single turn includes an extension of the second layer of abrasive particles 1022 around the circumference of the article for 360 degrees. The second helical path may be continuous, or alternatively, may be interrupted, wherein the second helical path can have an axial gap, a radial gap, a circumferential gap, and a combination thereof.

As illustrated, and according to a particular embodiment, the first layer of abrasive particles 1021 and second layer of abrasive particles 1022 can define an intertwined helical path, wherein the first layer of abrasive particles 1021 and second layer of abrasive particles 1022 alternate in the longitudinal dimension 1080. It will be appreciated that a single helical path can be defined by a combination of the first type of abrasive particle and the second type of abrasive particle.

Figure 11A:
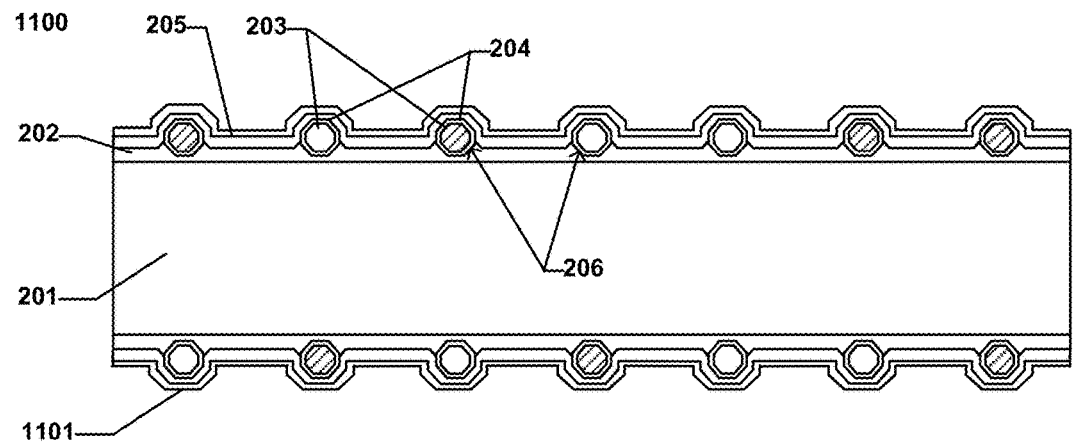
FIG. 11A includes an illustration of a portion of an abrasive article including a lubricious material according to an embodiment.
Figure 11B:
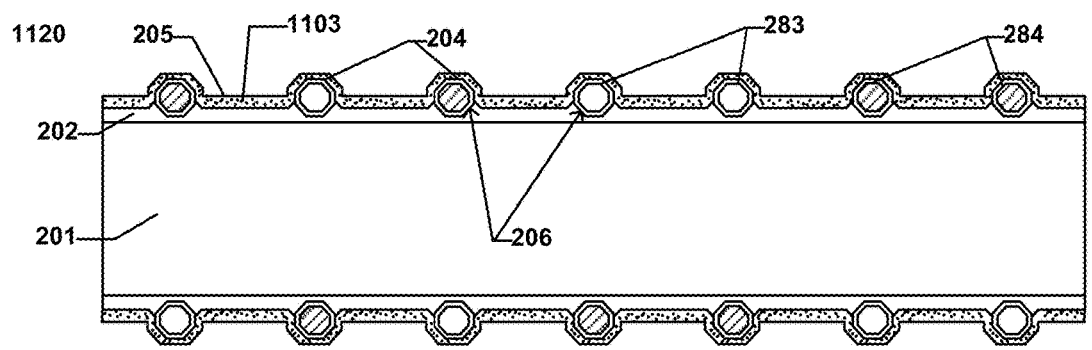
FIG. 11B includes an illustration of a portion of an abrasive article including a lubricious material according to an embodiment.

According to a particular embodiment, a lubricious material may be incorporated into the abrasive article to facilitate improved performance. FIGS. 11A-11B include illustrations of various abrasive articles having different deployments of a lubricious material according to embodiments herein. In at least one embodiment, the abrasive article can include a lubricious material overlying the substrate. In another instance, the lubricious material can be overlying the tacking layer. Alternatively, the lubricious material may be in direct contact with the tacking layer, and more particularly, may be contained within the tacking layer. For one design of an embodiment, the lubricious material can be overlying the abrasive particles, and even may be in direct contact with the abrasive particles. In still another embodiment, the lubricious material can be overlying the bonding layer, may be at the bonding layer, and in more particular instance, in direct contact with the bonding layer. According to one embodiment, the lubricious material can be contained within the bonding layer. Yet, in one alternative embodiment, the lubricious material can be overlying a coating layer, and more particularly, can be in direct contact with the coating layer, and even more particularly, can be contained within the coating layer. The lubricious material may be formed on the exterior of the abrasive article, such that it is configured to make contact with a workpiece.

The lubricious material may define at least a portion of the exterior surface of the abrasive article. Notably, the lubricious material can be in the form of a continuous coating, such as the lubricious material 1103 illustrated in FIG. 11A of the abrasive article 1100. In such instances, the lubricious material can overlie a majority of the surface of the abrasive article 1100 and define a majority of the exterior surface of the abrasive article 1100. According to one design of an embodiment, the lubricious material can define essentially the entire exterior surface of the abrasive article 1100.

According to another embodiment, the lubricious material may define a non-continuous layer, wherein the lubricious material overlies the substrate and defines a fraction of the exterior surface of the abrasive article. The non-continuous layer may be defined by a plurality of gaps extending between portions of the lubricious material, wherein the gaps define regions absent the lubricious material.

According to one embodiment, the lubricious material can be in the form of discrete particles comprising a lubricious material. The discrete particles including the lubricious material may consist essentially of the lubricious material. More particularly, the discrete particles can be disposed at various places within the abrasive article, including but not limited to, in direct contact with the bonding layer, at least partially contained within the bonding layer, contained entirely within the bonding layer, at least partially contained within the coating layer, in direct contact with a coating layer and a combination thereof. For example, abrasive article 1120 as illustrated in FIG. 11 B, the lubricious material 1103 is present as discrete particles contained in the bonding layer 205.

For at least one embodiment, the lubricious material can be an organic material, an inorganic material, a natural material, a synthetic material, and a combination thereof. In one particular instance, the lubricious material can include a polymer, such as a fluoropolymer. One particularly suitable polymer material can include polytetrafluoroethylene (PTFE). In at least one embodiment, the lubricious material can consist essentially of PTFE.

Various methods of providing the lubricious material to the abrasive article may be utilized. For example, the process of providing the lubricious material may be conducted via a depositing process. Exemplary deposition processes can include spraying, printing, plating, coating, gravity coating, dipping, die coating, electrostatic coating, and a combination thereof.

Additionally, the process of providing the lubricious material may be conducted at different times during processing. For example, providing the lubricious material can be conducted simultaneously with forming the tacking layer. Alternatively, providing the lubricious material can be conducted simultaneously with providing the abrasive particles. In yet another embodiment, providing the lubricious material can be completed simultaneously with providing the bonding layer. Moreover, in one optional process, providing the lubricious material can be conducted simultaneously with providing a coating layer overlying the bonding layer.

Still, the process of providing the lubricious material can be conducted after completing certain processes. For example, providing the lubricious material can be conducted after forming the tacking layer, after providing the abrasive particles, after providing the bonding layer, or even after providing a coating layer.

Alternatively, it may be suitable to provide the lubricious material prior to forming certain layers. For example, providing the lubricious material can be conducted before forming the tacking layer, before providing the abrasive particles, before providing the bonding layer, or even before providing a coating layer.

Figure 12A:
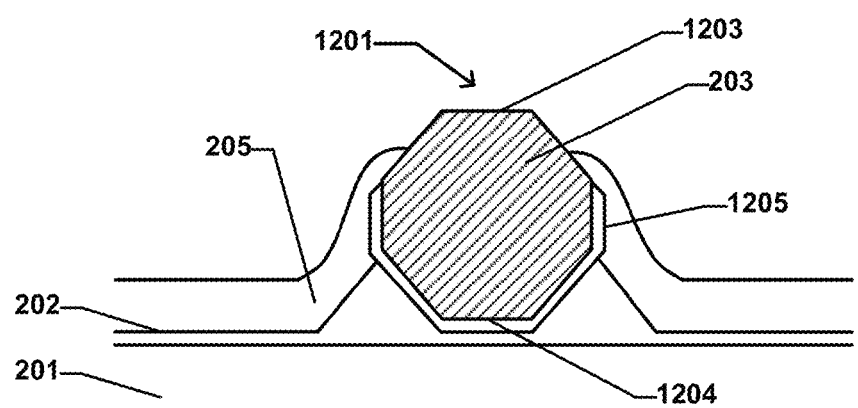
FIG. 12A includes an illustration of a portion of an abrasive article including an abrasive particle having an exposed surface according to an embodiment.

Certain articles according to embodiments herein can be processed according to a particular method to facilitate the formation of abrasive particles having an exposed surface. FIG. 12A includes an illustration of an abrasive article including an abrasive particle having an exposed surface. As illustrated in FIG. 12A, the abrasive article can be formed such that an abrasive particle 203 (e.g., first type or second type of abrasive particle) can have an exposed surface 1201. According to an embodiment, the abrasive particle 203 can have a particle coating 1205 overlying a surface of the abrasive particle 203, and preferentially disposed proximate to a lower surface 1204 of the abrasive particle 203. In particular, the particle coating layer 1205 can be a non-continuous coating that is preferentially disposed at a lower surface 1204 of the abrasive particle 203 adjacent the substrate 201 and tacking layer 202. Notably, the particle coating layer 1205 may not necessarily extend over an upper surface 1203 of the abrasive particle 203, which is spaced at a greater distance from the substrate 201 than the lower surface 1204, and facilitate the formation of the exposed surface 1201. The particle coating layer 1205 may be removed from the upper surface 1203 of the abrasive particle via a selective removal process prior to forming the bonding layer as described in embodiments herein. The absence of a the particle coating layer 1205 at the upper surface 1203 can facilitate the formation of an exposed surface 1201, since the bonding layer material may not necessarily wet the upper surface 1203 of the abrasive particle 203 during forming.

According to one embodiment, the exposed surface 1201 can be essentially absent a metal material. In particular, the exposed surface 1201 can consist essentially of the abrasive particle 203 and have no overlying layers. In certain instances, the exposed surface 1201 can consist essentially of diamond.

Figure 12B:
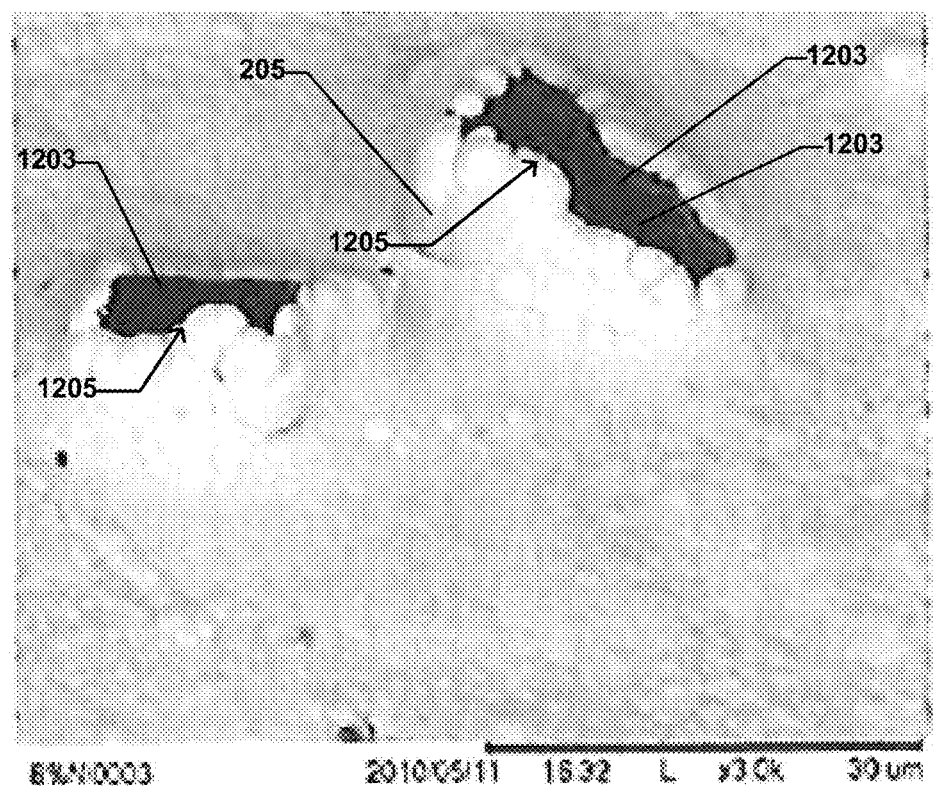
FIG. 12B includes a picture of a portion of an abrasive article including abrasive particles having exposed surfaces according to an embodiment.

FIG. 12B includes a picture of an abrasive article according to an embodiment including abrasive particles having exposed surfaces. The exposed surfaces 1201 can exist for at least about 5% of an amount of abrasive particles of the abrasive article. It will be appreciated that the amount of abrasive particles can be a total amount of only the first type of abrasive particles, a total amount of only the second type of abrasive particles, or a total amount of all types of abrasive particles present in the abrasive article. In other instances, the content of abrasive particles having an exposed surface can be at least about 10%, such as at least about 20%, at least about 30%, at least about 40%, at least about 50%, at least about 60%, at least about 70%, at least about 80%, or even at least about 90%. Still, in a non-limiting embodiment, not greater than about 99%, such as not greater than about 98%, not greater than about 95%, not greater than about 80%, such as not greater than about 70%, not greater than about 60%, not greater than about 505, not greater than about 40%, not greater than about 30%, not greater than about 25%, or even not greater than about 20% of an amount of the abrasive particles have an exposed surface. It will be appreciated that the amount of abrasive particles having an exposed surface can be within a range between any of the above noted minimum and maximum percentages.

The bonding layer may have a particular contour at the exposed surface 1201. As illustrated in FIG. 12B, the bonding layer 205 can have a scalloped edge 1205 at an interface between the bonding layer 205 and an exposed surface 1201 of the abrasive particles. The scalloped edge may facilitate improved material removal and improved abrasive particle retention.

Certain processing techniques can facilitate use of different types of abrasive particles having different exposed surfaces. For example, the abrasive article can include a first type of abrasive particle and a second type of abrasive particle, wherein essentially none of the total content of the second type of abrasive particle has an exposed surface while at least a portion of the total content of the first type of abrasive particle has an exposed surface. Still, in other instances, at least a portion of a total amount of the second type of abrasive particle can have an exposed surface. Moreover, in one particular embodiment, the amount of the second type of abrasive particle having an exposed surface is less than the amount of the first type of abrasive particle having an exposed surface. Alternatively, the amount of the second type of abrasive particle having an exposed surface is greater than the amount of the first type of abrasive particle having an exposed surface. Yet, according to another embodiment, the total amount of the second type of abrasive particle having an exposed surface is substantially the same as the amount of the first type of abrasive particle having an exposed surface.

The abrasive articles of the embodiments herein may be wire saws that are particularly suited for slicing of workpieces. The workpieces can be various materials, including but not limited to, ceramic, semiconductive material, insulating material, glass, natural materials (e.g., stone), organic material, and a combination thereof. More particularly, the workpieces can include oxides, carbides, nitrides, minerals, rocks, single crystalline materials, multicrystalline materials, and a combination thereof. For at least one embodiment, an abrasive article of an embodiment herein may be suitable for slicing a workpiece of sapphire, quartz, silicon carbide, and a combination thereof.

According to at least one aspect, the abrasive articles of the embodiments can be used on particular machines, and may be used at particular operating conditions that have improved and unexpected results compared to conventional articles. While not wishing to be bound to a particular theory, it is thought there may be some synergistic effect between the features of the embodiments.

Generally, cutting, slicing, bricking, squaring, or any other operation can be conducted by moving the abrasive article (i.e., wire saw) and the workpiece relative to each other. Various types and orientations of the abrasive articles relative to the workpieces may be utilized, such that a workpiece is sectioned into wafers, bricks, rectangular bars, prismatic sections, and the like.

Figure 15:
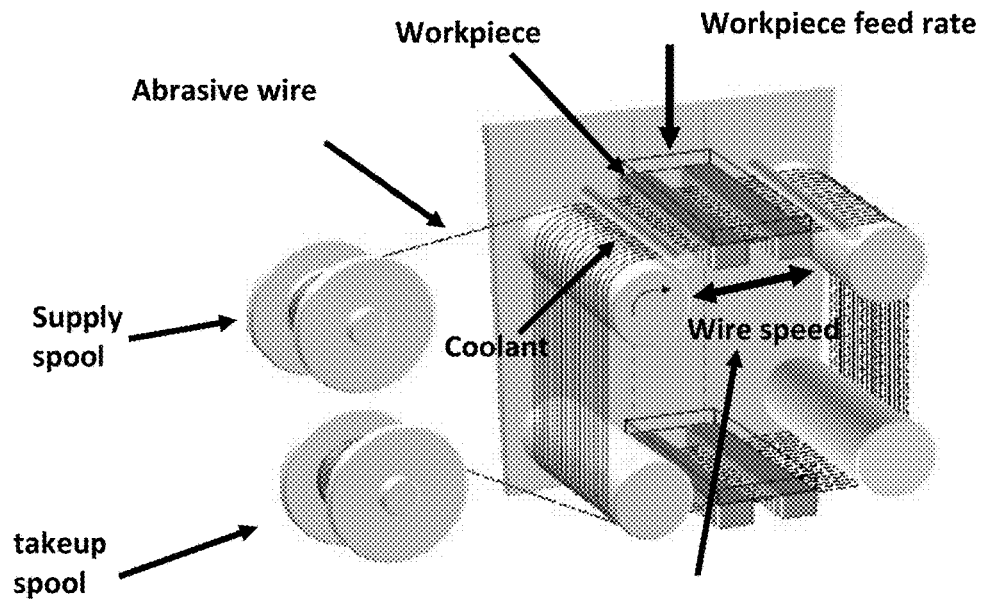
FIG. 15 includes an illustration of a reel-to-reel machine using an abrasive article to slice a workpiece.

This may be accomplished using a reel-to-reel machine, wherein moving comprises reciprocating the wire saw between a first position and a second position. In certain instances, moving the abrasive article between a first position and a second position comprises moving the abrasive article back and forth along a linear pathway. While the wire is being reciprocated, the workpiece may also be moved, including for example, rotating the workpiece. FIG. 15 includes an illustration of a reel-to-reel machine using an abrasive article to slice a workpiece.

Figure 16:
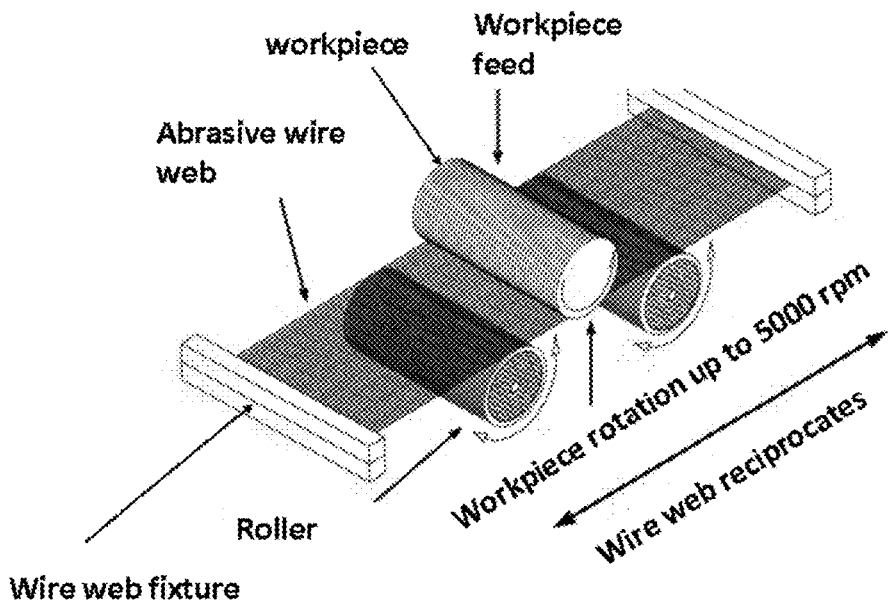
FIG. 16 includes an illustration of an oscillation machine using an abrasive article to slice a workpiece.

Alternatively, an oscillating machine may be utilized with any abrasive article according to the embodiments herein. Use of an oscillating machine can include moving the abrasive article relative to the workpiece between a first position and second position. The workpiece may be moved, such as rotated, and moreover the workpiece and wire can both be moved at the same time relative each other. An oscillating machine may utilize a back and forth motion of the wire guide relative to the workpiece, wherein a reel-to-reel machine does not necessarily utilize such a motion. FIG. 16 includes an illustration of an oscillation machine using an abrasive article to slice a workpiece.

For some applications, during the slicing operation the process may further include providing a coolant at an interface of the wire saw and workpiece. Some suitable coolants include water-based materials, oil-based materials, synthetic materials, and a combination thereof.

In certain instances, slicing can be conducted as a variable rate operation. The variable rate operation can include moving the wire and workpiece relative to each other for a first cycle and moving the wire and workpiece relative to each other for a second cycle. Notably, the first cycle and the second cycle may be the same or different. For example, the first cycle can include translation of the abrasive article from a first position to a second position, which in particular, may include translation of the abrasive article through a forward and reverse direction cycle. The second cycle can include translation of the abrasive article from a third position to a fourth position, which may also include translation of the abrasive article through a forward and reverse direction cycle. The first position of the first cycle can be the same as the third position of the second cycle, or alternatively, the first position and the third position may be different. The second position of the first cycle can be the same as the fourth position of the second cycle, or alternatively, the second position and the fourth position may be different.

Figure 17:
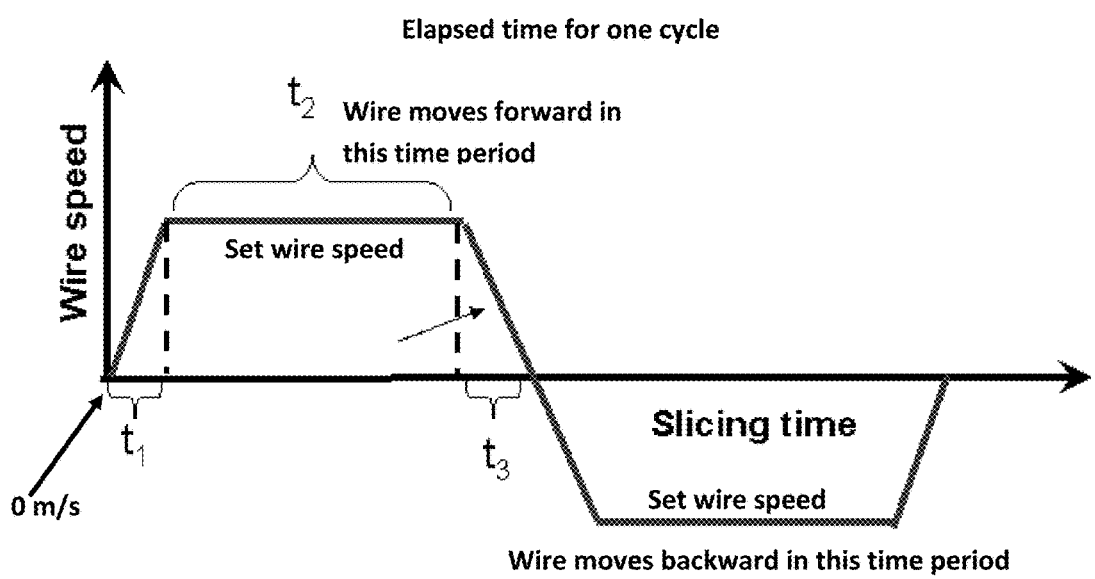
FIG. 17 includes an exemplary plot of wire speed versus time for a single cycle of a variable rate cycle operation.

According to a particular embodiment, the use of an abrasive article of an embodiment herein in a variable rate cycle operation can include a first cycle that includes the elapsed time to translate the abrasive article from a starting position in a first direction (e.g., forward) to a temporary position, and in a second direction (e.g., backward) from the temporary position, thus returning to the same starting position or close to the starting position. Such a cycle can include the duration for accelerating the wire from 0 m/s to set wire speed in the forward direction, the elapsed time for moving the wire at set wire speed in the forward direction, the elapsed time on decelerating the wire from set wire speed to 0 m/s in the forward direction, the elapsed time on accelerating the wire from 0 m/s to set wire speed in the backward direction, the elapsed time on moving the wire at set wire speed in the backward direction, and the elapsed time on decelerating the wire from set wire speed to 0 m/s in the backward direction. FIG. 17 includes an exemplary plot of wire speed versus time for a single cycle of a variable rate cycle operation.

According to one particular embodiment, the first cycle can be at least about 30 seconds, such as at least about 60 seconds, or even t least about 90 seconds. Still, in one non-limiting embodiment, the first cycle can be not greater than about 10 minutes. It will be appreciated that the first cycle can have a duration within a range between any of the minimum and maximum values above.

In yet another embodiment, the second cycle can be at least about 30 seconds, such as at least about 60 seconds, or even at least about 90 seconds. Still, in one non-limiting embodiment, the second cycle can be not greater than about 10 minutes. It will be appreciated that the second cycle can have a duration within a range between any of the minimum and maximum values above.

The total number of cycles in a for a cutting process may vary, but can be at least about 20 cycles, at least about 30 cycles, or even at least about 50 cycles. In particular instances, the number of cycles may be not greater than about 3000 cycles or even not greater than about 2000 cycles. The cutting operation may last for a duration of at least about 1 hour or even at least about 2 hours. Still, depending upon the operation, the cutting process may be longer, such as at least about 10 hours, or even 20 hours of continuous cutting.

In certain cutting operations, the wire saw of any embodiment herein may be particularly suited for operation at a particular feed rate. For example, the slicing operation can be conducted at a feed rate of at least about 0.05 mm/min, at least about 0.1 mm/min, at least about 0.5 mm/min, at least about 1 mm/min, or even at least about 2 mm/min. Still, in one non-limiting embodiment, the feed rate may be not greater than about 20 mm/min. It will be appreciated that the feed rate can be within a range between any of the minimum and maximum values above.

For at least one cutting operation, the wire saw of any embodiment herein may be particularly suited for operation at a particular wire tension. For example, the slicing operation can be conducted at a wire tension of at least about 30% of a wire break load, such as at least about 50% of the wire break load, or even at least about 60% of a break load. Still, in one non-limiting embodiment, the wire tension may be not greater than about 98% of the break load. It will be appreciated that the wire tension can be within a range between any of the minimum and maximum percentages above.

According to another cutting operation, the abrasive article can have a VWSR range that facilitates improved performance. VWSR is the variable wire speed ratio and can generally be described by the equation t2/(t1+t3), wherein t2 is the elapsed time when the abrasive wire moves forward or backward at a set wire speed, wherein t1 is the elapsed time when the abrasive wire moves forward or backward from 0 wire speed to set wire speed, and t3 is the elapsed time when the abrasive wire moves forward or backward from constant wire speed to 0 wire speed. See, for example FIG. 17. For example, the VWSR range of a wire saw according to an embodiment herein can be at least about 1, at least about 2, at least about 4, or even at least about 8. Still, in one non-limiting embodiment, the VWSR rate may be not greater than about 75 or even not greater than about 20. It will be appreciated that the VWSR rate can be within a range between any of the minimum and maximum values above. In one embodiment, an exemplary machine for variable wire speed ratio cutting operations can be a Meyer Burger DS265 DW Wire Saw machine.

Certain slicing operations may be conducted on workpieces including silicon, which can be single crystal silicon or multicrystalline silicon. According to one embodiment, use of an abrasive article according to an embodiment demonstrates a life of at least about 8 $m^2$/km, such as at least about 10 $m^2$/km, at least about 12 $m^2$/km, or even at least about 15 $m^2$/km. The wire life can be based upon the wafer area generated per kilometer of abrasive wire used, wherein wafer area generated is calculated based on one side of the wafer surface. In such instances, the abrasive article may have a particular abrasive particle concentration, such as at least about 0.5 carats per kilometer of the substrate, at least about 1.0 carats per kilometer of substrate, at least about 1.5 carats per kilometer of substrate, or even at least about 2.0 carats per kilometer of substrate. Still, the concentration may be not greater than about 20 carats per kilometer of substrate, or even not greater than about 10 carats per kilometer of substrate. The average particle size of the abrasive particles can be less than about 20 microns. It will be appreciated that the abrasive particle concentration can be within a range between any of the minimum and maximum values above. The slicing operation may be conducted at a feed rate as disclosed herein.

According to another operation, a silicon workpiece including single crystal silicon or multicrystalline silicon can be sliced with an abrasive article according to one embodiment, and the abrasive article can have a life of at least about 0.5 $m^2$/km, such as at least about 1 $m^2$/km, or even at least about 1.5 $m^2$/km. In such instances, the abrasive article may have a particular abrasive particle concentration, such as at least about 5 carats per kilometer of the substrate, at least about 10 carats per kilometer of substrate, of at least about 20 carats per kilometer of substrate, at least about 40 carats per kilometer of substrate. Still, the concentration may be not greater than about 300 carats per kilometer of substrate, or even not greater than about 150 carats per kilometer of substrate. The average particle size of the abrasive particles can be less than about 20 microns. It will be appreciated that the abrasive particle concentration can be within a range between any of the minimum and maximum values above.

The slicing operation may be conducted at a feed rate of at least about 1 mm/min, at least about 2 mm/min, at least about 3 mm/min, at least about 5 mm/min. Still, in one non-limiting embodiment, the feed rate may be not greater than about 20 mm/min. It will be appreciated that the feed rate can be within a range between any of the minimum and maximum values above.

According to another operation, a sapphire workpiece can be sliced using an abrasive article of an embodiment herein. The sapphire workpiece may include a c-plane sapphire, an a-plane sapphire, or a r-plane sapphire material. For at least one embodiment, the abrasive article can slice through the sapphire workpiece and exhibit a life of at least about 0.1 $m^2$/km, such as at least about 0.2 $m^2$/km, at least about 0.3 $m^2$/km, at least about 0.4 $m^2$/km, or even at least about 0.5 $m^2$/km. In such instances, the abrasive article may have a particular abrasive particle concentration, such as at least about 5 carats per kilometer of the substrate, at least about 10 carats per kilometer of substrate, of at least about 20 carats per kilometer of substrate, at least about 40 carats per kilometer of substrate. Still, the concentration may be not greater than about 300 carats per kilometer of substrate, or even not greater than about 150 carats per kilometer of substrate. The average particle size of the abrasive particles can be greater than about 20 microns. It will be appreciated that the abrasive particle concentration can be within a range between any of the minimum and maximum values above.

The foregoing slicing operation on the workpiece of sapphire may be conducted at a feed rate of at least about 0.05 mm/min, such as at least about 0.1 mm/min, or even at least about 0.15 mm/min. Still, in one non-limiting embodiment, the feed rate may be not greater than about 2 mm/min. It will be appreciated that the feed rate can be within a range between any of the minimum and maximum values above.

In yet another aspect, the abrasive article may be used to slice through workpieces including silicon carbide, including single crystal silicon carbide. For at least one embodiment, the abrasive article can slice through the silicon carbide workpiece and exhibit a life of at least about 0.1 $m^2$/km, such as at least about 0.2 $m^2$/km, at least about 0.3 $m^2$/km, at least about 0.4 $m^2$/km, or even at least about 0.5 $m^2$/km. In such instances, the abrasive article may have a particular abrasive particle concentration, such as at least about 5 carats per kilometer of the substrate, at least about 10 carats per kilometer of substrate, of at least about 20 carats per kilometer of substrate, at least about 40 carats per kilometer of substrate. Still, the concentration may be not greater than about 300 carats per kilometer of substrate, or even not greater than about 150 carats per kilometer of substrate. It will be appreciated that the abrasive particle concentration can be within a range between any of the minimum and maximum values above.

The foregoing slicing operation on the workpiece of silicon carbide may be conducted at a feed rate of at least about 0.05 mm/min, such as at least about 0.10 mm/min, or even at least about 0.15 mm/min. Still, in one non-limiting embodiment, the feed rate may be not greater than about 2 mm/min. It will be appreciated that the feed rate can be within a range between any of the minimum and maximum values above.

According to yet another embodiment, abrasive articles according to embodiments described herein may be produced at a certain production rate. The production rate of embodiments of abrasive articles described herein may be the speed of formation of an abrasive article, in meters of substrate per minute, wherein the abrasive article includes a substrate having an elongated body, a tacking layer overlying the substrate, abrasive particle overlying the tacking layer and defining a first abrasive particle concentration at least about 10 particles per mm of substrate, and the formation of the bonding layer. In certain embodiments, the production rate may be at least about 10 meters per minute, such as, at least about 12 meters per minute, at least about 14 meters per minute, at least about 16 meters per minute, at least about 18 meters per minute, at least about 20 meters per minute, at least about 25 meters per minute, at least about 30 meters per minute, at least about 40 meters per minute or even at least about 60 meters per minute.

In particular instances, it is noted that the present method can be used to facilitate efficient production of abrasive wire saws having a high concentration of abrasive particles. For example, the abrasive articles of the embodiments herein having any of the featured abrasive particle concentrations can be formed at any of the foregoing production rates while maintaining or exceeding performance parameters of the industry. Without wishing to be tied to a particular theory, it is theorized that utilization of a separate tacking process and bonding process can facilitate improved production rates over single step attaching and bonding processes, such as conventional electroplating processes.

Abrasive articles of the embodiments herein have demonstrated improved abrasive particle retention during use as compared to conventional abrasive wire saws without at least one of the features of the embodiments herein. For example, the abrasive articles have an abrasive particle retention of at least about 2% improvement over one or more conventional samples. In still other instances, the abrasive particle retention improvement can be at least about 4%, at least about 6%, at least about 8%, at least about 10%, at least about 12%, at least about 14%, at least about 16%, at least about 18%, at least about 20%, at least about 24%, at least about 28%, at least about 30%, at least about 34%, at least about 38%, at least about 40%, at least about 44%, at least about 48%, or even at least about 50%. Still, in one non-limiting embodiment, the abrasive particle retention improvement can be not greater than about 100%, such as not greater than about 95%, not greater than about 90%, or even not greater than about 80%.

Abrasive articles of the embodiments herein have demonstrated improved abrasive particle retention and further demonstrated improved useable life compared to conventional abrasive wire saws without at least one of the features of the embodiments herein. For example, the abrasive articles herein can have an improvement of useable life of at least about 2% compared to one or more conventional samples. In still other instances, the increase in useable life of an abrasive article of an embodiment herein compared to a conventional article can be at least about 4%, at least about 6%, at least about 8%, at least about 10%, at least about 12%, at least about 14%, at least about 16%, at least about 18%, at least about 20%, at least about 24%, at least about 28%, at least about 30%, at least about 34%, at least about 38%, at least about 40%, at least about 44%, at least about 48%, or even at least about 50%. Still, in one non-limiting embodiment, the useable life improvement can be not greater than about 100%, such as not greater than about 95%, not greater than about 90%, or even not greater than about 80%.

EXAMPLE 1

A length of high strength carbon steel wire is obtained as a substrate. The high strength carbon steel wire has an average diameter of approximately 125 microns. A tacking layer is formed on the external surface of the substrate via electroplating. The electroplating process forms a tacking layer having an average thickness of approximately 4 microns. The tacking layer is formed of a 60/40 tin/lead soldering composition.

After forming the tacking layer, the wire is spooled into a bath containing a liquid flux material commercially available as Stay Clean® Liquid Soldering Flux from Harris Products Group and the treated wire is then sprayed with nickel-coated diamond abrasive particles having an average particle size of between 20 to 30 microns. Thereafter, the substrate, tacking layer, and abrasive particles are heat treated to a temperature to approximately 190° C. The abrasive pre-form is then cooled and rinsed. The process of bonding the nickel coated diamond to the tacking layer is conducted at an average spooling rate of 15 m/min.

Figure 3:
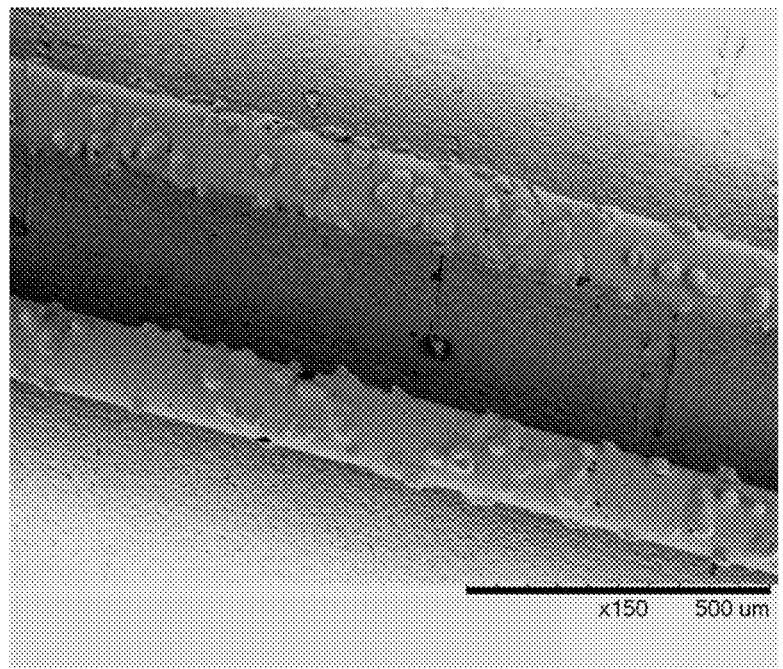
FIG. 3 includes a magnified image of an abrasive article formed according to an embodiment.

Thereafter, the abrasive pre-form is washed using 15% HCl followed by a rinse with de-ionized water. The rinsed article is electroplated with nickel to form a bonding layer directly contacting and overlying the abrasive particles and tacking layer. FIG. 3 includes a magnified image of a portion of the abrasive article formed from the process of Example 1.

EXAMPLE 2

A length of high strength carbon steel wire is obtained as a substrate. The high strength carbon steel wire has an average diameter of approximately 125 microns. A tacking layer is formed on the external surface of the substrate via electroplating. The electroplating process forms a tacking layer having an average thickness of approximately 6 microns. The tacking layer is formed of a 60/40 tin/lead soldering composition.

After forming the tacking layer, the wire is spooled into a bath containing a liquid flux material commercially available as Stay Clean® Liquid Soldering Flux from Harris Products Group and the treated wire is then sprayed with nickel-coated diamond abrasive particles having an average particle size of between 15 to 25 microns. Thereafter, the substrate, tacking layer, and abrasive particles are heat treated to a temperature to approximately 190° C. The abrasive pre-form is then cooled and rinsed. The process of bonding the nickel coated diamond to the tacking layer is conducted at an average spooling rate of 15 m/min.

Figure 4:
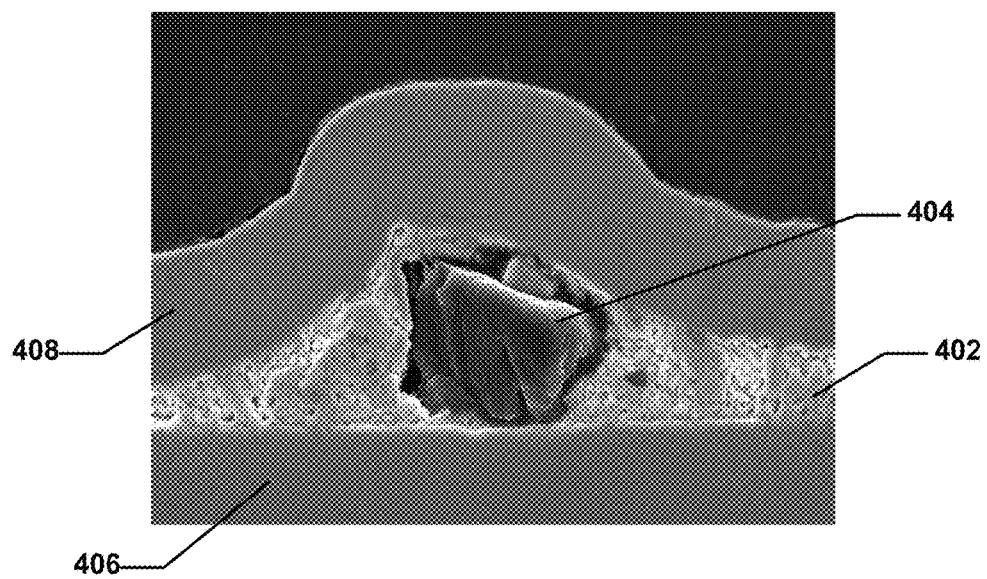
FIG. 4 includes a magnified image of an abrasive article formed according to another embodiment.

Thereafter, the abrasive pre-form is washed using 15% HCl followed by a rinse with de-ionized water. The rinsed article is electroplated with nickel to form a bonding layer directly contacting and overlying the abrasive particles and tacking layer. FIG. 4 illustrates the resulting article. As indicated in FIG. 4, the tin/lead tacking layer 402 having a thickness of approximately 6 microns allows the Ni coated diamond 404 to be relatively deeply embedded in the tacking layer 402 on the wire 406. However, after the final layer of nickel 408 is electroplated onto the Ni coated diamond 404 and the tacking layer 402, the Ni coated diamond 404 exhibits poor protrusion from the surface of the wire 406 and is not useful for cutting.

EXAMPLE 3

A length of high strength carbon steel wire is obtained as a substrate. The high strength carbon steel wire has an average diameter of approximately 120 microns. A tacking layer is formed on the external surface of the substrate via electroplating. The electroplating process forms a tacking layer having an average thickness of approximately 2 microns. The tacking layer is formed of a high purity tin composition (99.9% pure tin).

After forming the tacking layer, the wire is spooled into a bath containing a liquid flux material commercially available as Stay Clean® Liquid Soldering Flux from Harris Products Group and the treated wire is then sprayed with nickel-coated diamond abrasive particles having an average particle size of between 10 to 20 microns. Thereafter, the substrate, tacking layer, and abrasive particles are heat treated to a temperature to approximately 250° C. The abrasive pre-form is then cooled and rinsed. The process of bonding the nickel coated diamond to the tacking layer is conducted at an average spooling rate of 15 m/min.

Thereafter, the abrasive pre-form is washed using 15% HCl followed by a rinse with de-ionized water. The rinsed article is electroplated with nickel to form a bonding layer directly contacting and overlying the abrasive particles and tacking layer.

EXAMPLE 4

A length of high strength carbon steel wire is obtained as a substrate. The high strength carbon steel wire has an average diameter of approximately 120 microns. A tacking layer is formed on the external surface of the substrate via electroplating. The electroplating process forms a tacking layer having an average thickness of approximately 2 microns. The tacking layer is formed of a high purity tin composition (99.9% pure tin).

After forming the tacking layer, the wire is spooled into a bath containing a liquid flux material commercially available as Stay Clean® Liquid Soldering Flux from Harris Products Group and nickel-coated diamond abrasive particles having an average particle size of between 10 to 20 microns are mixed with the flux. Thereafter, the substrate, tacking layer, and abrasive particles are heat treated to a temperature to approximately 250° C. The abrasive pre-form is then cooled and rinsed. The process of bonding the nickel coated diamond to the tacking layer is conducted at an average spooling rate of 15 m/min.

Thereafter, the abrasive pre-form is washed using 15% HCl followed by a rinse with de-ionized water. The rinsed article is electroplated with nickel to form a bonding layer directly contacting and overlying the abrasive particles and tacking layer.

Figure 5:
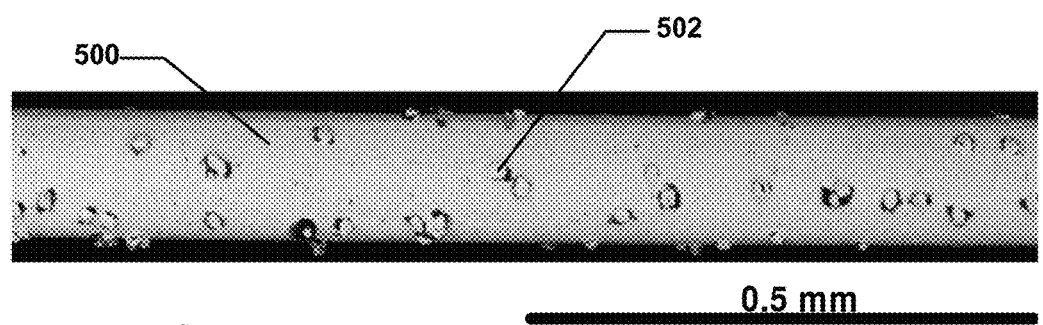
FIG. 5 includes a magnified image of an abrasive article formed according to another embodiment.
Figure 6:
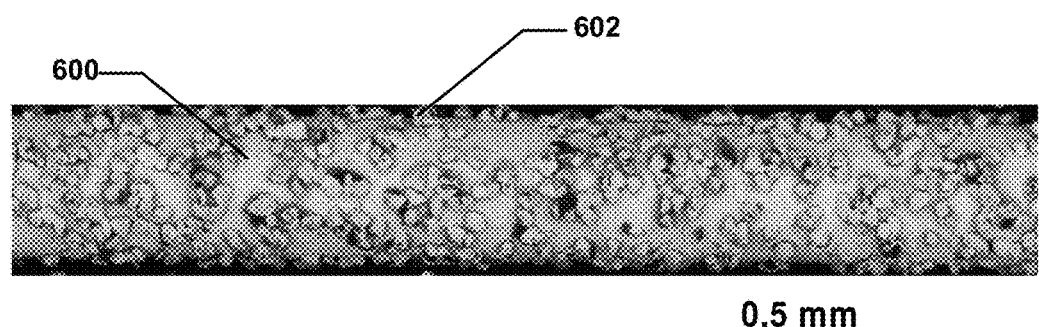
FIG. 6 includes a magnified image of an abrasive article formed according to yet another embodiment.

By controlling the concentration of nickel-coated diamond abrasive particles within the flux, diamond concentrations on the wire are obtained with a range that includes 60 particles per millimeter of wire and 600 particles per millimeter of wire. This corresponds to about 0.6 to 6.0 carats per kilometer of 120 micron steel wire. FIG. 5 depicts a wire 500 with a concentration of approximately 60 particles 502 per millimeter of wire and FIG. 6 depicts a wire 600 with a concentration of approximately 600 particles 602 per millimeter of wire.

Cutting Test:

One 100 mm square brick of silicon is provided as a workpiece And 365 meters of wire produced in accordance with Example 4 is provided. The wire includes an abrasive particle concentration of about 1.0 carats per meter of wire. The wire operates at a speed of 9 meters per second and a wire tension of 14 Newtons. The cutting time is 120 minutes. The wire successfully cut through the workpieces and produced 12 wafers with a single cut.

Figure 7:
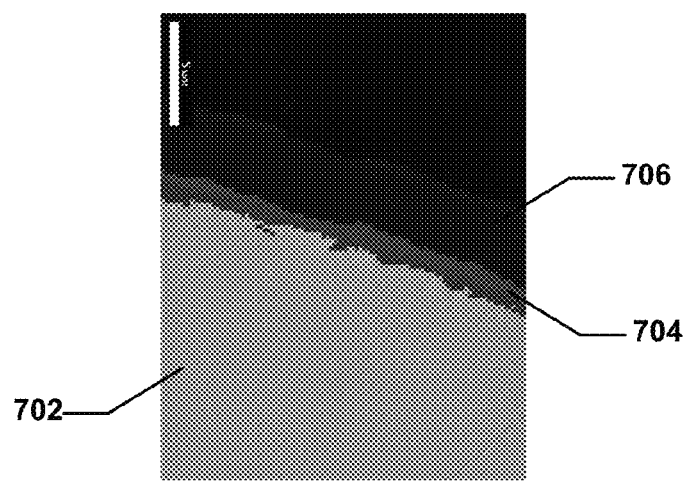
FIG. 7 includes a magnified image of an abrasive article formed according to still another embodiment.
Figure 8:
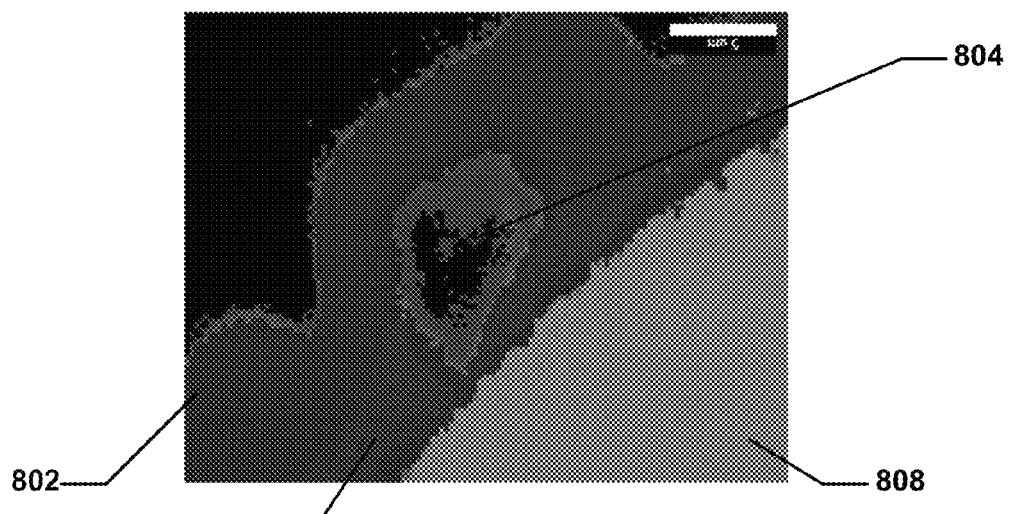
FIG. 8 includes a magnified image of an abrasive article formed according to another embodiment.

EDS Analysis:

An EDS analysis of the wire of Example 4 shows no indication of precipitates formed. Referring to FIG. 7, the results of the EDS analysis shows the steel wire 702 and a layer of tin 704 is disposed on the steel wire 702. Further, a layer of nickel 706 is disposed on the tin 704. In FIG. 8, the results of the EDS analysis also indicates a nickel layer 802 is formed around the diamond 804 such that the diamond 804 is nearly completely coated with the nickel layer 802. Further, the nickel layer 802 forms an interface with the tin layer 806 that is deposited on the steel core 808.

EXAMPLE 5

A length of high strength carbon steel wire is obtained as a substrate. The high strength carbon steel wire has an average diameter of approximately 120 microns. A tacking layer is formed on the external surface of the substrate via dip coating. The dip coating process forms a tacking layer having an average thickness of approximately 2 microns. The tacking layer is formed of an essentially of tin composition.

After forming the tacking layer, the wire is spooled into a bath containing a liquid flux material commercially available as Stay Clean® Liquid Soldering Flux from Harris Products Group and the treated wire is then sprayed with nickel-coated diamond abrasive particles having an average particle size of between 10 to 20 microns. Unfortunately, for reasons not quite understood, the abrasive particles do not adhere to the tacking layer formed via dip coating and the remaining process steps are not performed.

Due to a lack of abrasive particles on the substrate, an abrasive article formed in a manner similar to Example 5 would lack a usable amount of abrasive particles and the abrasive article would be untenable as an abrasive cutting tool.

EXAMPLE 6

A length of high strength carbon steel wire is obtained as a substrate. The high strength carbon steel wire has an average diameter of approximately 120 microns. A tacking layer is formed on the external surface of the substrate via electroplating. The electroplating process forms a tacking layer having an average thickness of approximately 1.5 micron. The tacking layer is formed of a matte tin composition comprising not greater than about 0.1% of organics, and essentially free of organic brighteners and organic grain refiners. The matte tin material comprises 99.9% pure tin. The average grain size of the plated tin ranges from about 0.5 to 5 microns.

After forming the tacking layer, the wire is spooled into a bath containing a liquid flux material commercially available as Stay Clean® Liquid Soldering Flux from Harris Products Group and nickel-coated diamond abrasive particles having an average particle size of between 10 to 20 microns are mixed with the flux. The viscosity of the slurry is about 1 mPa s at temperature of 25° C. Thereafter, the substrate, tacking layer, and abrasive particles are heat treated to a temperature to approximately 250° C. The abrasive pre-form is then cooled and rinsed.

The process of bonding the nickel coated diamond to the tacking layer is conducted at an average spooling rate of 15 m/min. Thereafter, the abrasive pre-form is washed using 15% HCl followed by a rinse with de-ionized water. The rinsed article is electroplated with nickel to form a bonding layer directly contacting and overlying the abrasive particles and tacking layer.

EXAMPLE 7

A length of high strength carbon steel wire is obtained as a substrate. The high strength carbon steel wire has an average diameter of approximately 120 microns. A tacking layer is formed on the external surface of the substrate via electroplating. The electroplating process forms a tacking layer having an average thickness of approximately 1.5 micron. The tacking layer is formed of a high purity tin or tin soldering composition (e.g., 60/40 tin/lead composition).

Figure 13:
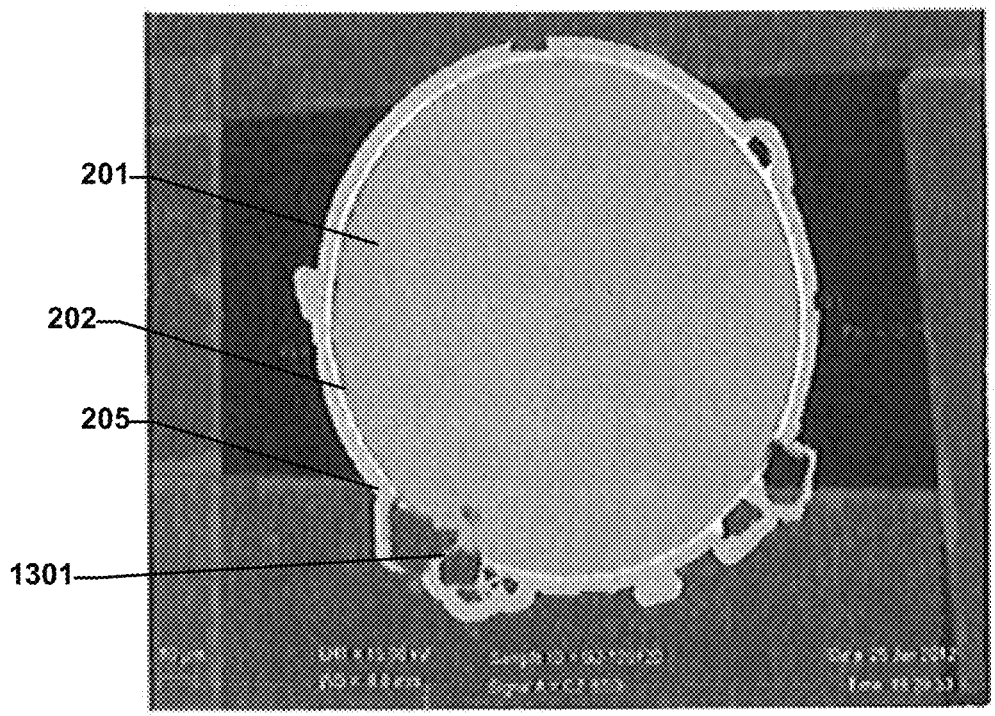
FIG. 13 includes a cross-sectional picture of an abrasive article including abrasive agglomerates according to an embodiment.

After forming the tacking layer, the wire is spooled into a bath containing a liquid flux material commercially available as Stay Clean® Liquid Soldering Flux from Harris Products Group and nickel-coated diamond abrasive particles having an average particle size of between 10 to 20 microns are mixed with the flux. Thereafter, the substrate, tacking layer, and abrasive particles are heat treated to a temperature to approximately 250° C. The abrasive pre-form is then cooled and rinsed. Notably, the process facilitates the formation of abrasive agglomerates 1301, such as those illustrated in FIG. 13. The content of nickel-coated diamond abrasive particles in the slurry is greater than 10% of the total weight of the slurry, thus facilitating the formation of agglomerated particles. The degree of the abrasive agglomeration increases with the amount of diamond abrasive particles in the slurry.

The process of bonding the nickel coated diamond to the tacking layer is conducted at an average spooling rate of 15 m/min. Thereafter, the abrasive pre-form is washed using 15% HCl followed by a rinse with de-ionized water. The rinsed article is electroplated with nickel to form a bonding layer directly contacting and overlying the abrasive particles and tacking layer.

Wafer Break Strength Test:

Wafer break strength test is conducted on a Sintech tester with ring on ring configuration. The diameter of the support ring is about 57.2 mm and the diameter of the load ring is about 28.6 mm. The loading speed is about 0.5 mm/min. Wafer break strength is calculated by the break load and the average of wafer thickness.

A 125 mm pseudo square monocrystalline material was sliced to form wafers by two abrasive samples, a first sample (S1) representative of an abrasive article formed according to Example 7 and a conventional sample formed by direct plating of Nickel coated diamond without a tacking layer. A second 125 mm square multicrystalline silicon material was also sliced by sample S1 and the conventional sample.

The silicon was sliced under the conditions indicated below in Table 1.

| Cutting condition | Machine | DWT RTD Wire Saw Machine |
|---|---|---|
| | Wire speed (m/s) | 9.1 |
| | Wire tension (N) | 14 |
| | Workpiece | 125 mm silicon |
| | # of wafers per cut | 12 |
| | Length of wire used (M) | 360 |
| | Coolant | water soluble |

Figure 14:
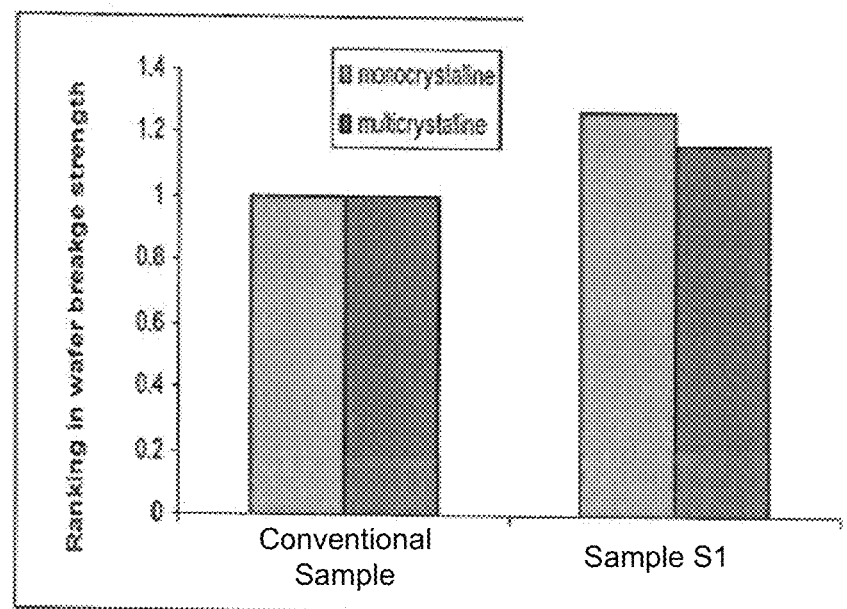
FIG. 14 includes a chart of relative wafer break strength for wafers processed by a conventional sample and wafers processed by an abrasive article representative of an embodiment.

After slicing, the quality of the cut, including measure of damage to the wafer by the slicing operation was evaluated by measuring the average wafer break strength. As illustrated in FIG. 14, the wafers formed by sample S1 for the monocrystalline material and the multicrystalline material had a relative average break strength of at least about 20% improved over the wafers formed by the conventional sample. The data demonstrates a remarkable improvement in the quality of wafers formed using sample S1 over the conventional sample.

The surface roughness, as measured by Ra value, of the wafers sliced by sample S1 is essentially same to the conventional sample. The TTV (total thickness variation) of the wafers sliced by sample S1 shows 10 to 20% improvement (10-20% lower) than the conventional sample. Additionally, the diamond loss of the sample S1 is 20 to 50% lower than the conventional sample and hence longer wire life is expected for sample S1.

EXAMPLE 8

A wire sample is formed according to Example 7. The wire is used to conduct a cutting test on a workpiece of monocrystalline silicon wafers into 156 mm diameter wafers using a Meyer Burger DS265 DW Wire Saw machine. The slicing test was conducted with water soluble coolant, 15 meter per second wire speed, 25 Newton tension, VWSR parameter equal to 3 and about 96 seconds per cycle of wire reciprocating. The slicing test was completed in about 4 hours. The wafers produced had an average total thickness variation (TTV) of less than 20 microns and a surface roughness (Ra) of approximately 0.3 um Ra.

EXAMPLE 9

A length of high strength carbon steel wire is obtained as a substrate. The high strength carbon steel wire has an average diameter of approximately 180 or 250 microns. A tacking layer is formed on the external surface of the substrate via electroplating having an average thickness of approximately 4 microns. The tacking layer is formed of a high purity tin composition (99.9% tin).

After forming the tacking layer, the wire is spooled into a bath containing a mixture of flux paste material commercially available as Taramet Sterling Lead-Free Water Soluble Flux from Worthington Cylinders, DI water, and nickel-coated diamond abrasive particles having an average particle size of between 30 to 40 microns. The mixture is 64 weight % (71 volume %) DI water, 21 weight % (25 volume %) flux paste and 14 weight % (4 volume %) 30-40 um diamond. After sufficiently coating, the substrate, tacking layer, and abrasive particles containing mixture are heat treated to a temperature to approximately 250° C. The abrasive pre-form is then cooled and rinsed. The resulting concentration of diamond on the wire is approximately 16 ct/km. The process of bonding the nickel coated diamond to the tacking layer is conducted via electroplating at an average spooling rate of 6.5 m/min and results in a 7-8 um thick bonding layer of nickel.

A 4 inch round crystalline sapphire workpiece was provided for conducting a cutting operation. The workpiece was sliced to form 4 wafers using a first sample (S1) representative of an abrasive article of EXAMPLE 9. Additionally, 4 wafers were cut from the workpiece using a conventional wire saw (Sample C1) available from Asahi, and commercially available as Eco MEP Electroplated Wire. The workpiece was sliced under the conditions indicated below in Table 2 below.

TABLE 2

| Cutting condition | Machine | Takatori WSD-K2 Machine |
|---|---|---|
| | Wire speed (m/s) | 10 |
| | Table speed (mm/min) | 0.12 |
| | Wire tension (N) | 30 |
| | Workpiece | 4 inch round sapphire |
| | New wire feed (m/min) | 0.6 |
| | Accel/Decel | 3 seconds/3 seconds |
| | Time at const wire speed (s) | 50 |
| | Rocking | 5 degree at 500 deg/min |
| | # of wafers per cut | 4 |
| | Coolant | Oil based |

After completing the cutting operation, the quality of the wafers formed from the workpiece was evaluated. The evaluation included a general measure of damage to the wafer by the slicing operation including analysis of total thickness variation (TTV), bow, and surface roughness (Ra) of each of the wafers. As illustrated in Table 3 below, the wafers formed by sample S1 for the sapphire had a bow that was approximately 50% lower (i.e., 50% improvement) with comparable TTV and Ra. The data demonstrates a remarkable improvement in the quality of wafers formed using sample S1 over the conventional sample (C1).

TABLE 3

| Characteristic | Specification | Sample C1 | Sample S1 |
|---|---|---|---|
| TTV | UCL <30 microns | 19 ± 12 | 20 + 12 |
| Bow | <30 microns | 26 + 7 | 11 + 7 |
| Ra | <3 microns | ~0.5 | ~0.5 |

EXAMPLES 10 and 11

A length of high strength carbon steel wire is obtained as a substrate. The high strength carbon steel wire has an average diameter of approximately 180 microns. A tacking layer is formed on the external surface of the substrate via electroplating having an average thickness of approximately 4 microns. The tacking layer is formed of a high purity tin composition (99.9% tin).

For Example 10, after forming the tacking layer, a portion of the wire is spooled into a bath containing a mixture of flux paste material commercially available as Taramet Sterling Lead-Free Water Soluble Flux from Worthington Cylinders, DI water, nickel-coated diamond abrasive particles having an average particle size of between 8 to 16 microns, and nickel-coated diamond abrasive particles having an average particle size of between 30 to 40 microns. The mixture has a ratio of the 8/16 micron particles to the 30/40 micron particles of about 1:1 based on the number of abrasive particles, which provides a bimodal abrasive particle size distribution. The mixture is 61 weight % (71 volume %) hot tap water, 20 weight % (24 volume %) flux paste and 18 weight % (5 volume %) diamond. After sufficiently coating, the substrate, tacking layer, and abrasive particles containing mixture are heat treated to a temperature to approximately 250° C. The abrasive pre-form is then cooled and rinsed.

For Example 11, after forming the tacking layer, a portion of the wire is spooled into a bath containing a mixture of flux paste material commercially available as Taramet Sterling Lead-Free Water Soluble Flux from Worthington Cylinders, DI water and nickel-coated diamond abrasive particles having an average particle size of between 30 to 40 microns. The mixture is 61 weight % (71 volume %) hot tap water, 20 weight % (24 volume %) flux paste and 18 weight % (5 volume %) diamond. After sufficiently coating, the substrate, tacking layer, and abrasive particles containing mixture are heat treated to a temperature to approximately 250° C. The abrasive pre-form is then cooled and rinsed.

A 4 inch round crystalline sapphire workpiece was provided for conducting a cutting operation. The workpiece was sliced to form 4 wafers using a first sample (S1) representative of an abrasive article of Example 10. Additionally, 4 wafers were cut from the workpiece using a second sample (S2) representative of an abrasive article of Example 11. The workpiece was sliced under the conditions indicated below in Table 4 below.

TABLE 4

| Cutting condition | Machine | Takatori WSD-K2 Machine |
|---|---|---|
| | Ingot Material & Size | 4" Sapphire, C-Plane |
| | Wire speed (m/min) | 400 |
| | Wire tension (N) | 30 |
| | Time of Cut (hrs:mins) | 9 Hours and 46 minutes |
| | Rocking Angle (Degrees) | 5 degrees |
| | Rocking Speed (degrees/min) | 500 |

TABLE 4-continued

| # of wafers per cut | 4 |
|---|---|
| Coolant | Oil based |

After completing the cutting operation, the quality of the wafers formed from the workpiece was evaluated. The evaluation included a general measure of damage to the wafer by the slicing operation including analysis of total thickness variation (TTV), bow, and surface roughness (Ra) of each of the wafers. As illustrated in Table 5 below, the wafers formed by samples S1 and S2 for the sapphire had comparable bow, TTV and Ra. The evaluation also included a general measure of the cutting force exerted by the samples. Measurements for cutting force were collected using a Kistler 9601A load cell, Kistler 5010 dual mode charge amplifier at a sampling frequency of 10 Hz. The cutting force of Sample 1 was about 20% lower than that of Sample 2.

TABLE 5

| Characteristic | Sample S1 | Sample S2 |
|---|---|---|
| TTV | 20 | 20 |
| Bow | 15 | 15 |
| Ra | 0.4 | 0.4 |
| Cutting force at 80% of the cut (N/m) | 1.6 | 2.0 |

EXAMPLES 12-14

For Examples 12, 13 and 14, a length of high strength carbon steel wire is obtained as a substrate. The high strength carbon steel wire has an average diameter of approximately 120 microns. A tacking layer is formed on the external surface of the substrate via electroplating having an average thickness of approximately 1.5 microns. The tacking layer is formed of a high purity tin composition (99.9% tin). After forming the tacking layer, the wire is spooled into a bath containing a mixture of flux material, DI water, and nickel-coated diamond abrasive particles having an average particle size of about 14 microns. After sufficiently coating, the substrate, tacking layer, and abrasive particles containing mixture are heat treated to a temperature to approximately 250° C. The process of bonding the nickel coated diamond to the tacking layer is conducted via electroplating at an average spooling rate of 30 m/min and results in a about 4 um thick bonding layer of nickel. The abrasive pre-form is then cooled and rinsed.

The concentration of diamond on each newly formed wire is measured by dissolving 100 M of each sample of diamond wire in acid solution separately, filtering out the diamond particles from each wire and measuring the weight of the diamond particles to calculate the concentration (ct/km) on each wire. Each of Examples 12, 13 and 14 were formed to have different concentrations of diamond as indicated in Table 6 below.

TABLE 6

| | EXAMPLE 12 | EXAMPLE 13 | EXAMPLE 14 |
|---|---|---|---|
| Diamond concentration (ct/km) | 1.4 | 2.3 | 3.8 |
| Diamond concentration (#/mm) | ~40 | ~70 | ~120 |

Three 5 inch×5 inch Mono silicon pseudo workpieces were provided for conducting a cutting operation. A first workpiece was sliced to form 70 wafers using a sample (S1) representative of an abrasive article of Example 12. A second workpiece was sliced to form 70 wafers each using a sample (S2) representative of an abrasive article of Example 11. Finally, a third workpiece was sliced to form 70 wafers each using a sample (S3) representative of an abrasive article of Example 12. The workpieces were sliced under the conditions indicated below in Table 7 below.

TABLE 7

| Cutting condition | Machine | DWT RTD multi-wire saw |
|---|---|---|
| | Wire speed (m/s) | 10 |
| | Cut time (hour) | 3 |
| | Wire tension (N) | 18 |
| | Wire testing (m) | 300 |
| | Wire Guide Pitch (μm) | 500 |
| | # of wafers cut | 70 |
| | # of cut per test | 2 |

After completing the cutting operation, the quality of the wafers formed from the workpieces was evaluated. The evaluation included a general measure of damage to the wafer by the slicing operation including analysis of total thickness variation (TTV) and surface roughness (Ra) of each of the wafers. Additionally, the amount of diamond loss that occurred on each of the representative samples (S1, S2 & S3) was measured. Also, the diamond concentration of the used wire samples was calculated using the method noted above for calculating the diamond concentration on the new wire samples (i.e., dissolving 100 M of each sample of diamond wire in acid solution separately, filtering out the diamond particles from each wire and measuring the weight of the diamond particles to calculate the concentration (ct/km) on each wire). The diamond concentration of the used wire was then used to calculate the percent diamond loss for the wire. As illustrated in Table 8 below, the wafers formed by samples S1, S2 and S3 had comparable TTV and Ra. However, samples S2 and S3 had nearly half of the diamond loss of sample S1, thus indicating improved performance and life of the abrasive wire samples of S2 and S3 as compared to S1.

TABLE 8

| | EXAMPLE 12 | EXAMPLE 13 | EXAMPLE 14 |
|---|---|---|---|
| Ra (um) | 0.5 | 0.4 | 0.4 |
| TTV (um) | 19 | 14 | 16 |
| Diamond Concentration on Used Wire (ct/km) | 0.4 | 1.4 | 2.3 |
| Diamond loss (%) | ~70% | ~40% | ~40% |
| Wire Wear (qualitative) | High | Medium | Low |
| Wire Life (qualitative) | Low | Higher | Higher |

EXAMPLE 15

Figure 18A:
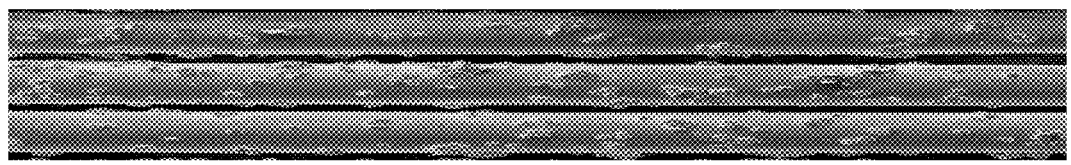
FIG. 18A includes a magnified image of a conventional abrasive article.
Figure 18B:
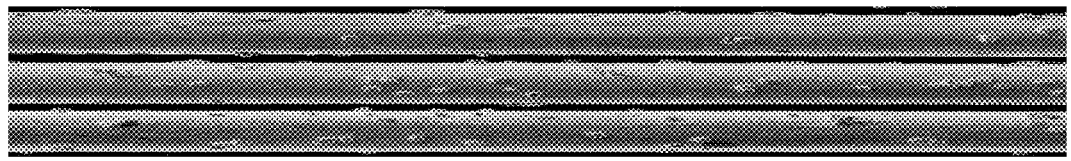
FIG. 18B includes a magnified image of a conventional abrasive article.
Figure 18C:
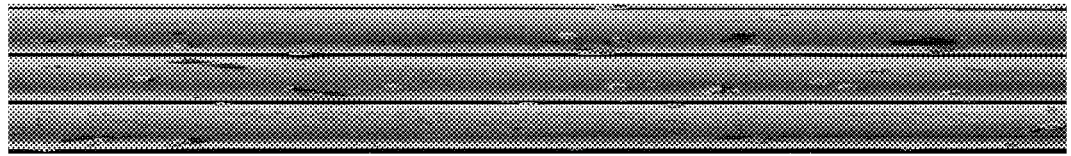
FIG. 18C includes a magnified image of a conventional abrasive article.

For Example 15, conventional samples of an abrasive article were made by co-depositing 10/20 Ni coated diamond particles with Ni electrolytic plating on 120 micron steel core wire at three different production rates. FIG. 18A shows a magnified image of a sample of the conventional wire produced at a production speed of 3 m/min. FIG. 18B shows a magnified image of a sample of the conventional wire produced at a production speed of 5 m/min. FIG. 18C shows a magnified image of a sample of the conventional wire produced at a production speed of 10 m/min. As shown in FIGS. 18A-C, diamond concentration on the conventional wire samples decreased with increased production speed (i.e., conventional wire produced at a production speed of 10 m/min had a lower diamond concentration than conventional wire produced at a production speed of 3 m/min).

However, abrasive articles of the embodiments described herein can be made with a high concentration of abrasive particles per mm of substrate (i.e., at least about 10 particles per mm of substrate) at production speeds of 10 m/min or higher.

The present application represents a departure from the state of the art. Notably, the embodiments herein demonstrate improved and unexpected performance over conventional wire saws. While not wishing to be bound to a particular theory, it is suggested that combination of certain features including designs, processes, materials, and the like may facilitate such improvements. The combination of features can include, but is not limited to, aspects of the substrate and processing, aspects of the barrier layer and processing techniques, aspects of the tacking layer and processing techniques, aspects of the abrasive particles, including first and second types of abrasive particles, use of agglomerated particles and unagglomerated particles, aspects of the particle coating layers and processing techniques, aspects of the bonding layer and processing techniques, and aspects of the coating layer and processing techniques.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter

What is claimed is:

1. An abrasive article comprising:
   a substrate comprising a wire;
   a tacking layer overlying the substrate;
   a first type of abrasive particle overlying the tacking layer, wherein the tacking layer comprises a melting point of not greater than about 450° C.;
   a bonding layer overlying the first type of abrasive particle and the tacking layer;
   a lubricious material overlying or integrated within the bonding layer, wherein the lubricious material is in the form of discrete particles; and
   a barrier layer in direct contact with a peripheral surface of the substrate.

2. The abrasive article of claim 1, wherein the barrier layer is disposed between the peripheral surface of the substrate and the tacking layer.

3. The abrasive article of claim 1, wherein the barrier layer comprises a material different from the tacking layer.

4. The abrasive article of claim 1, wherein the barrier layer comprises a non-alloyed material.

5. The abrasive article of claim 1, wherein the barrier layer comprises an average thickness of not greater than about 10 microns.

6. The abrasive article of claim 1, wherein the barrier layer is a dip-coating layer.

7. The abrasive article of claim 1, wherein the barrier layer is applied at a temperature not greater than about 400° C.

8. The abrasive article of claim 1, wherein the discrete particles are contained within the bonding layer.

9. The abrasive article of claim 1, wherein the lubricious material is in direct contact with the first type of abrasive particle.

10. The abrasive article of claim 1, wherein the lubricious material comprise a material selected from the group consisting of an organic material, an inorganic material, a natural material, a synthetic material, and a combination thereof.

11. The abrasive article of claim 1, wherein the lubricious material comprises a polymer.

12. The abrasive article of claim 1, wherein the lubricious material comprises polytetrafluoroethylene (PTFE).

13. An abrasive article comprising:
    a substrate comprising a wire;
    a tacking layer overlying the substrate consisting essentially tin;
    a first type of abrasive particle overlying the tacking layer, wherein the tacking layer comprises a melting point of not greater than about 450° C.;
    a bonding layer overlying at least a portion of the first type of the abrasive particle and the tacking layer; and
    a lubricious material at the bonding layer, wherein the lubricious material is in the form of discrete particles and wherein the tacking layer is bonded to the surface of the substrate at a bonding region defined by an interdiffusion of elements between the tacking layer and the substrate.

14. An abrasive article comprising:
    a substrate comprising a wire;
    a tacking layer overlying the substrate comprising tin;
    a first type of abrasive particle overlying the tacking layer, wherein the tacking layer comprises a melting point of not greater than about 450° C.;
    a lubricious material overlying the substrate, wherein the lubricious material is in the form of discrete particles; and
    a barrier layer in direct contact with a peripheral surface of the substrate.

15. The abrasive article of claim 14, wherein the lubricious material is a non-continuous layer.

16. The abrasive article of claim 14, wherein the lubricious material is in direct contact with the first type of abrasive particle.

17. The abrasive article of claim 14, wherein the lubricious material comprise a material selected from the group consisting of an organic material, an inorganic material, a natural material, a synthetic material, and a combination thereof.

18. The abrasive article of claim 14, wherein the lubricious material comprises a polymer.

19. The abrasive article of claim 14, wherein the lubricious material comprises polytetrafluoroethylene (PTFE).

* * * * *